(12) United States Patent
Salsbury et al.

(10) Patent No.: US 10,845,070 B2
(45) Date of Patent: *Nov. 24, 2020

(54) EXTREMUM-SEEKING CONTROL SYSTEM FOR A PLANT

(71) Applicant: Johnson Controls Technology Company, Auburn Hills, MI (US)

(72) Inventors: Timothy I. Salsbury, Whitefish Bay, WI (US); John M. House, Saint-Leonard (CA)

(73) Assignee: Johnson Controls Technology Company, Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/438,854

(22) Filed: Jun. 12, 2019

(65) Prior Publication Data
US 2019/0293308 A1 Sep. 26, 2019

Related U.S. Application Data

(63) Continuation of application No. 15/080,435, filed on Mar. 24, 2016, now Pat. No. 10,352,576.
(Continued)

(51) Int. Cl.
*F24F 5/00* (2006.01)
*F24F 11/30* (2018.01)
(Continued)

(52) U.S. Cl.
CPC .......... *F24F 5/0035* (2013.01); *F24F 11/30* (2018.01); *F24F 11/62* (2018.01); *F24F 11/77* (2018.01);
(Continued)

(58) Field of Classification Search
CPC .......... F24F 5/0035; F24F 11/62; F24F 11/77; F24F 11/83; F24F 11/30; F24F 11/63; F24F 2140/60; F24F 11/85; F24F 11/54
(Continued)

(56) References Cited

U.S. PATENT DOCUMENTS 7,827,813 B2  11/2010 Seem
8,027,742 B2  9/2011 Seem et al.
(Continued)

FOREIGN PATENT DOCUMENTS

CN  101861552  10/2010
CN  204880453  12/2015
(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
(Continued)

*Primary Examiner* — Robert E Fennema
*Assistant Examiner* — Christopher W Carter
(74) *Attorney, Agent, or Firm* — Foley & Lardner LLP

(57) ABSTRACT

An extremum-seeking control system for a plant includes a feedback controller for operating the plant to achieve a value of a manipulated variable, and an extremum-seeking controller. The extremum-seeking controller is configured to provide the value of the manipulated variable to the feedback controller and to determine a value for the manipulated variable. The extremum-seeking controller determines the value for the manipulated variable by perturbing the manipulated variable with an excitation signal and monitoring a performance variable of the plant resulting from the perturbed manipulated variable, estimating a normalized (Continued)

correlation coefficient relating the performance variable to the manipulated variable, and modulating the manipulated variable to drive the normalized correlation coefficient toward zero using a general set of tuning parameters. The general set of tuning parameters are adapted for use with the normalized correlation coefficient, independent of a scale of the performance variable.

20 Claims, 20 Drawing Sheets

Related U.S. Application Data

(60) Provisional application No. 62/296,713, filed on Feb. 18, 2016.

(51) Int. Cl.
| | | |
|---|---|---|
| F24F 11/62 | (2018.01) | |
| F24F 11/77 | (2018.01) | |
| F24F 11/83 | (2018.01) | |
| F24F 140/60 | (2018.01) | |
| F24F 11/63 | (2018.01) | |
| F24F 11/54 | (2018.01) | |
| F24F 11/85 | (2018.01) | |

(52) U.S. Cl.
CPC .............. *F24F 11/83* (2018.01); *F24F 11/54* (2018.01); *F24F 11/63* (2018.01); *F24F 11/85* (2018.01); *F24F 2140/60* (2018.01)

(58) Field of Classification Search
USPC ......................................................... 700/300
See application file for complete search history.

(56) References Cited

U.S. PATENT DOCUMENTS

| | | |
|---|---|---|
| 8,200,344 B2 | 6/2012 | Li et al. |
| 8,200,345 B2 | 6/2012 | Li et al. |
| 8,473,080 B2 | 6/2013 | Seem et al. |
| 8,478,433 B2 | 7/2013 | Seem et al. |
| 8,825,185 B2 | 9/2014 | Salsbury |
| 8,903,554 B2 | 12/2014 | Stagner |
| 9,348,325 B2 | 5/2016 | Salsbury et al. |
| 9,835,349 B2 | 12/2017 | Salsbury et al. |
| 10,197,977 B2 | 2/2019 | Salsbury et al. |
| 10,209,684 B2 | 2/2019 | Salsbury et al. |
| 10,352,576 B2 | 7/2019 | Salsbury et al. |
| 2009/0083583 A1 | 3/2009 | Seem et al. |
| 2011/0276180 A1 | 11/2011 | Seem |
| 2012/0217818 A1 | 8/2012 | Yerazunis et al. |
| 2015/0277444 A1 | 10/2015 | Burns et al. |
| 2016/0061693 A1 | 3/2016 | Salsbury et al. |
| 2016/0084514 A1 | 3/2016 | Salsbury et al. |
| 2016/0098020 A1 | 4/2016 | Salsbury et al. |
| 2016/0132027 A1 | 5/2016 | Li et al. |
| 2016/0259351 A1 | 9/2016 | Barrett et al. |

FOREIGN PATENT DOCUMENTS

| | | |
|---|---|---|
| CN | 105805887 | 7/2016 |
| JP | 6462021 | 8/2017 |
| WO | WO-2015/015876 A1 | 2/2015 |
| WO | WO-2015/146531 A1 | 10/2015 |

OTHER PUBLICATIONS

Daniel Burns, Extremum Seeking Control for Energy Optimization of Vapor Compression Systems, Jul. 2012, Purdue e-Pubs, pp. 1-7 (Year: 2012).

Diederik Kingma and Jimmy Ba. Adam: A Method for Stochastic Optimization. In International Conference on Learning Representations (ICLR), 2015, 15 pages.

George EP Box, Gwilym M Jenkins, Gregory U Reinsel, and Greta M Ljung. Time Series Analysis: Forecasting and Control. John Wiley & Sons, 2015, chapters 13-15. 82 pages.

Gregory C. Walsh, On the Application of Multi-Parameter Extremum Seeking Control, Jun. 2000, Proceedings of the American Control Conference, pp. 411-415. (Year: 2000).

Hunnekens, et al., A dither-free extremum-seeking control approach using 1st-order least-squares fits for gradient estimation, Proceedings of the 53rd IEEE Conference on Decision and Control, Dec. 15-17, 2014, 6 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Melinda P. Golden, Adaptive Extremum Control Using Approximate Process Models, Jul. 1989, AIChE Journal, vol. 35, No. 7, 1157-1169 (Year: 1989).

Moritz Hardt, Tengyu Ma, and Benjamin Recht. Gradient Descent Learns Linear Dynamical Systems. arXiv preprint arXiv:1609. 05191, 2016, 44 pages.

Nevena et al. Data center cooling using model-predictive control, 2018. 10 pages.

Office Action for Japanese Application No. 2017-192695 dated Dec. 4, 2018, 5 pages.

Office Action for Japanese Patent Application No. 2017-023864 dated Feb. 6, 2018. 3 pages.

S.J. Liu, Introduction to Extremum Seeking, 2012, Springer-Verlag London, Chapter 2 (Year: 2012).

Sergio Bittanti, Marco C Campi, et al. Adaptive Control of Linear Time Invariant Systems: The "Bet on the Best" Principle. Communications in Information & Systems, 6(4):299-320, 2006. 21 pages.

Vipin Tyagi, An Extremum Seeking Algorithm for Determining the Set Point Temperature for Condensed Water in a Cooling Tower, Jul. 2006, IEEE, pp. 1127-1131 (Year: 2006).

Wikipedia, Pearson product-moment correlation coefficient, Oct. 20, 2015 via Wayback Machine, Wikipedia, pp. 1-16 (Year: 2015).

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

2012-2013 Report on Advances in Control Science and Engineering, China Science and Technology Association, China Science and Technology Press, Apr. 30, 2014, pp. 43-44.

Kirkup et al., "An Introduction to Uncertainty in Measurement," Xi'an Jiaotong University Press, Jul. 31, 2011, pp. 66-68, 41 pages with original English language version.

Office Action on CN 201710075918.6, dated Apr. 10, 2020, 46 pages with English language translation.

Office Action on CN 201710925693.9, dated May 21, 2020, 7 pages.

(56) References Cited

OTHER PUBLICATIONS

Office Action on JP 2018-242617, dated Jan. 21, 2020, 8 pages with English language translation.
Zijun et al., "Statistics," Northeastern University Press, Jun. 20, 2010, pp. 109-110.

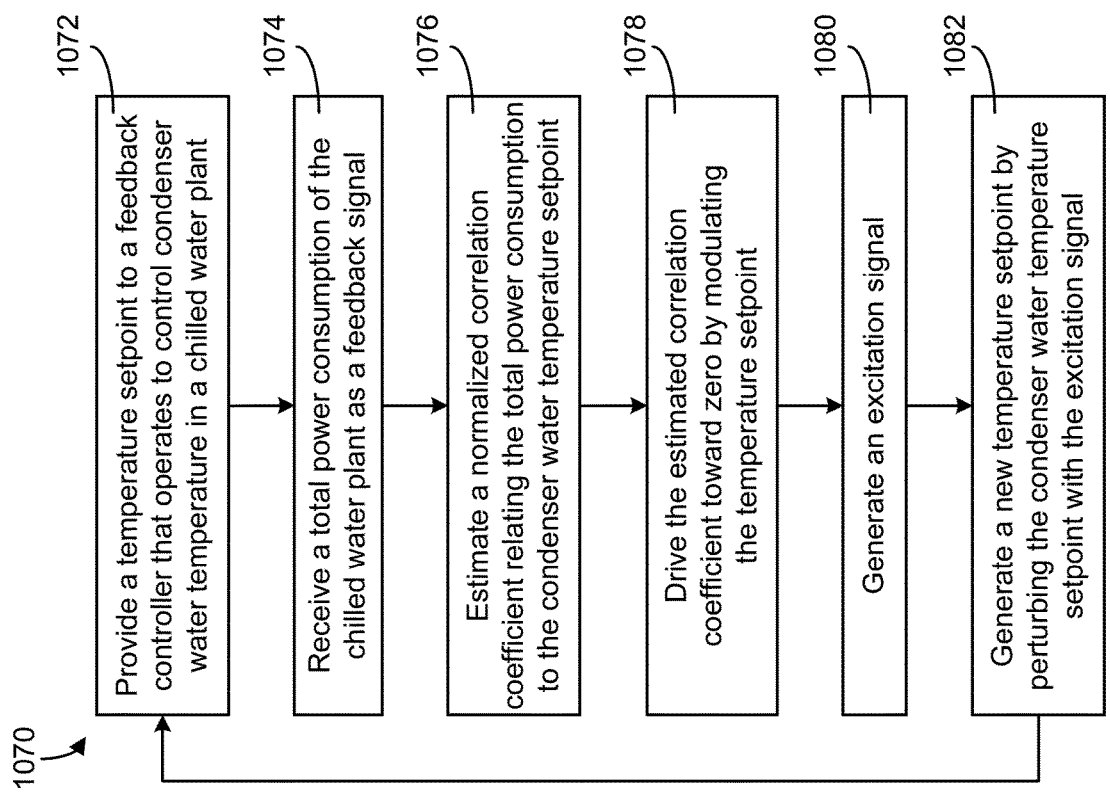

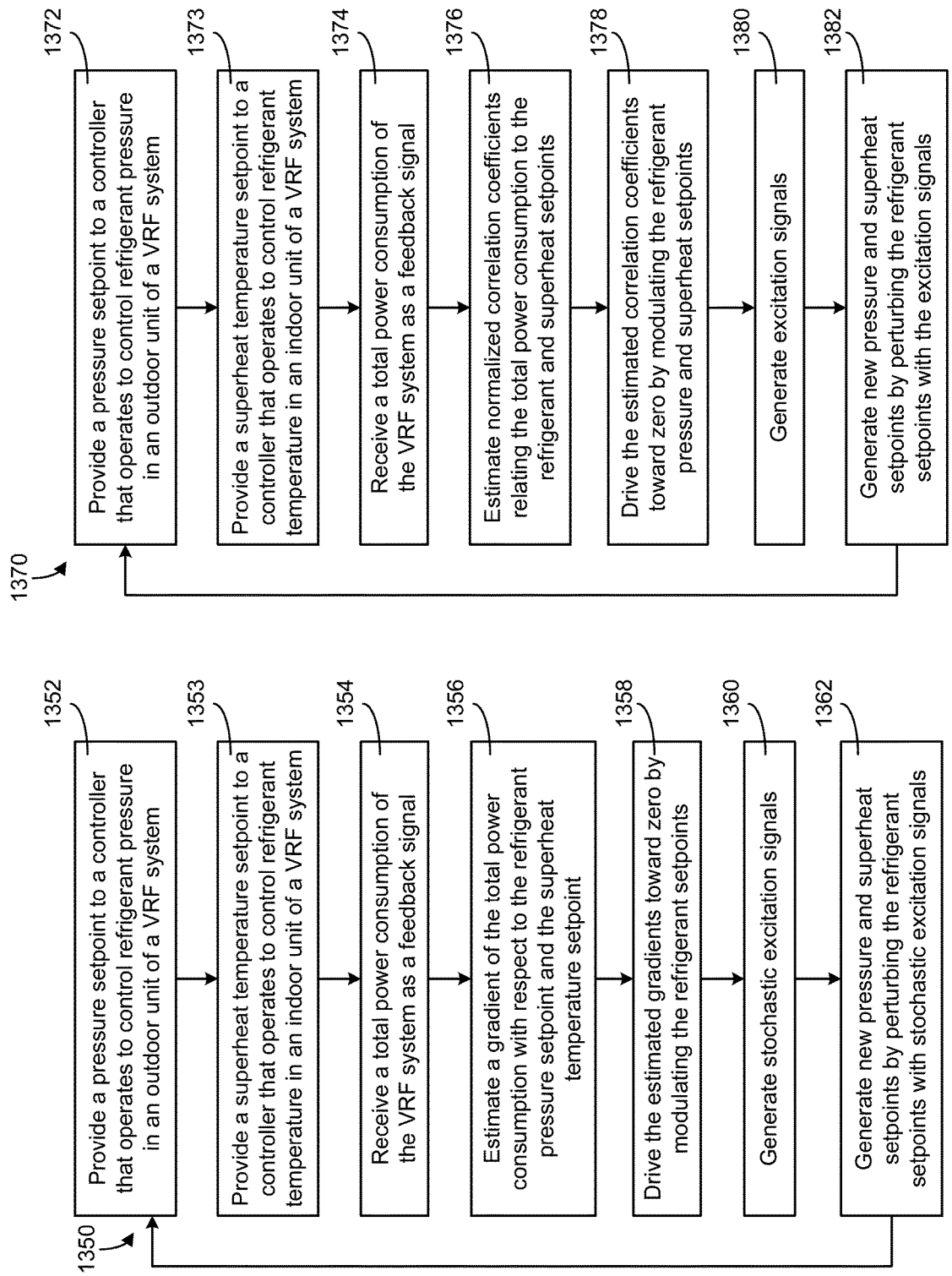

EXTREMUM-SEEKING CONTROL SYSTEM FOR A PLANT

CROSS-REFERENCE TO RELATED PATENT APPLICATION

This application is a continuation of U.S. patent application Ser. No. 15/080,435 filed Mar. 24, 2016, which claims the benefit of and priority to U.S. Provisional Patent Application No. 62/296,713 filed Feb. 18, 2016, the entire disclosures of which are incorporated by reference herein.

BACKGROUND

The present disclosure relates generally to an extremum-seeking control (ESC) system. ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure. Optimization of system performance can be obtained by driving the gradient toward zero by using a negative feedback loop in the closed-loop system. ESC is a non-model based control strategy, meaning that a model for the controlled system is not necessary for ESC to optimize the system.

A plant in control theory is the combination of a process and one or more mechanically-controlled outputs. Traditional ESC systems typically use a periodic (e.g., sinusoidal) dither signal to perturb a control input u provided to the plant. The periodic dither signal can cause large variations (e.g., sinusoidal oscillations) in both the control input u and the plant output y, which are often noticeable to plant operators. Additionally, the frequency of a periodic dither signal needs to be carefully selected to ensure that the ESC strategy is effective. For example, it may be desirable to select a dither signal frequency based on the natural frequency of the plant to enhance the effect of the dither signal on the plant output y. It can be difficult and challenging to properly select the dither frequency without knowledge of the dynamics of the plant. For these reasons, the use of a periodic dither signal is one of the drawbacks of traditional ESC.

SUMMARY

One implementation of the present disclosure is a control system for a plant. The control system include a feedback controller and an extremum-seeking controller, according to some embodiments. The feedback controller is for operating the plant to achieve a value of a manipulated variable, according to some embodiments. The extremum-seeking controller is configured to provide the value of the manipulated variable to the feedback controller and to determine a value for the manipulated variable, according to some embodiments. In some embodiments, the extremum-seeking controller determines the value for the manipulated variable by perturbing the manipulated variable with an excitation signal and monitoring a performance variable of the plant resulting from the perturbed manipulated variable. In some embodiments, the extremum-seeking controller determines the value for the manipulated variable by estimating a normalized correlation coefficient relating the performance variable to the manipulated variable, and modulating the manipulated variable to drive the normalized correlation coefficient toward zero using a general set of tuning parameters. In some embodiments, the general set of tuning parameters are adapted for use with the normalized correlation coefficient, independent of a scale of the performance variable.

In some embodiments, the excitation signal is a non periodic signal including at least one of a random walk signal, a non deterministic signal, and a non-repeating signal.

In some embodiments, the value of the manipulated variable includes a stochastic portion defined by a stochastic excitation signal, and a non-stochastic portion determined by driving the normalized correlation coefficient to zero.

In some embodiments, the extremum-seeking controller includes an integrator configured to generate the excitation signal by integrating a random noise signal.

In some embodiments, the extremum-seeking controller is configured to estimate the normalized correlation coefficient relating the performance variable to the manipulated variable by performing a recursive least squares estimation process with exponential forgetting.

In some embodiments, the extremum-seeking controller is configured to estimate a gradient of the performance variable with respect to the manipulated variable by performing a regression process.

In some embodiments, the regression process includes obtaining a linear model for the performance variable, the linear model defining the performance variable as a linear function of the manipulated variable, an offset parameter, and a gradient parameter. In some embodiments, the regression process also includes estimating a value for the gradient parameter based on an observed value for the performance variable and an observed value for the manipulated variable. In some embodiments, the regression progress also includes using the estimated value for the gradient parameter as the gradient of the performance variable with respect to the manipulated variable.

In some embodiments, the feedback controller is configured to achieve the manipulated variable by adjusting operation of equipment of the plant.

Another implementation of the present disclosure is an extremum-seeking controller for a plant. In some embodiments, the extremum-seeking controller includes one or more processors and one or more non-transitory computer-readable media storing instructions that, when executed by the one or more processors, cause the one or more processors to perform operations. In some embodiments, the operations include perturbing a manipulated variable with an excitation signal and providing the perturbed manipulated variable as an input to a plant. In some embodiments, the operations also include monitoring a performance variable of the plant resulting from the perturbed manipulated variable. In some embodiments, the operations also include estimating a normalized correlation coefficient relating the performance variable to the manipulated variable. In some embodiments, the operations also include modulating the manipulated variable to drive the normalized correlation coefficient toward zero using a general set of tuning parameters. In some embodiments, the general set of tuning parameters are adapted for use with the normalized correlation coefficient, independent of a scale of the performance variable.

In some embodiments, the normalized correlation coefficient is estimated with a recursive estimation process. In some embodiments, the recursive estimation process is a recursive least squares estimation process with exponential forgetting.

In some embodiments, the one or more processors are configured to perform the recursive estimation process for the manipulated variable by calculating a covariance between the performance variable and the manipulated variable, calculating a variance of the manipulated variable, and using the calculated covariance and the calculated variance to estimate the normalized correlation coefficient relating the performance variable to the manipulated variable.

In some embodiments, the one or more processors are configured to perform the recursive estimation process for the manipulated variable by calculating an exponentially-weighted moving average (EWMA) of a plurality of samples of the manipulated variable. In some embodiments, the one or more processors are configured to perform the recursive estimation process for the manipulated variable by calculating an EWMA of a plurality of samples of the performance variable, and using the EWMAs to estimate the normalized correlation coefficient relating the performance variable to the manipulated variable.

In some embodiments, the recursive estimation process is a regression process.

In some embodiments, the one or more processors are configured to perform the regression process by obtaining a linear model for the performance variable, the linear model defining the performance variable as a linear function of the manipulated variable and a gradient parameter for the manipulated variable. In some embodiments, the one or more processors are configured to perform the regression process by estimating a value for the gradient parameter based on observed value for the manipulated variable and an observed value for the performance variable, and using the estimated values for the gradient parameter as the normalized correlation coefficients relating the performance variable to the manipulated variable.

In some embodiments, the excitation signal is a non periodic signal including at least one of a random walk signal, a non deterministic signal, and a non-repeating signal.

Another implementation of the present disclosure is an extremum-seeking controller for a plant. In some embodiments, the extremum-seeking controller includes one or more processors, and one or more non-transitory computer-readable media storing instructions that, when executed by the one or more processors, cause the one or more processors to perform operations. In some embodiments, the operations include perturbing each of a plurality of manipulated variables with a different excitation signal. In some embodiments, the operations include monitoring a performance variable of the plant resulting from each of the perturbed manipulated variables. In some embodiments, the operations include estimating normalized correlation coefficients relating the performance variable to each of the perturbed manipulated variables, and modulating the manipulated variables to drive the estimated normalized correlation coefficients toward zero using a general set of tuning parameters. In some embodiments, the general set of tuning parameters are adapted for use with the normalized correlation coefficient, independent of a scale of the performance variable.

In some embodiments, the one or more processors are configured to estimate the normalized correlation coefficient for each manipulated variable by calculating a covariance between each of the manipulated variables and the performance variable. In some embodiments, the one or more processors are configured to estimate the normalized correlation coefficient for each manipulated variable by calculating a variance of each of the manipulated variables, calculating a variance of the performance variable, and using the calculated covariance and the calculated variances to estimate the normalized correlation coefficient.

In some embodiments, the one or more processors are configured to estimate the normalized correlation coefficient for each of the manipulated variables by estimating a gradient of the performance variable with respect to each of the manipulated variables. In some embodiments, the one or more processors are configured to estimate the normalized correlation coefficient foe ach of the manipulated variables by calculating a standard deviation of each of the manipulated variables, calculating a standard deviation of the performance variable, and using the estimated gradient and the calculated standard deviations to estimate the normalized correlation coefficient.

In some embodiments, the one or more processors are configured to estimate the normalized correlation coefficient for each of the manipulated variables by calculating an exponentially-weighted moving average (EWMA) of a plurality of samples of each of the manipulated variables. In some embodiments, the one or more processors are configured to estimate the normalized correlation coefficient for each of the manipulated variables by calculating an EWMA of a plurality of samples of the performance variable, and using the EWMAs to estimate the normalized correlation coefficient.

In some embodiments, the excitation signal is a non periodic signal including at least one of a random walk signal, a non deterministic signal, and a non-repeating signal.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 10B is a flow diagram illustrating an extremum-seeking control technique in which a stochastic excitation signal is used to perturb a condenser water temperature setpoint in the chilled water plant of FIG. 10A, according to some embodiments.

FIG. 10C is a flow diagram illustrating an extremum-seeking control technique in which a normalized correlation coefficient is used to relate the total system power consumption to the condenser water temperature setpoint in the chilled water plant of FIG. 10A, according to some embodiments.

FIG. 13B is a flow diagram illustrating an extremum-seeking control technique in which stochastic excitation signals are used to a refrigerant pressure setpoint and a refrigerant superheat setpoint in the variable refrigerant flow system of FIG. 13A, according to some embodiments.

FIG. 13C is a flow diagram illustrating an extremum-seeking control technique in which normalized correlation coefficients are used to relate the total system power consumption to the refrigerant pressure setpoint and the refrigerant superheat setpoint in the variable refrigerant flow system of FIG. 13A, according to some embodiments.

DETAILED DESCRIPTION

Overview

Figure 1:
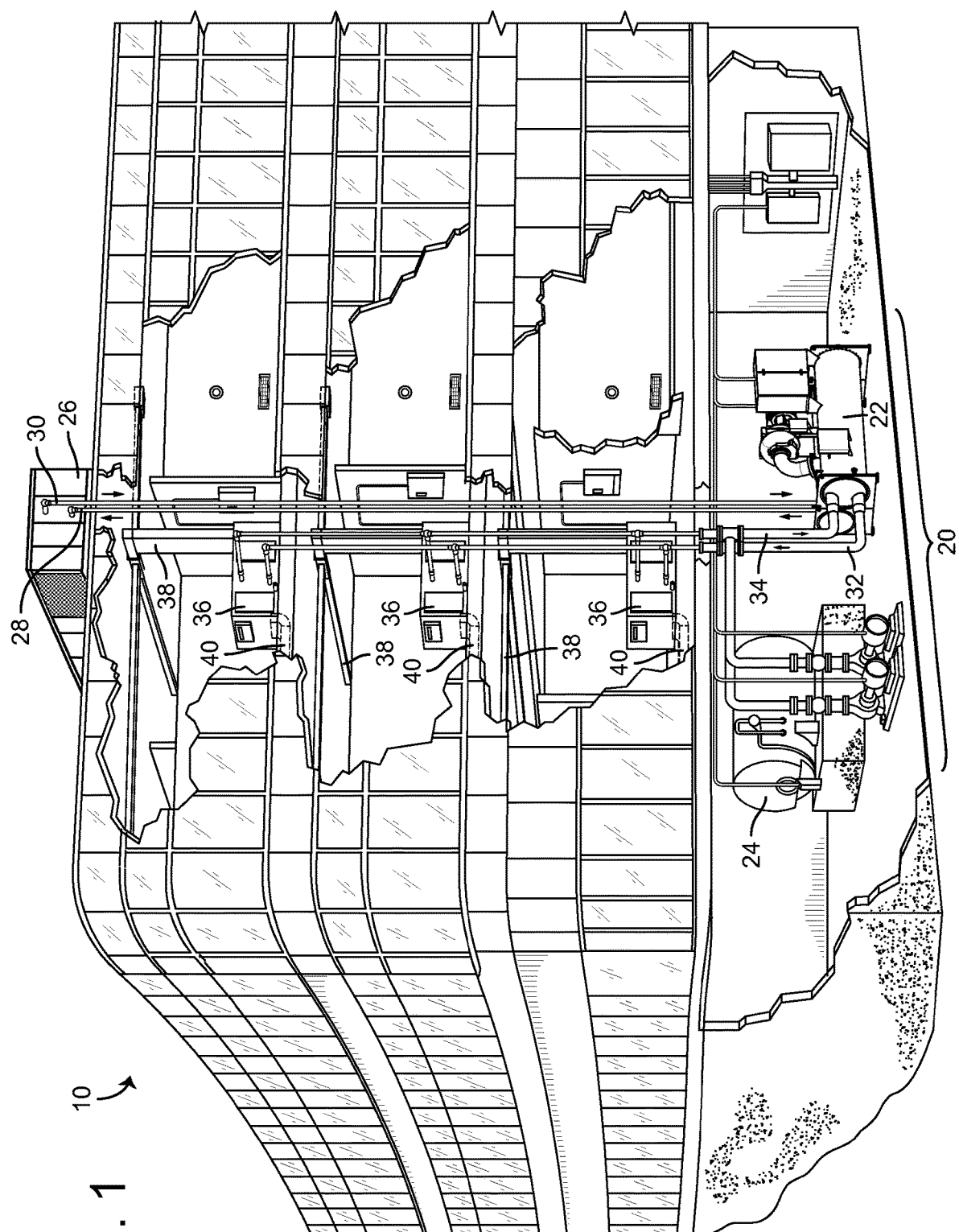
FIG. 1 is a drawing of a building in which an extremum-seeking control system can be implemented, according to some embodiments.

Referring generally to the FIGURES, various extremum-seeking control (ESC) systems and methods are shown, according to some embodiments. In general, ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure.

Optimization of system performance can be obtained by driving the gradient toward zero by using a feedback loop in the closed-loop system. ESC is a non-model based control strategy, meaning that a model for the controlled system is not necessary for ESC to optimize the system. Various implementations of ESC are described in detail in U.S. Pat. Nos. 8,473,080, 7,827,813, 8,027,742, 8,200,345, 8,200,344, U.S. patent application Ser. No. 14/495,773, U.S. patent application Ser. No. 14/538,700, U.S. patent application Ser. No. 14/975,527, and U.S. patent application Ser. No. 14/961,747. Each of these patents and patent applications is incorporated by reference herein.

In some embodiments, an extremum-seeking controller uses a stochastic excitation signal q to perturb a control input u provided to a plant. The controller can include a stochastic signal generator configured to generate a stochastic signal. The stochastic signal can be a random signal (e.g., a random walk signal, a white noise signal, etc.), a non-periodic signal, an unpredictable signal, a disturbance signal, or any other type of non-deterministic or non-repeating signal. In some embodiments, the stochastic signal has a non-zero mean. The stochastic signal can be integrated to generate the excitation signal q.

The stochastic excitation signal q can provide variation in the control input u sufficient to estimate the gradient of the plant output (i.e., a performance variable y) with respect to the control input u. The stochastic excitation signal q has several advantages over a traditional periodic dither signal v. For example, the stochastic excitation signal q is less perceptible than the traditional periodic dither signal v. As such, the effects of the stochastic excitation signal q on the control input u are less noticeable than the periodic oscillations caused by the traditional periodic dither signal v. Another advantage of the stochastic excitation signal q is that tuning the controller is simpler because the dither frequency $\omega_v$ is no longer a required parameter. Accordingly, the controller does not need to know or estimate the natural frequency of the plant when generating the stochastic excitation signal q.

In some embodiments, the extremum-seeking controller uses a recursive estimation technique to estimate the gradient of the performance variable y with respect to the control input u. For example, the controller can use a recursive least-squares (RLS) estimation technique to generate an estimate of the gradient $$\frac{dy}{du}.$$

In some embodiments, the controller uses exponential forgetting as part of the RLS estimation technique. For example, the controller can be configured to calculate exponentially-weighted moving averages (EWMAs) of the performance variable y, the control input u, and/or other variables used in the recursive estimation technique. Exponential forgetting reduces the required amount of data storage (relative to batch processing) and allows the controller to remain more sensitive to recent data and thus more responsive to a shifting optimal point.

In some embodiments, the extremum-seeking controller estimates a normalized correlation coefficient ρ relating the performance variable y to the control input u. The correlation coefficient ρ can be related to the performance gradient $$\frac{dy}{du}\left(\text{e.g., proportional to } \frac{dy}{du}\right)$$

but scaled based on the range of the performance variable y. For example, the correlation coefficient ρ can be a normalized measure of the performance gradient $$\frac{dy}{du}$$

scaled to the range −1≤ρ≤1. The normalized correlation coefficient ρ can be estimated based on the covariance between the performance variable y and the control input u, the variance of the performance variable y, and the variance of the control input u. In some embodiments, the normalized correlation coefficient ρ can be estimated using a recursive estimation process.

The correlation coefficient ρ can be used by the feedback controller instead of the performance gradient $$\frac{dy}{du}.$$

For example, the feedback controller can adjust the DC value w of the control input u to drive the correlation coefficient ρ to zero. One advantage of using the correlation coefficient ρ in place of the performance gradient $$\frac{dy}{du}$$

is that the tuning parameters used by the feedback controller can be a general set of tuning parameters which do not need to be customized or adjusted based on the scale of the performance variable y. This advantage eliminates the need to perform control-loop-specific tuning for the feedback controller and allows the feedback controller to use a general set of tuning parameters that are applicable across many different control loops and/or plants. Additional features and advantages of the extremum-seeking controller are described in greater detail below.

Building and HVAC System

Figure 2:
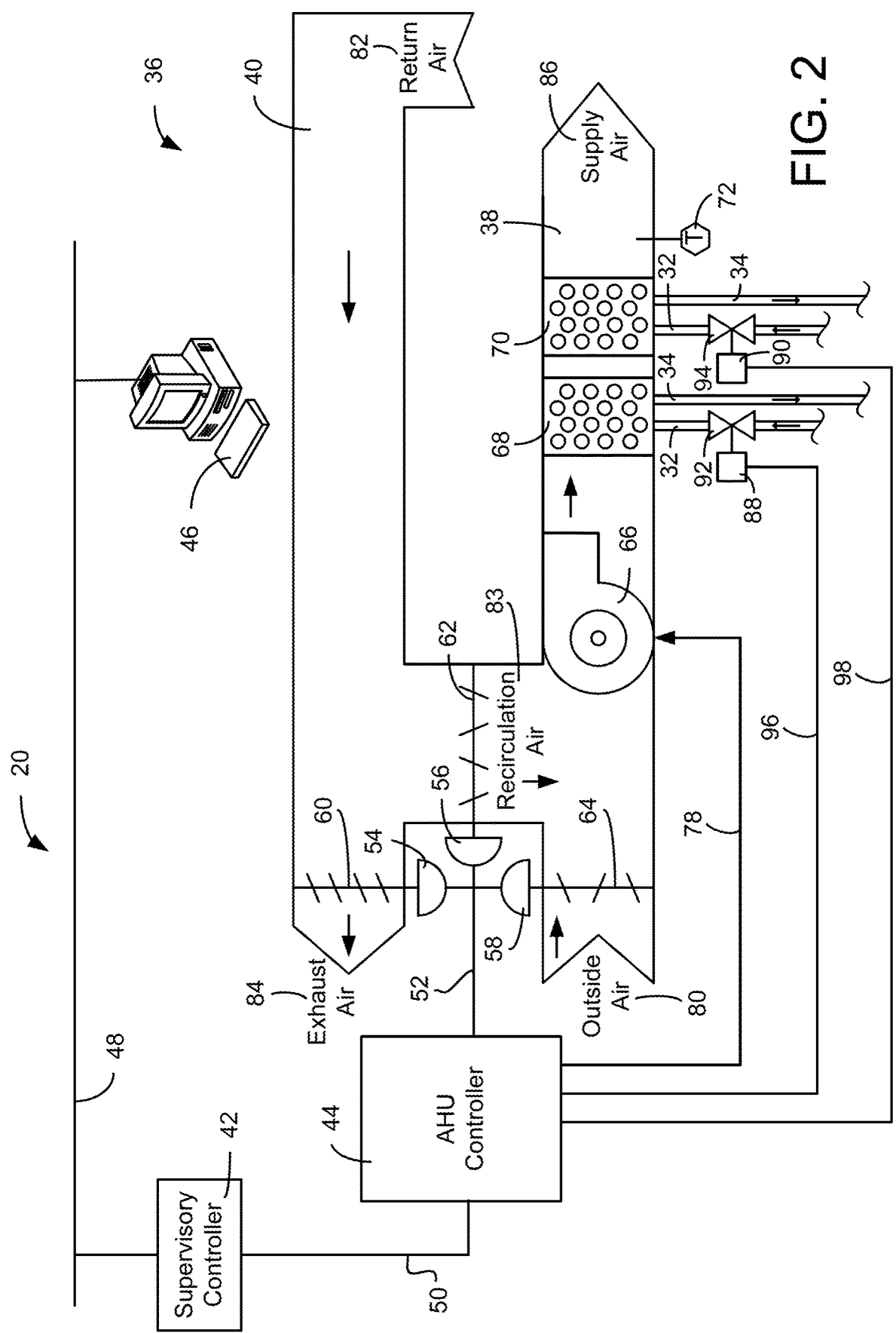
FIG. 2 is a block diagram of a building HVAC system in which an extremum-seeking control system can be implemented, according to some embodiments.

Referring now to FIGS. 1-2, a building 10 and HVAC system 20 in which an extremum-seeking control system can be implemented are shown, according to some embodiments. Although the ESC systems and methods of the present disclosure are described primarily in the context of a building HVAC system, it should be understood that ESC is generally applicable to any type of control system that optimizes or regulates a variable of interest. For example, the ESC systems and methods of the present disclosure can be used to optimize an amount of energy produced by various types of energy producing systems or devices (e.g., power plants, steam or wind turbines, solar panels, combustion systems, etc.) and/or to optimize an amount of energy consumed by various types of energy consuming systems or devices (e.g., electronic circuitry, mechanical equipment, aerospace and land-based vehicles, building equipment, HVAC devices, refrigeration systems, etc.).

In various implementations, ESC can be used in any type of controller that functions to achieve a setpoint for a variable of interest (e.g., by minimizing a difference between a measured or calculated input and a setpoint) and/or optimize a variable of interest (e.g., maximize or minimize an output variable). It is contemplated that ESC can be readily implemented in various types of controllers (e.g., motor controllers, power controllers, fluid controllers, HVAC controllers, lighting controllers, chemical controllers, process controllers, etc.) and various types of control systems (e.g., closed-loop control systems, open-loop control systems, feedback control systems, feed-forward control systems, etc.). All such implementations should be considered within the scope of the present disclosure.

Referring particularly to FIG. 1, a perspective view of building 10 is shown. Building 10 is served by HVAC system 20. HVAC system 20 is shown to include a chiller 22, a boiler 24, a rooftop cooling unit 26, and a plurality of air-handling units (AHUs) 36. HVAC system 20 uses a fluid circulation system to provide heating and/or cooling for building 10. The circulated fluid can be cooled in chiller 22 or heated in boiler 24, depending on whether cooling or heating is required. Boiler 24 may add heat to the circulated fluid by burning a combustible material (e.g., natural gas). Chiller 22 may place the circulated fluid in a heat exchange relationship with another fluid (e.g., a refrigerant) in a heat exchanger (e.g., an evaporator). The refrigerant removes heat from the circulated fluid during an evaporation process, thereby cooling the circulated fluid.

The circulated fluid from chiller 22 or boiler 24 can be transported to AHUs 36 via piping 32. AHUs 36 may place the circulated fluid in a heat exchange relationship with an airflow passing through AHUs 36. For example, the airflow can be passed over piping in fan coil units or other air conditioning terminal units through which the circulated fluid flows. AHUs 36 may transfer heat between the airflow and the circulated fluid to provide heating or cooling for the airflow. The heated or cooled air can be delivered to building 10 via an air distribution system including air supply ducts 38 and may return to AHUs 36 via air return ducts 40. In FIG. 1, HVAC system 20 is shown to include a separate AHU 36 on each floor of building 10. In other embodiments, a single AHU (e.g., a rooftop AHU) may supply air for multiple floors or zones. The circulated fluid from AHUs 36 may return to chiller 22 or boiler 24 via piping 34.

In some embodiments, the refrigerant in chiller 22 is vaporized upon absorbing heat from the circulated fluid. The vapor refrigerant can be provided to a compressor within chiller 22 where the temperature and pressure of the refrigerant are increased (e.g., using a rotating impeller, a screw compressor, a scroll compressor, a reciprocating compressor, a centrifugal compressor, etc.). The compressed refrigerant can be discharged into a condenser within chiller 22. In some embodiments, water (or another chilled fluid) flows through tubes in the condenser of chiller 22 to absorb heat from the refrigerant vapor, thereby causing the refrigerant to condense. The water flowing through tubes in the condenser can be pumped from chiller 22 to a rooftop cooling unit 26 via piping 28. Cooling unit 26 may use fan driven cooling or fan driven evaporation to remove heat from the water. The cooled water in rooftop unit 26 can be delivered back to chiller 22 via piping 30 and the cycle repeats.

Referring now to FIG. 2, a block diagram illustrating a portion of HVAC system 20 in greater detail is shown, according to some embodiments. In FIG. 2, AHU 36 is shown as an economizer type air handling unit. Economizer type air handling units vary the amount of outside air and return air used by the air handling unit for heating or cooling. For example, AHU 36 may receive return air 82 from building 10 via return air duct 40 and may deliver supply air 86 to building 10 via supply air duct 38. AHU 36 can be configured to operate exhaust air damper 60, mixing damper 62, and outside air damper 64 to control an amount of outside air 80 and return air 82 that combine to form supply air 86. Any return air 82 that does not pass through mixing damper 62 can be exhausted from AHU 36 through exhaust damper 60 as exhaust air 84.

Each of dampers 60-64 can be operated by an actuator. As shown in FIG. 2, exhaust air damper 60 is operated by actuator 54, mixing damper 62 is operated by actuator 56, and outside air damper 64 is operated by actuator 58. Actuators 54-58 may communicate with an AHU controller 44 via a communications link 52. AHU controller 44 can be an economizer controller configured to use one or more control algorithms (e.g., state-based algorithms, ESC algorithms, PID control algorithms, model predictive control algorithms, etc.) to control actuators 54-58. Examples of ESC methods that can be used by AHU controller 44 are described in greater detail with reference to FIGS. 8-9.

Actuators 54-58 may receive control signals from AHU controller 44 and may provide feedback signals to AHU controller 44. Feedback signals may include, for example, an indication of a current actuator or damper position, an amount of torque or force exerted by the actuator, diagnostic information (e.g., results of diagnostic tests performed by actuators 54-58), status information, commissioning information, configuration settings, calibration data, and/or other types of information or data that can be collected, stored, or used by actuators 54-58.

Still referring to FIG. 2, AHU 36 is shown to include a cooling coil 68, a heating coil 70, and a fan 66. In some embodiments, cooling coil 68, heating coil 70, and fan 66 are positioned within supply air duct 38. Fan 66 can be configured to force supply air 86 through cooling coil 68 and/or heating coil 70. AHU controller 44 may communicate with fan 66 via communications link 78 to control a flow rate of supply air 86. Cooling coil 68 may receive a chilled fluid from chiller 22 via piping 32 and may return the chilled fluid to chiller 22 via piping 34. Valve 92 can be positioned along piping 32 or piping 34 to control an amount of the chilled fluid provided to cooling coil 68. Heating coil 70 may receive a heated fluid from boiler 24 via piping 32 and may return the heated fluid to boiler 24 via piping 34. Valve 94 can be positioned along piping 32 or piping 34 to control an amount of the heated fluid provided to heating coil 70.

Each of valves 92-94 can be controlled by an actuator. As shown in FIG. 2, valve 92 is controlled by actuator 88 and valve 94 is controlled by actuator 90. Actuators 88-90 may communicate with AHU controller 44 via communications links 96-98. Actuators 88-90 may receive control signals from AHU controller 44 and may provide feedback signals to controller 44. In some embodiments, AHU controller 44 receives a measurement of the supply air temperature from a temperature sensor 72 positioned in supply air duct 38 (e.g., downstream of cooling coil 68 and heating coil 70). However, temperature sensor 72 is not required and may not be included in some embodiments.

AHU controller 44 may operate valves 92-94 via actuators 88-90 to modulate an amount of heating or cooling provided to supply air 86 (e.g., to achieve a setpoint temperature for supply air 86 or to maintain the temperature of supply air 86 within a setpoint temperature range). The positions of valves 92-94 affect the amount of cooling or heating provided to supply air 86 by cooling coil 68 or heating coil 70 and may correlate with the amount of energy consumed to achieve a desired supply air temperature. In various embodiments, valves 92-94 can be operated by AHU controller 44 or a separate controller for HVAC system 20.

AHU controller 44 may monitor the positions of valves 92-94 via communications links 96-98. AHU controller 44 may use the positions of valves 92-94 as the variable to be optimized using an ESC control technique. AHU controller 44 may determine and/or set the positions of dampers 60-64 to achieve an optimal or target position for valves 92-94. The optimal or target position for valves 92-94 can be the position that corresponds to the minimum amount of mechanical heating or cooling used by HVAC system 20 to achieve a setpoint supply air temperature (e.g., minimum fluid flow through valves 92-94).

Still referring to FIG. 2, HVAC system 20 is shown to include a supervisory controller 42 and a client device 46. Supervisory controller 42 may include one or more computer systems (e.g., servers, BAS controllers, etc.) that serve as enterprise level controllers, application or data servers, head nodes, master controllers, or field controllers for HVAC system 20. Supervisory controller 42 may communicate with multiple downstream building systems or subsystems (e.g., an HVAC system, a security system, etc.) via a communications link 50 according to like or disparate protocols (e.g., LON, BACnet, etc.).

In some embodiments, AHU controller 44 receives information (e.g., commands, setpoints, operating boundaries, etc.) from supervisory controller 42. For example, supervisory controller 42 may provide AHU controller 44 with a high fan speed limit and a low fan speed limit. A low limit may avoid frequent component and power taxing fan start-ups while a high limit may avoid operation near the mechanical or thermal limits of the fan system. In various embodiments, AHU controller 44 and supervisory controller 42 can be separate (as shown in FIG. 2) or integrated. In an integrated implementation, AHU controller 44 can be a software module configured for execution by a processor of supervisory controller 42.

Client device 46 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 46 can be a computer workstation, a client terminal, a remote or local interface, or any other type of user interface device. Client device 46 can be a stationary terminal or a mobile device. For example, client device 46 can be a desktop computer, a computer server with a user interface, a laptop computer, a tablet, a smartphone, a PDA, or any other type of mobile or non-mobile device.

Extremum-Seeking Control Systems With Periodic Dither Signals

Figure 3:
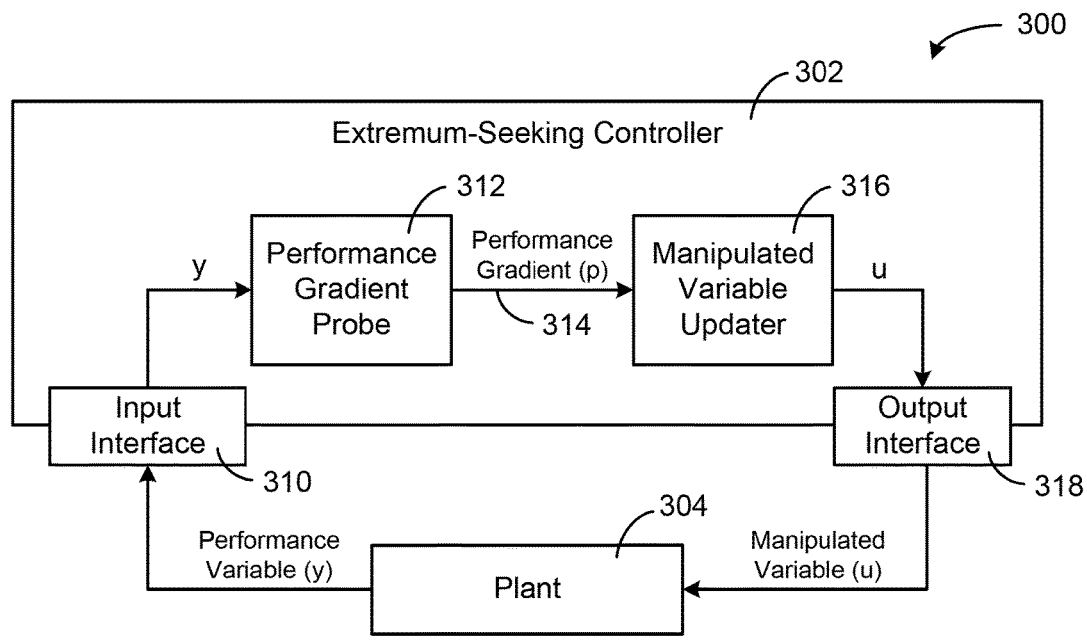
FIG. 3 is a block diagram of an extremum-seeking control system which uses a periodic dither signal to perturb a control input provided to a plant, according to some embodiments.

Referring now to FIG. 3, a block diagram of an extremum-seeking control (ESC) system 300 with a periodic dither signal is shown, according to some embodiments. ESC system 300 is shown to include an extremum-seeking controller 302 and a plant 304. A plant in control theory is the combination of a process and one or more mechanically-controlled outputs. For example, plant 304 can be an air handling unit configured to control temperature within a building space via one or more mechanically-controlled actuators and/or dampers. In various embodiments, plant 304 can include a chiller operation process, a damper adjustment process, a mechanical cooling process, a ventilation process, a refrigeration process, or any other process in which an input variable to plant 304 (i.e., manipulated variable u) is adjusted to affect an output from plant 304 (i.e., performance variable y).

Extremum-seeking controller 302 uses extremum-seeking control logic to modulate the manipulated variable u. For example, controller 302 may use a periodic (e.g., sinusoidal) perturbation signal or dither signal to perturb the value of manipulated variable u in order to extract a performance gradient p. The manipulated variable u can be perturbed by adding periodic oscillations to a DC value of the performance variable u, which may be determined by a feedback control loop. The performance gradient p represents the gradient or slope of the performance variable y with respect to the manipulated variable u. Controller 302 uses extremum-seeking control logic to determine a value for the manipulated variable u that drives the performance gradient p to zero.

Controller 302 may determine the DC value of manipulated variable u based on a measurement or other indication of the performance variable y received as feedback from plant 304 via input interface 310. Measurements from plant 304 can include, but are not limited to, information received from sensors about the state of plant 304 or control signals sent to other devices in the system. In some embodiments, the performance variable y is a measured or observed position of one of valves 92-94. In other embodiments, the performance variable y is a measured or calculated amount of power consumption, a fan speed, a damper position, a temperature, or any other variable that can be measured or calculated by plant 304. Performance variable y can be the variable that extremum-seeking controller 302 seeks to optimize via an extremum-seeking control technique. Performance variable y can be output by plant 304 or observed at plant 304 (e.g., via a sensor) and provided to extremum-seeking controller at input interface 310.

Input interface 310 provides the performance variable y to performance gradient probe 312 to detect the performance gradient 314. Performance gradient 314 may indicate a slope of the function $y = f(u)$, where y represents the performance variable received from plant 304 and u represents the manipulated variable provided to plant 304. When performance gradient 314 is zero, the performance variable y has an extremum value (e.g., a maximum or minimum). Therefore, extremum-seeking controller 302 can optimize the value of the performance variable y by driving performance gradient 314 to zero.

Manipulated variable updater 316 produces an updated manipulated variable u based upon performance gradient 314. In some embodiments, manipulated variable updater 316 includes an integrator to drive performance gradient 314 to zero. Manipulated variable updater 316 then provides an updated manipulated variable u to plant 304 via output interface 318. In some embodiments, manipulated variable u is provided to one of dampers 60-64 (FIG. 2) or an actuator affecting dampers 60-64 as a control signal via output interface 318. Plant 304 can use manipulated variable u as a setpoint to adjust the position of dampers 60-64 and thereby control the relative proportions of outdoor air 80 and recirculation air 83 provided to a temperature-controlled space.

Figure 4:
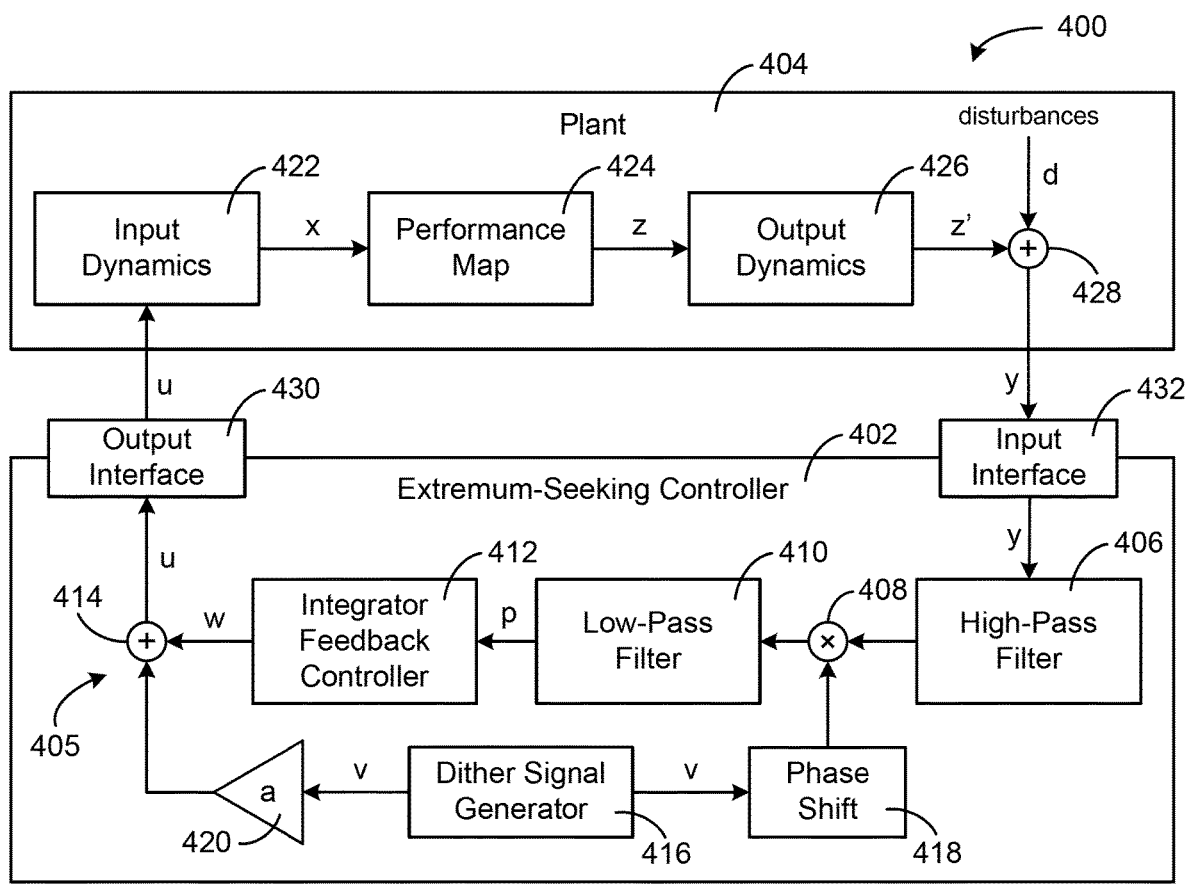
FIG. 4 is a block diagram of another extremum-seeking control system which uses a periodic dither signal to perturb a control input provided to a plant, according to some embodiments.

Referring now to FIG. 4, a block diagram of another ESC system 400 with a periodic dither signal is shown, according to some embodiments. ESC system 400 is shown to include a plant 404 and an extremum-seeking controller 402. Controller 402 uses an extremum-seeking control strategy to optimize a performance variable y received as an output from plant 404. Optimizing performance variable y can include minimizing y, maximizing y, controlling y to achieve a setpoint, or otherwise regulating the value of performance variable y.

Plant 404 can be the same as plant 304 or similar to plant 304, as described with reference to FIG. 3. For example, plant 404 can be a combination of a process and one or more mechanically-controlled outputs. In some embodiments, plant 404 is an air handling unit configured to control temperature within a building space via one or more mechanically-controlled actuators and/or dampers. In other embodiments, plant 404 can include a chiller operation process, a damper adjustment process, a mechanical cooling process, a ventilation process, or any other process that generates an output based on one or more control inputs.

Plant 404 can be represented mathematically as a combination of input dynamics 422, a performance map 424, output dynamics 426, and disturbances d. In some embodiments, input dynamics 422 are linear time-invariant (LTI) input dynamics and output dynamics 426 are LTI output dynamics. Performance map 424 can be a static nonlinear performance map. Disturbances d can include process noise, measurement noise, or a combination of both. Although the components of plant 404 are shown in FIG. 4, it should be noted that the actual mathematical model for plant 404 does not need to be known in order to apply ESC.

Plant 404 receives a control input u (e.g., a control signal, a manipulated variable, etc.) from extremum-seeking controller 402 via output interface 430. Input dynamics 422 may use the control input u to generate a function signal x based on the control input (e.g., $x=f(u)$). Function signal x may be passed to performance map 424 which generates an output signal z as a function of the function signal (i.e., $z=f(x)$). The output signal z may be passed through output dynamics 426 to produce signal z', which is modified by disturbances d to produce performance variable y (e.g., $y=z'+d$). Performance variable y is provided as an output from plant 404 and received at extremum-seeking controller 402. Extremum-seeking controller 402 may seek to find values for x and/or u that optimize the output z of performance map 424 and/or the performance variable y.

Still referring to FIG. 4, extremum-seeking controller 402 is shown receiving performance variable y via input interface 432 and providing performance variable y to a control loop 405 within controller 402. Control loop 405 is shown to include a high-pass filter 406, a demodulation element 408, a low-pass filter 410, an integrator feedback controller 412, and a dither signal element 414. Control loop 405 may be configured to extract a performance gradient p from performance variable y using a dither-demodulation technique. Integrator feedback controller 412 analyzes the performance gradient p and adjusts the DC value of the plant input (i.e., the variable w) to drive performance gradient p to zero.

The first step of the dither-demodulation technique is performed by dither signal generator 416 and dither signal element 414. Dither signal generator 416 generates a periodic dither signal v, which is typically a sinusoidal signal. Dither signal element 414 receives the dither signal v from dither signal generator 416 and the DC value of the plant input w from controller 412. Dither signal element 414 combines dither signal v with the DC value of the plant input w to generate the perturbed control input u provided to plant 404 (e.g., $u=w+v$). The perturbed control input u is provided to plant 404 and used by plant 404 to generate performance variable y as previously described.

The second step of the dither-demodulation technique is performed by high-pass filter 406, demodulation element 408, and low-pass filter 410. High-pass filter 406 filters the performance variable y and provides the filtered output to demodulation element 408. Demodulation element 408 demodulates the output of high-pass filter 406 by multiplying the filtered output by the dither signal v with a phase shift 418 applied. The DC value of this multiplication is proportional to the performance gradient p of performance variable y with respect to the control input u. The output of demodulation element 408 is provided to low-pass filter 410, which extracts the performance gradient p (i.e., the DC value of the demodulated output). The estimate of the performance gradient p is then provided to integrator feedback controller 412, which drives the performance gradient estimate p to zero by adjusting the DC value w of the plant input u.

Figure 6A:
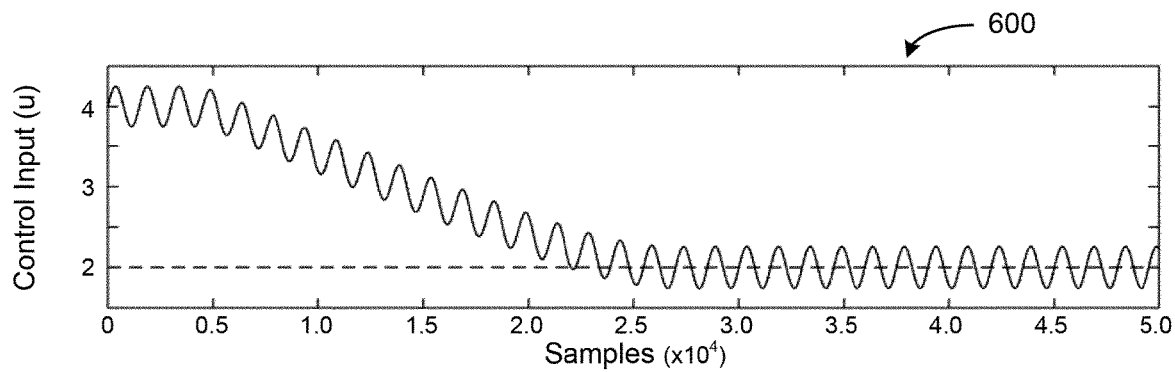
FIG. 6A is a graph of a control input provided to a plant, illustrating periodic oscillations caused by perturbing the control input with a periodic dither signal, according to some embodiments.
Figure 6B:
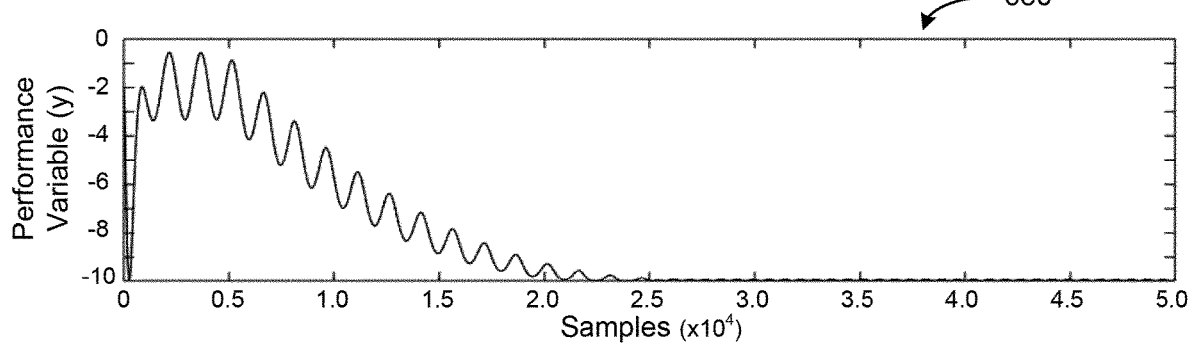
FIG. 6B is a graph of a performance variable received from the plant resulting from the perturbed control input shown in FIG. 6A, according to some embodiments.

Still referring to FIG. 4, extremum-seeking controller 402 is shown to include an amplifier 420. It may be desirable to amplify the dither signal v such that the amplitude of the dither signal v is large enough for the effects of dither signal v to be evident in the plant output y. The large amplitude of dither signal v can result in large variations in the control input u, even when the DC value w of the control input u remains constant. Graphs illustrating a control input u and a performance variable y with periodic oscillations caused by a periodic dither signal v are shown in FIGS. 6A-6B (described in greater detail below). Due to the periodic nature of the dither signal v, the large variations in the plant input u (i.e., the oscillations caused by the dither signal v) are often noticeable to plant operators.

Additionally, it may be desirable to carefully select the frequency of the dither signal v to ensure that the ESC strategy is effective. For example, it may be desirable to select a dither signal frequency $\omega_v$ based on the natural frequency $\omega_n$ of plant 304 to enhance the effect of the dither signal v on the performance variable y. It can be difficult and challenging to properly select the dither frequency $\omega_v$ without knowledge of the dynamics of plant 404. For these reasons, the use of a periodic dither signal v is one of the drawbacks of traditional ESC.

In ESC system 400, the output of high-pass filter 406 can be represented as the difference between the value of the performance variable y and the expected value of the performance variable y, as shown in the following equation:

Output of High-Pass Filter: $y-E[y]$ where the variable E[y] is the expected value of the performance variable y. The result of the cross-correlation performed by demodulation element 408 (i.e., the output of demodulation element 408) can be represented as the product of the high-pass filter output and the phase-shifted dither signal, as shown in the following equation:

Result of Cross-Correlation: $(y-E[y])(v-E[v])$ where the variable E[v] is the expected value of the dither signal v. The output of low-pass filter 410 can be represented as the covariance of the dither signal v and the performance variable y, as shown in the following equation:

Output of Low-Pass Filter: $E[(y-E[y])(v-E[u])]=\mathrm{Cov}(v,y)$ where the variable E[u] is the expected value of the control input u.

The preceding equations show that ESC system 400 generates an estimate for the covariance Cov(v,y) between the dither signal v and the plant output (i.e., the performance variable y). The covariance Cov(v,y) can be used in ESC system 400 as a proxy for the performance gradient p. For example, the covariance Cov(v,y) can be calculated by high-pass filter 406, demodulation element 408, and low-pass filter 410 and provided as a feedback input to integrator feedback controller 412. Integrator feedback controller 412 can adjust the DC value w of the plant input u in order to minimize the covariance Cov(v,y) as part of the feedback control loop.

Extremum-Seeking Control System with Stochastic Excitation Signal

Figure 5:
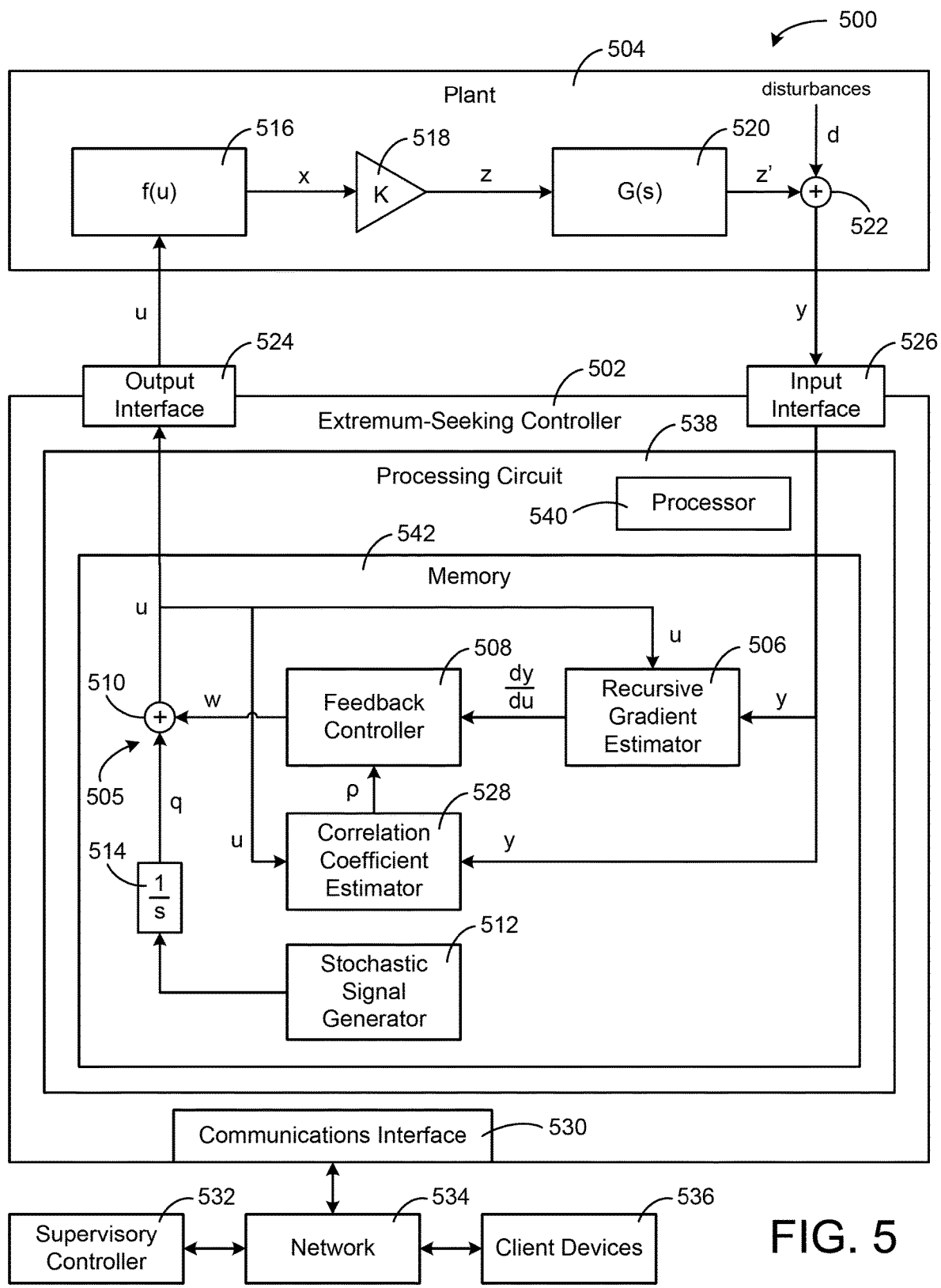
FIG. 5 is a block diagram of an extremum-seeking control system which uses a stochastic dither signal to perturb a control input provided to a plant and a recursive estimation technique to estimate a gradient or coefficient relating an output of the plant to the control input, according to some embodiments.

Referring now to FIG. 5, a block diagram of an ESC system 500 with a stochastic excitation signal is shown, according to some embodiments. ESC system 500 is shown to include a plant 504 and an extremum-seeking controller 502. Controller 502 is shown receiving a performance variable y as feedback from plant 504 via input interface 526 and providing a control input u to plant 504 via output interface 524. Controller 502 may operate in a manner similar to controllers 302 and 402, as described with reference to FIGS. 3-4. For example, controller 502 can use an extremum-seeking control (ESC) strategy to optimize the performance variable y received as an output from plant 504. However, rather than perturbing the control input u with a periodic dither signal, controller 502 may perturb the control input u with a stochastic excitation signal q. Controller 502 can adjust the control input u to drive the gradient of performance variable y to zero. In this way, controller 502 identifies values for control input u that achieve an optimal value (e.g., a maximum or a minimum) for performance variable y.

In some embodiments, the ESC logic implemented by controller 502 generates values for control input u based on a received control signal (e.g., a setpoint, an operating mode signal, etc.). The control signal may be received from a user control (e.g., a thermostat, a local user interface, etc.), client devices 536 (e.g., computer terminals, mobile user devices, cellular phones, laptops, tablets, desktop computers, etc.), a supervisory controller 532, or any other external system or device. In various embodiments, controller 502 can communicate with external systems and devices directly (e.g., using NFC, Bluetooth, WiFi direct, cables, etc.) or via a communications network 534 (e.g., a BACnet network, a LonWorks network, a LAN, a WAN, the Internet, a cellular network, etc.) using wired or wireless electronic data communications Plant 504 can be similar to plant 404, as described with reference to FIG. 4. For example, plant 504 can be a combination of a process and one or more mechanically-controlled outputs. In some embodiments, plant 504 is an air handling unit configured to control temperature within a building space via one or more mechanically-controlled actuators and/or dampers. In other embodiments, plant 404 can include a chiller operation process, a damper adjustment process, a mechanical cooling process, a ventilation process, or any other process that generates an output based on one or more control inputs.

Plant 504 can be represented mathematically as a static nonlinearity in series with a dynamic component. For example, plant 504 is shown to include a static nonlinear function block 516 in series with a constant gain block 518 and a transfer function block 520. Although the components of plant 504 are shown in FIG. 5, it should be noted that the actual mathematical model for plant 504 does not need to be known in order to apply ESC. Plant 504 receives a control input u (e.g., a control signal, a manipulated variable, etc.) from extremum-seeking controller 502 via output interface 524. Nonlinear function block 516 can use the control input u to generate a function signal x based on the control input (e.g., $x=f(u)$). Function signal x can be passed to constant gain block 518, which multiplies the function signal x by the constant gain K to generate the output signal z (i.e., $z=Kx$). The output signal z can be passed through transfer function block 520 to produce signal z', which is modified by disturbances d to produce performance variable y (e.g., $y=z'+d$). Disturbances d can include process noise, measurement noise, or a combination of both. Performance variable y is provided as an output from plant 504 and received at extremum-seeking controller 502.

Still referring to FIG. 5, controller 502 is shown to include a communications interface 530, an input interface 526, and an output interface 524. Interfaces 530 and 524-526 can include any number of jacks, wire terminals, wire ports, wireless antennas, or other communications interfaces for communicating information and/or control signals. Interfaces 530 and 524-526 can be the same type of devices or different types of devices. For example, input interface 526 can be configured to receive an analog feedback signal (e.g., an output variable, a measured signal, a sensor output, a controlled variable) from plant 504, whereas communications interface 530 can be configured to receive a digital setpoint signal from supervisory controller 532 via network 534. Output interface 524 can be a digital output (e.g., an optical digital interface) configured to provide a digital control signal (e.g., a manipulated variable, a control input) to plant 504. In other embodiments, output interface 524 is configured to provide an analog output signal.

In some embodiments interfaces 530 and 524-526 can be joined as one or two interfaces rather than three separate interfaces. For example, communications interface 530 and input interface 526 can be combined as one Ethernet interface configured to receive network communications from supervisory controller 532. In some embodiments, supervisory controller 532 provides both a setpoint and feedback via an Ethernet network (e.g., network 534). In such an embodiment, output interface 524 may be specialized for a controlled component of plant 504. In other embodiments, output interface 524 can be another standardized communications interface for communicating data or control signals. Interfaces 530 and 524-526 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 5, controller 502 is shown to include a processing circuit 538 having a processor 540 and memory 542. Processor 540 can be a general purpose or specific purpose processor, an application specific integrated circuit (ASIC), one or more field programmable gate arrays (FPGAs), a group of processing components, or other suitable processing components. Processor 540 is configured to execute computer code or instructions stored in memory 542 or received from other computer readable media (e.g., CDROM, network storage, a remote server, etc.).

Memory 542 can include one or more devices (e.g., memory units, memory devices, storage devices, etc.) for storing data and/or computer code for completing and/or facilitating the various processes described in the present disclosure. Memory 542 can include random access memory (RAM), read-only memory (ROM), hard drive storage, temporary storage, non-volatile memory, flash memory, optical memory, or any other suitable memory for storing software objects and/or computer instructions. Memory 542 can include database components, object code components, script components, or any other type of information structure for supporting the various activities and information structures described in the present disclosure. Memory 542 can be communicably connected to processor 540 via processing circuit 538 and can include computer code for executing (e.g., by processor 540) one or more processes described herein.

Still referring to FIG. 5, extremum-seeking controller 502 is shown receiving performance variable y via input interface 526 and providing performance variable y to a control loop 505 within controller 502. Control loop 505 is shown to include a recursive gradient estimator 506, a feedback controller 508, and an excitation signal element 510. Control loop 505 may be configured to determine the gradient $$\frac{dy}{du}$$

of the performance variable y with respect to the control input u and to adjust the DC value of the control input u (i.e., the variable w) to drive the gradient $$\frac{dy}{du}$$

to zero.

Recursive Gradient Estimation

Recursive gradient estimator 506 can be configured to estimate the gradient $$\frac{dy}{du}$$

of the performance variable y with respect to the control input u. The gradient $$\frac{dy}{du}$$

may be similar to the performance gradient p determined in ESC system 400. However, the fundamental difference between ESC system 500 and ESC system 400 is the way that the gradient $$\frac{dy}{du}$$

is obtained. In ESC system 400, the performance gradient p is obtained via the dither-demodulation technique described with reference to FIG. 4, which is analogous to covariance estimation. Conversely, the gradient $$\frac{dy}{du}$$

in ESC system 500 is obtained by performing a recursive regression technique to estimate the slope of the performance variable y with respect to the control input u. The recursive estimation technique may be performed by recursive gradient estimator 506.

Recursive gradient estimator 506 can use any of a variety of recursive estimation techniques to estimate the gradient $$\frac{dy}{du}.$$

For example, recursive gradient estimator 506 can use a recursive least-squares (RLS) estimation technique to generate an estimate of the gradient $$\frac{dy}{du}.$$

In some embodiments, recursive gradient estimator 506 uses exponential forgetting as part of the RLS estimation technique. Exponential forgetting reduces the required amount of data storage relative to batch processing. Exponential forgetting also allows the RLS estimation technique to remain more sensitive to recent data and thus more responsive to a shifting optimal point. An example a RLS estimation technique which can be performed recursive gradient estimator 506 is described in detail below.

Recursive gradient estimator 506 is shown receiving the performance variable y from plant 504 and the control input u from excitation signal element 510. In some embodiments, recursive gradient estimator 506 receives multiple samples or measurements of the performance variable y and the control input u over a period of time. Recursive gradient estimator 506 can use a sample of the control input u at time k to construct an input vector $x_k$ as shown in the following equation:

$$x_k = \begin{bmatrix} 1 \\ u_k \end{bmatrix}$$

where $u_k$ is the value of the control input u at time k. Similarly, recursive gradient estimator 506 can construct a parameter vector $\hat{\theta}_k$ as shown in the following equation:

$$\hat{\theta}_k = \begin{bmatrix} \hat{\theta}_1 \\ \hat{\theta}_2 \end{bmatrix}$$

where the parameter $\hat{\theta}_2$ is the estimate of the gradient $$\frac{dy}{du}$$

at time k.

Recursive gradient estimator 506 can estimate the performance variable $\hat{y}_k$ at time k using the following linear model:

$$\hat{y}_k = x_k^T \hat{\theta}_{k-1}$$

The prediction error of this model is the difference between the actual value of the performance variable $y_k$ at time k and the estimated value of the performance variable $\hat{y}_k$ at time k as shown in the following equation:

$$e_k = y_k - \hat{y}_k = y_k - x_k^T \hat{\theta}_{k-1}$$

Recursive gradient estimator 506 can use the estimation error $e_k$ in the RLS technique to determine the parameter values $\hat{\theta}_k$. Any of a variety of RLS techniques can be used in various implementations. An example of a RLS technique which can be performed by recursive gradient estimator 506 is as follows:

$$g_k = P_{k-1} x_k (\lambda + x_k^T P_{k-1} x_k)^{-1}$$

$$P_k = \lambda^{-1} P_{k-1} - g_k x_k^T \lambda^{-1} P_{k-1}$$

$$\hat{\theta}_k = \hat{\theta}_{k-1} + e_k g_k$$

where $g_k$ is a gain vector, $P_k$ is a covariance matrix, and $\lambda$ is a forgetting factor ($\lambda < 1$). In some embodiments, the forgetting factor $\lambda$ is defined as follows:

$$\lambda = e^{-\frac{\Delta t}{\tau}}$$

where $\Delta t$ is the sampling period and $\tau$ is the forgetting time constant.

Recursive gradient estimator 506 can use the equation for $g_k$ to calculate the gain vector $g_k$ at time k based on a previous value of the covariance matrix $P_{k-1}$ at time k−1, the value of the input vector $x_k^T$ at time k, and the forgetting factor. Recursive gradient estimator 506 can use the equation for $P_k$ to calculate the covariance matrix $P_k$ at time k based on the forgetting factor $\lambda$, the value of the gain vector $g_k$ at time k, and the value of the input vector $x_k^T$ at time k. Recursive gradient estimator 506 can use the equation for $\hat{\theta}_k$ to calculate the parameter vector $\hat{\theta}_k$ at time k based on the error $e_k$ at time k and the gain vector $g_k$ at time k. Once the parameter vector $\hat{\theta}_k$ is calculated, recursive gradient estimator 506 can determine the value of the gradient $$\frac{dy}{du}$$

by extracting the value of the $\hat{\theta}_2$ parameter from $\hat{\theta}_k$, as shown in the following equations:

$$\hat{\theta}_k = \begin{bmatrix} \hat{\theta}_1 \\ \hat{\theta}_2 \end{bmatrix}, \frac{dy}{du} = \hat{\theta}_2$$

In various embodiments, recursive gradient estimator 506 can use any of a variety of other recursive estimation techniques to estimate $$\frac{dy}{du}.$$

For example, recursive gradient estimator 506 can use a Kalman filter, a normalized gradient technique, an unnormalized gradient adaption technique, a recursive Bayesian estimation technique, or any of a variety of linear or nonlinear filters to estimate $$\frac{dy}{du}.$$

In other embodiments, recursive gradient estimator 506 can use a batch estimation technique rather than a recursive estimation technique. As such, gradient estimator 506 can be a batch gradient estimator rather than a recursive gradient estimator. In a batch estimation technique, gradient estimator 506 can use a batch of previous values for the control input u and the performance variable y (e.g., a vector or set of previous or historical values) as inputs to a batch regression algorithm. Suitable regression algorithms may include, for example, ordinary least squares regression, polynomial regression, partial least squares regression, ridge regression, principal component regression, or any of a variety of linear or nonlinear regression techniques.

In some embodiments, it is desirable for recursive gradient estimator 506 to use a recursive estimation technique rather than a batch estimation technique due to several advantages provided by the recursive estimation technique. For example, the recursive estimation technique described above (i.e., RLS with exponential forgetting) has been shown to greatly improve the performance of the gradient estimation technique relative to batch least-squares. In addition to requiring less data storage than batch processing, the RLS estimation technique with exponential forgetting can remain more sensitive to recent data and thus more responsive to a shifting optimal point.

In some embodiments, recursive gradient estimator 506 estimates the gradient $$\frac{dy}{du}$$

using the covariance between the control input u and the performance variable y. For example, the estimate of the slope $\hat{\beta}$ in a least-squares approach can be defined as:

$$\hat{\beta} = \frac{\text{Cov}(u, y)}{\text{Var}(u)}$$

where Cov(u,y) is the covariance between the control input u and the performance variable y, and Var(u) is the variance of the control input u. Recursive gradient estimator 506 can calculate the estimated slope $\hat{\beta}$ using the previous equation and use the estimated slope $\hat{\beta}$ as a proxy for the gradient $$\frac{dy}{du}.$$

Notably, the estimated slope $\hat{\beta}$ is a function of only the control input u and the performance variable y. This is different from the covariance derivation technique described with reference to FIG. 4 in which the estimated performance gradient p was a function of the covariance between the dither signal v and the performance variable y. By replacing the dither signal v with the control input u, controller 502 can generate an estimate for the slope $\hat{\beta}$ without any knowledge of the dither signal v (shown in FIG. 4) or the excitation signal q (shown in FIG. 5).

In some embodiments, recursive gradient estimator 506 uses a higher-order model (e.g., a quadratic model, a cubic model, etc.) rather than a linear model to estimate the performance variable $\hat{y}_k$. For example, recursive gradient estimator 506 can estimate the performance variable $\hat{y}_k$ at time k using the following quadratic model:

$$\hat{y}_k = \hat{\theta}_1 + \hat{\theta}_2 u_k + \hat{\theta}_3 u_k^2 + \epsilon_k$$

which can be written in the form $\hat{y}_k = x_k^T \hat{\theta}_{k,1}$ by updating the input vector $x_k$ and the parameter vector $\hat{\theta}_k$ as follows:

$$x_k = \begin{bmatrix} 1 \\ u_k \\ u_k^2 \end{bmatrix}$$

$$\hat{\theta}_k = \begin{bmatrix} \hat{\theta}_1 \\ \hat{\theta}_2 \\ \hat{\theta}_3 \end{bmatrix}$$

Recursive gradient estimator 506 can use the quadratic model to fit a quadratic curve (rather than a straight line) to the data points defined by combinations of the control input u and the performance variable y at various times k. The quadratic model provides second-order information not provided by the linear model and can be used to improve the convergence of feedback controller 508. For example, with a linear model, recursive gradient estimator 506 can calculate the gradient $$\frac{dy}{du}$$

at a particular location along the curve (i.e., for a particular value of the control input u) and can provide the gradient $$\frac{dy}{du}$$

as a feedback signal. For embodiments that use a linear model to estimate $\hat{y}_k$, the gradient $$\frac{dy}{du}$$

(i.e., the derivative of the linear model with respect to u) is a scalar value. When controller 508 receives a scalar value for the gradient $$\frac{dy}{du}$$

as a feedback signal, controller 508 can incrementally adjust the value of the control input u in a direction that drives the gradient $$\frac{dy}{du}$$

toward zero until the optimal value of the control input u is reached (i.e., the value of the control input u that results in the gradient $$\frac{dy}{du} = 0).$$

With a quadratic model, recursive gradient estimator 506 can provide feedback controller 508 with a function for the gradient $$\frac{dy}{du}$$

rather than a simple scalar value. For embodiments that use a quadratic model to estimate $\hat{y}_k$, the gradient $$\frac{dy}{du}$$

(i.e., the derivative of the quadratic model with respect to u) is a linear function of the control input u $$\left(e.g., \frac{dy}{du} = 2\hat{\theta}_3 u_k + \hat{\theta}_2\right).$$

When controller 508 receives a linear function for the gradient $$\frac{dy}{du}$$

as a feedback signal, controller 508 can analytically calculate the optimal value of the control input u that will result in the gradient $$\frac{dy}{du} = 0$$

$$\left(e.g., u_{k,opt} = -\frac{\hat{\theta}_2}{2\hat{\theta}_3}\right).$$

Accordingly, controller 508 can adjust the control input u using smart steps that rapidly approach the optimal value without relying on incremental adjustment and experimentation to determine whether the gradient $$\frac{dy}{du}$$

is moving toward zero.

Stochastic Excitation Signal

Still referring to FIG. 5, extremum-seeking controller 502 is shown to include a stochastic signal generator 512 and an integrator 514. In order to estimate the gradient $$\frac{dy}{du}$$

reliably, it may be desirable to provide sufficient variation in the control input u that carries through to the performance variable y. Controller 502 can use stochastic signal generator 512 and integrator 514 to generate a persistent excitation signal q. The excitation signal q can be added to the DC value w of the control input u at excitation signal element 510 to form the control input u (e.g., u=w+q).

Stochastic signal generator 512 can be configured to generate a stochastic signal. In various embodiments, the stochastic signal can be a random signal (e.g., a random walk signal, a white noise signal, etc.), a non-periodic signal, an unpredictable signal, a disturbance signal, or any other type of non-deterministic or non-repeating signal. In some embodiments, the stochastic signal has a non-zero mean. The stochastic signal can be integrated by integrator 514 to generate the excitation signal q.

Excitation signal q can provide variation in the control input u sufficient for the gradient estimation technique performed by recursive gradient estimator 506. In some instances, the addition of excitation signal q causes the control input u to drift away from its optimum value. However, feedback controller 508 can compensate for such drift by adjusting the DC value w such that the control input u is continuously pulled back toward its optimum value. As with traditional ESC, the magnitude of the excitation signal q can be selected (e.g., manually by a user or automatically by controller 502) to overcome any additive noise found in the performance variable y (e.g., process noise, measurement noise, etc.).

Figure 7A:
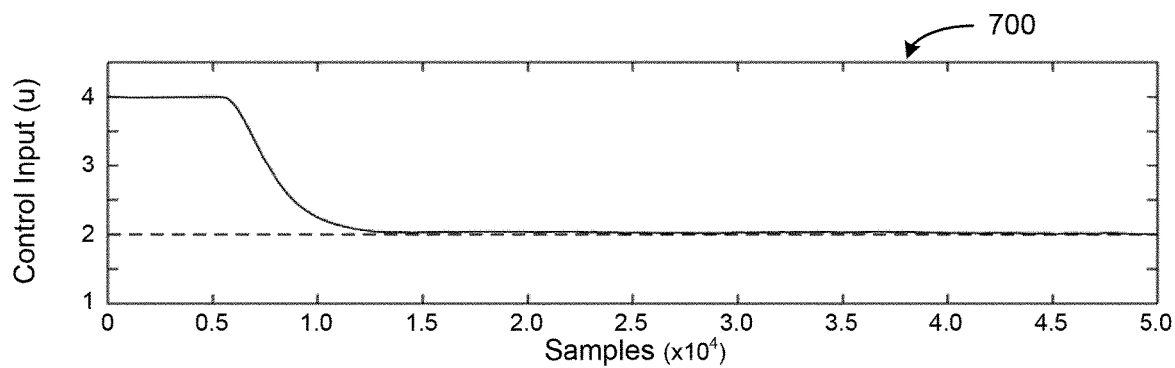
FIG. 7A is a graph of a control input provided to a plant when a stochastic excitation signal is used to perturb the control input, according to some embodiments.
Figure 7B:
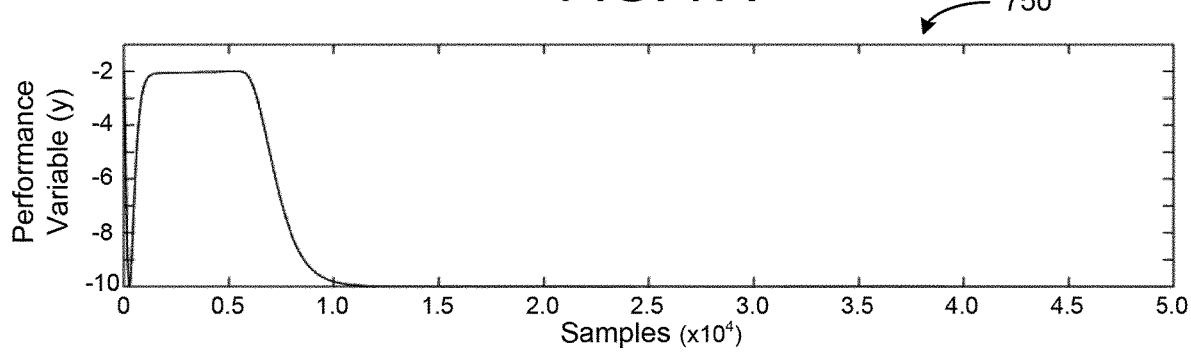
FIG. 7B is a graph of a performance variable received from the plant resulting from the perturbed control input shown in FIG. 7A, according to some embodiments.

The stochastic excitation signal q generated by extremum-seeking controller 502 has several advantages over the periodic dither signal v generated by controller 402. For example, the stochastic excitation signal q is less perceptible than a traditional periodic dither signal v. As such, the effects of the stochastic excitation signal q on the control input u are less noticeable than the periodic oscillations caused by the traditional periodic dither signal v. Graphs illustrating a control input u excited by the stochastic excitation signal q and the resulting performance variable y are shown in FIGS. 7A-7B (described in greater detail below).

Another advantage of the stochastic excitation signal q is that tuning controller 502 is simpler because the dither frequency $\omega_v$ is no longer a required parameter. Accordingly, controller 502 does not need to know or estimate the natural frequency of plant 504 when generating the stochastic excitation signal q. In some embodiments, extremum-seeking controller 502 provides multiple control inputs u to plant 504. Each of the control inputs can be excited by a separate stochastic excitation signal q. Since each of the stochastic excitation signals q is random, there is no need to ensure that the stochastic excitation signals q are not correlated with each other. Controller 502 can calculate the gradient $$\frac{dy}{du}$$

of the performance variable y with respect to each of the control inputs u without performing a frequency-specific dither-demodulation technique.

Correlation Coefficient

One of the problems with traditional ESC is that the performance gradient $$\frac{dy}{du}$$

is a function of the range or scale of the performance variable y. The range or scale of the performance variable y can depend on the static and dynamic components of plant 504. For example, plant 504 is shown to include a nonlinear function ƒ(u) (i.e., function block 516) in series with a constant gain K (i.e., constant gain block 518). It is apparent from this representation that the range or scale of the performance variable y is a function of the constant gain K.

The value of the performance gradient $$\frac{dy}{du}$$

may vary based on the value of the control input u due to the nonlinearity provided by the nonlinear function ƒ(u). However, the scale of the performance gradient $$\frac{dy}{du}$$

is also dependent upon the value of the constant gain K. For example, the performance gradient $$\frac{dy}{du}$$

can be determined using the following equation:

$$\frac{dy}{du} = Kf'(u)$$

where K is the constant gain and ƒ'(u) is the derivative of the function ƒ(u). It can be desirable to scale or normalize the performance gradient $$\frac{dy}{du}$$

(e.g., by multiplying by a scaling parameter κ) in order to provide consistent feedback control loop performance. However, without knowledge of the scale of the performance variable y (e.g., without knowing the constant gain K applied by plant 504), it can be challenging to determine an appropriate value for the scaling parameter κ.

Still referring to FIG. 5, extremum-seeking controller 502 is shown to include a correlation coefficient estimator 528. Correlation coefficient estimator 528 can be configured to generate a correlation coefficient ρ and provide the correlation coefficient ρ to feedback controller 508. The correlation coefficient ρ can be related to the performance gradient $$\frac{dy}{du}\left(\text{e.g., proportional to } \frac{dy}{du}\right)$$

but scaled based on the range of the performance variable y. For example, the correlation coefficient ρ can be a normalized measure of the performance gradient $$\frac{dy}{du}$$

(e.g., scaled to the range $0 \leq \rho \leq 1$).

Correlation coefficient estimator 528 is shown receiving the control input u and the performance variable y as inputs. Correlation coefficient estimator 528 can generate the correlation coefficient ρ based on the variance and covariance of the control input u and the performance variable y, as shown in the following equation:

$$\rho = \frac{\text{Cov}(u, y)}{\sqrt{\text{Var}(u)\text{Var}(y)}}$$

where Cov(u,y) is the covariance between the control input u and the performance variable y, Var(u) is the variance of the control input u, and Var(y) is the variance of the performance variable y. The previous equation can be rewritten in terms of the standard deviation $\sigma_u$ of the control input u and the standard deviation $\sigma_y$ of the performance variable y as follows:

$$\rho = \frac{\text{Cov}(u, y)}{\sigma_u \sigma_y}$$

where $\text{Var}(u) = \sigma_u^2$ and $\text{Var}(y) = \sigma_y^2$

In some embodiments, correlation coefficient estimator 528 estimates the correlation coefficient ρ using a recursive estimation technique. For example, correlation coefficient estimator 528 can calculate exponentially-weighted moving averages (EWMAs) of the control input u and the performance variable y using the following equations:

$$\bar{u}_k = \bar{u}_{k-1} + \frac{u_k - \bar{u}_{k-1}}{\min(k, W)}$$

$$\bar{y}_k = \bar{y}_{k-1} + \frac{y_k - \bar{y}_{k-1}}{\min(k, W)}$$

where $\bar{u}_k$ and $\bar{y}_k$ are the EWMAs of the control input u and the performance variable y at time k, $\bar{u}_{k-1}$ and $\bar{y}_{k-1}$ are the previous EWMAs of the control input u and the performance variable y at time k−1, $u_k$ and $y_k$ are the current values of the control input u and the performance variable y at time k, k is the total number of samples that have been collected of each variable, and W is the duration of the forgetting window.

Similarly, correlation coefficient estimator 528 can calculate EWMAs of the control input variance Var(u), the performance variable variance Var(y), and the covariance Cov(u,y) using the following equations:

$$V_{u,k} = V_{u,k-1} + \frac{(u_k - \bar{u}_k)^2 - V_{u,k-1}}{\min(k, W)}$$

$$V_{y,k} = V_{y,k-1} + \frac{(y_k - \bar{y}_k)^2 - V_{y,k-1}}{\min(k, W)}$$

$$c_k = c_{k-1} + \frac{(y_k - \bar{y}_k)(u_k - \bar{u}_k) - c_{k-1}}{\min(k, W)}$$

where $V_{u,k}$, $V_{y,k}$, and $c_k$ are the EWMAs of the control input variance Var(u), the performance variable variance Var(y), and the covariance Cov(u,y), respectively, at time k. $V_{u,k-1}$, $V_{y,k-1}$, and $c_{k-1}$ are the EWMAs of the control input variance Var(u), the performance variable variance Var(y), and the covariance Cov(u,y), respectively, at time k−1. Correlation coefficient estimator 528 can generate an estimate of the correlation coefficient ρ based on these recursive estimates using the following equation:

$$\hat{\rho}_k = \frac{c_k}{\sqrt{V_{u,k} V_{y,k}}}$$

In some embodiments, correlation coefficient estimator 528 generates the correlation coefficient ρ based on the estimated slope $\hat{\beta}$. As previously described, the estimated slope $\hat{\beta}$ can be calculated using the following equation:

$$\hat{\beta} = \frac{\text{Cov}(u, y)}{\text{Var}(u)} = \frac{\text{Cov}(u, y)}{\sigma_u^2}$$

where Cov(u,y) is the covariance between the control input u and the performance variable y, and Var(u) is the variance of the control input u (i.e., $\sigma_u^2$). Correlation coefficient estimator 528 can calculate the correlation coefficient ρ from the slope $\hat{\beta}$ using the following equation:

$$\rho = \hat{\beta} \frac{\sigma_u}{\sigma_y}$$

From the previous equation, it can be seen that the correlation coefficient ρ and the estimated slope $\hat{\beta}$ are equal when the standard deviations $\sigma_u$ and $\sigma_y$ are equal (i.e., when $\sigma_u = \sigma_y$).

Correlation coefficient estimator 528 can receive the estimated slope $\hat{\beta}$ from recursive gradient estimator 506 or calculate the estimated slope $\hat{\beta}$ using a set of values for the control input u and the performance variable y. For example, with the assumption of finite variance in u and y, correlation coefficient estimator 528 can estimate the slope $\hat{\beta}$ using the following least squares estimation:

$$\hat{\beta} = \left(\sum_{i=t-N}^{t} u_i u_i^T\right)^{-1} \left(\sum_{i=t-N}^{t} u_i y_i\right)$$

For a small range of the control input u, the estimated slope $\hat{\beta}$ can be used as a proxy for the performance gradient, as shown in the following equation:

$$\hat{\beta} = \frac{dy}{du}Kf'(u)$$

As shown in the previous equation, the estimated slope $\hat{\beta}$ contains the constant gain K, which may be unknown. However, normalization provided by the standard deviations $\sigma_u$ and $\sigma_y$ cancels the effect of the constant gain K. For example, the standard deviation $\sigma_y$ of the performance variable y is related to the standard deviation $\sigma_u$ of the control input u as shown in the following equations:

$$\sigma_y = K\sigma_u$$
$$\frac{\sigma_u}{\sigma_y} = \frac{1}{K}$$

Multiplying the estimated slope $\hat{\beta}$ by the ratio $$\frac{\sigma_u}{\sigma_y}$$

to calculate the correlation coefficient $\rho$ is equivalent to dividing by the constant gain K. Both the correlation coefficient $\rho$ and the estimated slope $\hat{\beta}$ indicate the strength of the relationship between the control input u and the performance variable y. However, the correlation coefficient $\rho$ has the advantage of being normalized which makes tuning the feedback control loop much simpler.

In some embodiments, the correlation coefficient $\rho$ is used by feedback controller 508 instead of the performance gradient $$\frac{dy}{du}.$$

For example, feedback controller 508 can adjust the DC value w of the control input u to drive the correlation coefficient $\rho$ to zero. One advantage of using the correlation coefficient $\rho$ in place of the performance gradient $$\frac{dy}{du}$$

is that the tuning parameters used by feedback controller 508 can be a general set of tuning parameters which do not need to be customized or adjusted based on the scale of the performance variable y. This advantage eliminates the need to perform control-loop-specific tuning for feedback controller 508 and allows feedback controller 508 to use a general set of tuning parameters that are applicable across many different control loops and/or plants.

Example Graphs

Referring now to FIGS. 6A-7B, several graphs 600-750 comparing the performance of extremum-seeking controller 402 and extremum-seeking controller 502 are shown, according to some embodiments. Controllers 402 and 502 were used to control a dynamic system that has an optimal control input value of u=2 and an optimal performance variable of y=−10. Both controllers 402 and 502 were started at a value of u=4 and allowed to adjust the value of the control input u using the extremum-seeking control techniques described with reference to FIGS. 4-5. Controller 402 uses a periodic dither signal v, whereas controller 502 uses a stochastic excitation signal q.

Referring particularly to FIGS. 6A-6B, graphs 600 and 650 illustrate the performance of extremum-seeking controller 402, as described with reference to FIG. 4. Controller 402 uses a periodic dither signal v to perturb the control input u. Graph 600 shows the value of the control input u at various sample times, whereas graph 650 shows corresponding value of the performance variable y. The control input u starts at a value of u=4 and is perturbed using a periodic (i.e., sinusoidal) dither signal v. The oscillatory perturbation caused by the periodic dither signal v is visible in both the control input u and the performance variable y.

Referring particularly to FIGS. 7A-7B, graphs 700 and 750 illustrate the performance of extremum-seeking controller 502, as described with reference to FIG. 5. Controller 502 uses a stochastic excitation signal q to perturb the control input u. Graph 700 shows the value of the control input u at various sample times, whereas graph 750 shows corresponding value of the performance variable y. The control input u starts at a value of u=4 and is perturbed using a stochastic excitation signal q. The stochastic excitation signal q applies a random walk to the control input u. However, since the stochastic excitation signal q is non-periodic and effective small amplitudes, the perturbation caused by the stochastic excitation signal q is barely discernable in graphs 700 and 750. Additionally, control input u in graph 700 reaches the optimal value quicker than the control input in graph 600.

Extremum-Seeking Control Techniques

Figure 8:
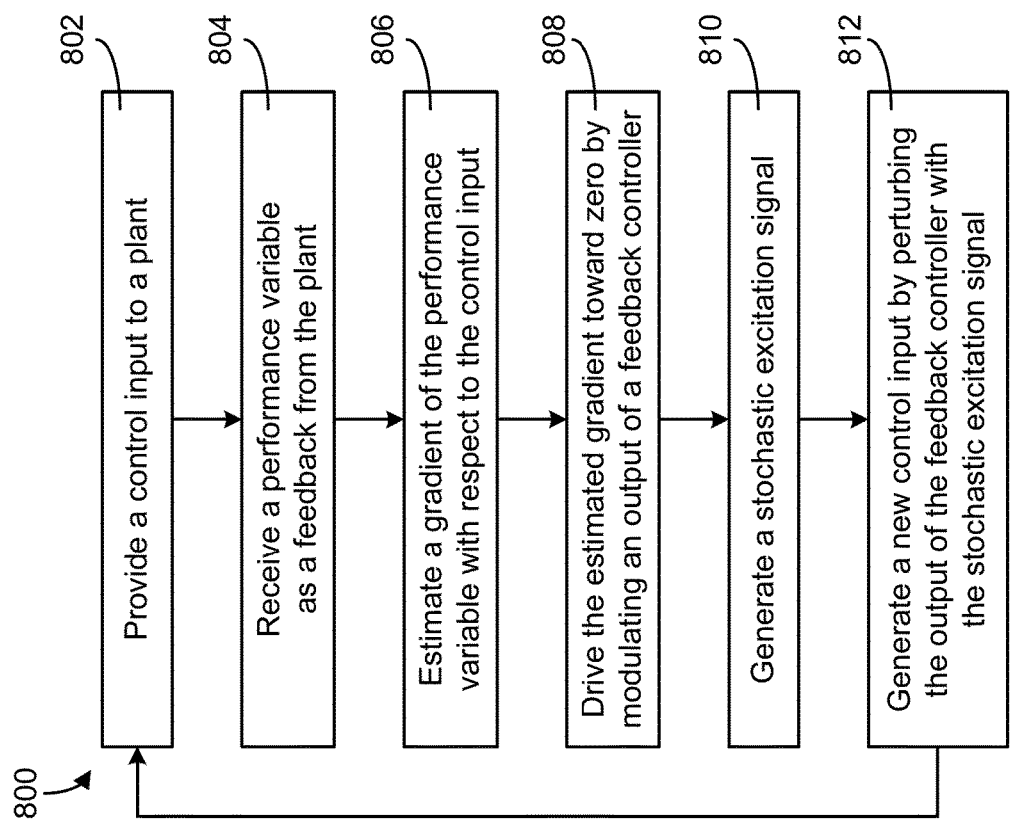
FIG. 8 is a flow diagram illustrating an extremum-seeking control technique in which a stochastic excitation signal is used to perturb a control input to a plant, according to some embodiments.

Referring now to FIG. 8, a flow diagram 800 illustrating an extremum-seeking control (ESC) technique is shown, according to some embodiments. The ESC technique shown in flow diagram 800 can be performed by one or more components of a feedback controller (e.g., controller 502) to monitor and control a plant (e.g., plant 504). For example, controller 502 can use the ESC technique to determine an optimal value of a control input u provided to plant 504 by perturbing the control input u with a stochastic excitation signal q.

Flow diagram 800 is shown to include providing a control input u to a plant (block 802) and receiving a performance variable y as a feedback from a plant (block 804). The control input u can be provided by an extremum-seeking controller and/or a feedback controller for the plant. The controller can be any of the controllers previously described (e.g., controller 302, controller 402, controller 502, etc.) or any other type of controller that provides a control input u to a plant. In some embodiments, the controller is an extremum-seeking controller configured to achieve an optimal value for the performance variable y by adjusting the control input u. The optimal value can be an extremum (e.g., a maximum or a minimum) of the performance variable y.

A plant in control theory is the combination of a process and one or more mechanically-controlled outputs. The plant can be any of the plants previously described (e.g., plant 304, plant 404, plant 504, etc.) or any other controllable system or process. For example, the plant can be an air handling unit configured to control temperature within a building space via one or more mechanically-controlled actuators and/or dampers. In various embodiments, the plant can include a chiller operation process, a damper adjustment process, a mechanical cooling process, a ventilation process, a refrigeration process, or any other process in which a control input u to the plant is adjusted to affect the performance variable y. The performance variable y can be a measured variable observed by one or more sensors of the plant (e.g., a measured temperature, a measured power consumption, a measured flow rate, etc.), a calculated variable based on measured or observed values (e.g., a calculated efficiency, a calculated power consumption, a calculated cost, etc.) or any other type of variable that indicates the performance of the plant in response to the control input u.

Flow diagram 800 is shown to include estimating a gradient of the performance variable y with respect to the control input u (block 806). In some embodiments, the gradient is the performance gradient p described with reference to FIG. 4. In other embodiments, the gradient can be the performance gradient $$\frac{dy}{du}$$

or the estimated slope $\hat{\beta}$ described with reference to FIG. 5. For example, the gradient can be a slope or derivative of a curve defined by the function y=f(u) at a particular location along the curve (e.g., at a particular value of u). The gradient can be estimated using one or more pairs of values for the control input u and the performance variable y.

In some embodiments, the gradient is estimated by performing a recursive gradient estimation technique. The recursive gradient estimation technique may include obtaining a model for the performance variable y as a function of the control input u. For example, the gradient can be estimated using the following linear model:

$$\hat{y}_k = x_k^T \hat{\theta}_{k-1}$$

where $x_k$ is an input vector and $\hat{\theta}_k$ is a parameter vector. The input vector $x_k$ and the parameter vector $\hat{\theta}_k$ can be defined as follows:

$$x_k = \begin{bmatrix} 1 \\ u_k \end{bmatrix} \quad \hat{\theta}_k = \begin{bmatrix} \hat{\theta}_1 \\ \hat{\theta}_2 \end{bmatrix}$$

where $u_k$ is the value of the control input u at time k and the parameter $\hat{\theta}_2$ is the estimate of the gradient $$\frac{dy}{du}$$

at time k.

The prediction error of this model is the difference between the actual value of the performance variable $y_k$ at time k and the estimated value of the performance variable $\hat{y}_k$ at time k as shown in the following equation:

$$e_k = y_k - \hat{y}_k = y_k - x_k^T \hat{\theta}_{k-1}$$

The estimation error $e_k$ can be used in the recursive gradient estimation technique to determine the parameter values $\hat{\theta}_k$. Any of a variety of regression techniques can be used to estimate values for the parameter vector $\hat{\theta}_k$.

In some embodiments, a higher-order model (e.g., a quadratic model, a cubic model, etc.) rather than a linear model can be used to estimate the gradient. For example, the following quadratic model can be used to estimate the gradient $$\frac{dy}{du}$$

at a particular location along the curve defined by the model:

$$\hat{y}_k = \hat{\theta}_1 + \hat{\theta}_2 u_k + \hat{\theta}_3 u_k^2 + \in_k$$

In some embodiments, the gradient is estimated using a recursive least squares (RLS) estimation technique with exponential forgetting. Any of a variety of RLS techniques can be used in various implementations. An example of a RLS technique which can be performed to estimate the gradient is shown in the following equations, which can be solved to determine the value for the parameter vector $\hat{\theta}_k$.

$$g_k = P_{k-1} x_k (\lambda + x_k^T P_{k-1} x_k)^{-1}$$

$$P_k = \lambda^{-1} P_{k-1} - g_k x_k^T \lambda^{-1} P_{k-1}$$

$$\hat{\theta}_k = \hat{\theta}_{k-1} + e_k g_k$$

where $g_k$ is a gain vector, $P_k$ is a covariance matrix, and $\lambda$ is a forgetting factor ($\lambda < 1$). In some embodiments, the forgetting factor $\lambda$ is defined as follows:

$$\lambda = e^{-\frac{\Delta t}{\tau}}$$

where $\Delta t$ is the sampling period and $\tau$ is the forgetting time constant. Once the parameter vector $\hat{\theta}_k$ is calculated, the gradient can be estimated by extracting the value of the $\hat{\theta}_2$ parameter from $\hat{\theta}_k$ In various embodiments, the gradient can be estimated using any of a variety of other recursive estimation techniques. For example, the gradient can be estimated using a Kalman filter, a normalized gradient technique, an unnormalized gradient adaption technique, a recursive Bayesian estimation technique, or any of a variety of linear or non-linear filters. In some embodiments, the gradient can be estimated using a batch estimation technique rather than a recursive estimation technique. In the batch estimation technique, a batch of previous values for the control input u and the performance variable y (e.g., a vector or set of previous or historical values) can be used as inputs to a batch regression algorithm. Suitable regression algorithms may include, for example, ordinary least squares regression, polynomial regression, partial least squares regression, ridge regression, principal component regression, or any of a variety of linear or nonlinear regression techniques.

In some embodiments, the gradient can be estimated using the covariance between the control input u and the performance variable y. For example, the estimate of the slope $\hat{\beta}$ in a least-squares approach can be defined as:

$$\hat{\beta} = \frac{\text{Cov}(u, y)}{\text{Var}(u)}$$

where Cov(u,y) is the covariance between the control input u and the performance variable y, and Var(u) is the variance of the control input u. The estimated slope $\hat{\beta}$ can be calculated using the previous equation and used as a proxy for the gradient $$\frac{dy}{du}.$$

Still referring to FIG. 8, flow diagram 800 is shown to include driving the estimated gradient toward zero by modulating an output of a feedback controller (block 808). In some embodiments, the feedback controller is feedback controller 508 shown in FIG. 5. The feedback controller can receive the estimated gradient as an input and can modulate its output (e.g., DC output w) to drive the estimated gradient toward zero. The feedback controller can increase or decrease the value of the DC output w until an optimum value for the DC output w is reached. The optimum value of the DC output w can be defined as the value which results in an optimum value (e.g., a maximum or minimum value) of the performance variable y. The optimum value of the performance variable y occurs when the gradient is zero. Accordingly, the feedback controller can achieve the optimum value of the performance variable y by modulating its output w to drive the gradient to zero.

Flow diagram 800 is shown to include generating a stochastic excitation signal q (block 810) and generating a new control input u by perturbing the output w of the feedback controller with the stochastic excitation signal q (block 812). The stochastic excitation signal q can be generated by stochastic signal generator 512 and/or integrator 514, as described with reference to FIG. 5. In various embodiments, the stochastic signal can be a random signal (e.g., a random walk signal, a white noise signal, etc.), a non-periodic signal, an unpredictable signal, a disturbance signal, or any other type of non-deterministic or non-repeating signal. In some embodiments, the stochastic signal has a non-zero mean. The stochastic signal can be integrated to generate the excitation signal q.

The stochastic excitation signal q can be added to the DC value w generated by the feedback controller to form the new control input u (e.g., u=w+q). After the new control input u is generated, the new control input u can be provided to the plant (block 802) and the ESC control technique can be repeated. The stochastic excitation signal q can provide variation in the control input u sufficient to estimate the performance gradient in block 806. In some instances, the addition of excitation signal q causes the control input u to drift away from its optimum value. However, the feedback controller can compensate for such drift by adjusting the DC value w such that the control input u is continuously pulled back toward its optimum value. As with traditional ESC, the magnitude of the excitation signal q can be selected (e.g., manually by a user or automatically by the controller) to overcome any additive noise found in the performance variable y (e.g., process noise, measurement noise, etc.).

The stochastic excitation signal q has several advantages over a periodic dither signal v. For example, the stochastic excitation signal q is less perceptible than a traditional periodic dither signal v. As such, the effects of the stochastic excitation signal q on the control input u are less noticeable than the periodic oscillations caused by the traditional periodic dither signal v. Another advantage of the stochastic excitation signal q is that tuning the controller is simpler because the dither frequency $\omega_v$ is no longer a required parameter. Accordingly, the controller does not need to know or estimate the natural frequency of the plant when generating the stochastic excitation signal q.

Figure 9:
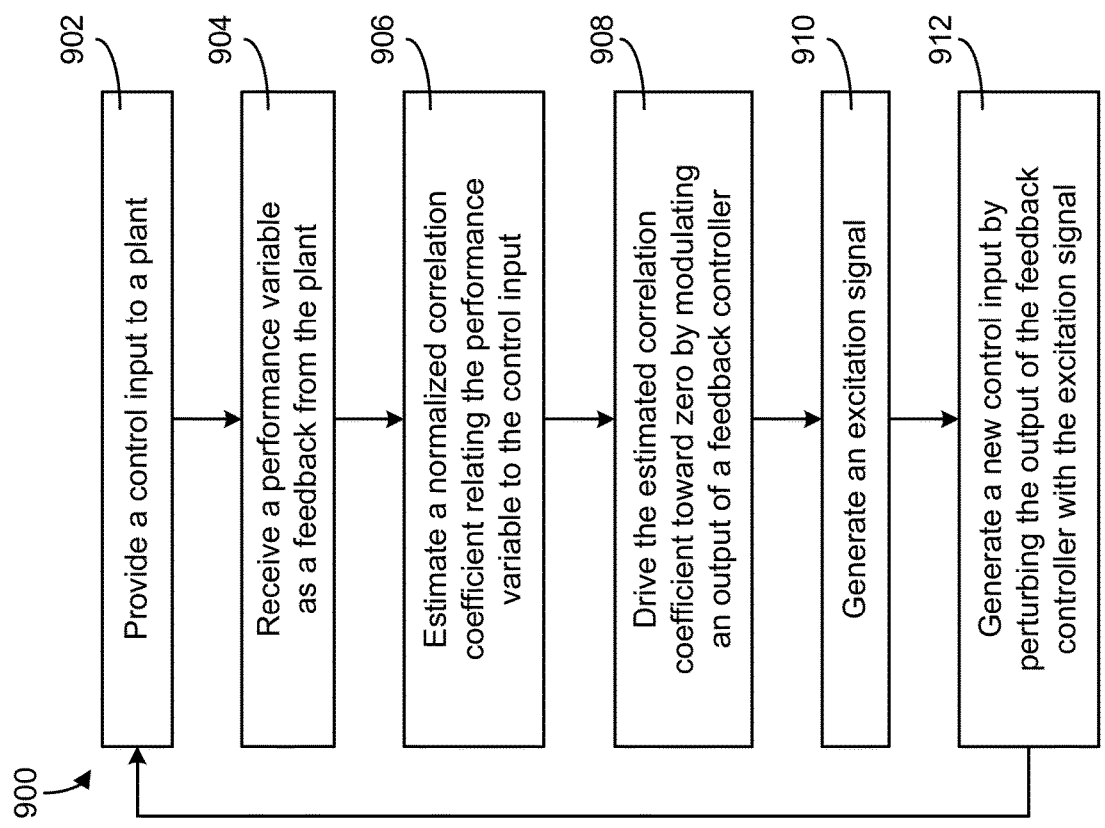
FIG. 9 is a flow diagram illustrating an extremum-seeking control technique in which normalized correlation coefficient is used to relate a performance variable received from the plant to a control input provided to the plant, according to some embodiments.

Referring now to FIG. 9, a flow diagram 900 illustrating another extremum-seeking control (ESC) technique is shown, according to some embodiments. The ESC technique shown in flow diagram 900 can be performed by one or more components of a feedback controller (e.g., controller 502) to monitor and control a plant (e.g., plant 504). For example, controller 502 can use the ESC technique to estimate a normalized correlation coefficient ρ relating an output of the plant (e.g., performance variable y) to a control input u provided to the plant. Controller 502 can determine an optimal value of the control input u by driving the normalized correlation coefficient ρ to zero.

Flow diagram 900 is shown to include providing a control input u to a plant (block 902) and receiving a performance variable y as a feedback from a plant (block 904). The control input u can be provided by an extremum-seeking controller and/or a feedback controller for the plant. The controller can be any of the controllers previously described (e.g., controller 302, controller 402, controller 502, etc.) or any other type of controller that provides a control input u to a plant. In some embodiments, the controller is an extremum-seeking controller configured to achieve an optimal value for the performance variable y by adjusting the control input u. The optimal value can be an extremum (e.g., a maximum or a minimum) of the performance variable y.

A plant in control theory is the combination of a process and one or more mechanically-controlled outputs. The plant can be any of the plants previously described (e.g., plant 304, plant 404, plant 504, etc.) or any other controllable system or process. For example, the plant can be an air handling unit configured to control temperature within a building space via one or more mechanically-controlled actuators and/or dampers. In various embodiments, the plant can include a chiller operation process, a damper adjustment process, a mechanical cooling process, a ventilation process, a refrigeration process, or any other process in which a control input u to the plant is adjusted to affect the performance variable y. The performance variable y can be a measured variable observed by one or more sensors of the plant (e.g., a measured temperature, a measured power consumption, a measured flow rate, etc.), a calculated variable based on measured or observed values (e.g., a calculated efficiency, a calculated power consumption, a calculated cost, etc.) or any other type of variable that indicates the performance of the plant in response to the control input u.

Flow diagram 900 is shown to include estimating a normalized correlation coefficient ρ relating the performance variable y to the control input u. The correlation coefficient ρ can be related to the performance gradient $$\frac{dy}{du}\left(\text{e.g., proportional to } \frac{dy}{du}\right)$$

but scaled based on the range of the performance variable y. For example, the correlation coefficient ρ can be a normalized measure of the performance gradient $$\frac{dy}{du}$$

(e.g., scaled to the range $0 \le \rho \le 1$).

In some embodiments, the correlation coefficient ρ can be estimated based on the variance and covariance of the control input u and the performance variable y, as shown in the following equation:

$$\rho = \frac{Cov(u, y)}{\sqrt{Var(u)Var(y)}}$$

where Cov(u,y) is the covariance between the control input u and the performance variable y, Var(u) is the variance of the control input u, and Var(y) is the variance of the performance variable y. The previous equation can be rewritten in terms of the standard deviation $\sigma_u$ of the control input u and the standard deviation $\sigma_y$ of the performance variable y as follows:

$$\rho = \frac{Cov(u, y)}{\sigma_u \sigma_y}$$

where $Var(u) = \sigma_u^2$ and $Var(y) = \sigma_y^2$

In some embodiments, the correlation coefficient ρ is estimated using a recursive estimation technique. The recursive estimation technique may include calculating exponentially-weighted moving averages (EWMAs) of the control input u and the performance variable y. For example, EWMAs of the control input u and the performance variable y can be calculated using the following equations:

$$\bar{u}_k = \bar{u}_{k-1} + \frac{u_k - \bar{u}_{k-1}}{\min(k, W)}$$

$$\bar{y}_k = \bar{y}_{k-1} + \frac{y_k - \bar{y}_{k-1}}{\min(k, W)}$$

where $\bar{u}_k$ and $\bar{y}_k$ are the EWMAs of the control input u and the performance variable y at time k, $\bar{u}_{k-1}$ and $\bar{y}_{k-1}$ are the previous EWMAs of the control input u and the performance variable y at time k−1, $u_k$ and $y_k$ are the current values of the control input u and the performance variable y at time k, k is the total number of samples that have been collected of each variable, and W is the duration of the forgetting window.

EWMAs can also be calculated for the control input variance Var(u), the performance variable variance Var(y), and the covariance Cov(u,y) using the following equations:

$$V_{u,k} = V_{u,k-1} + \frac{(u_k - \bar{u}_k)^2 - V_{u,k-1}}{\min(k, W)}$$

$$V_{y,k} = V_{y,k-1} + \frac{(y_k - \bar{y}_k)^2 - V_{y,k-1}}{\min(k, W)}$$

$$c_k = c_{k-1} + \frac{(y_k - \bar{y}_k)(u_k - \bar{u}_k) - c_{k-1}}{\min(k, W)}$$

where $V_{u,k}$, $V_{y,k}$, and $c_k$ are the EWMAs of the control input variance Var(u), the performance variable variance Var(y), and the covariance Cov(u,y), respectively, at time k. $V_{u,k-1}$, $V_{y,k-1}$, and $c_{k-1}$ are the EWMAs of the control input variance Var(u), the performance variable variance Var(y), and the covariance Cov(u,y), respectively, at time k−1. The correlation coefficient ρ can be estimated based on these recursive estimates using the following equation:

$$\hat{\rho}_k = \frac{c_k}{\sqrt{V_{u,k} V_{y,k}}}$$

In some embodiments, the correlation coefficient ρ is estimated based on the estimated slope $\hat{\beta}$. As previously described, the estimated slope $\hat{\beta}$ can be calculated using the following equation:

$$\hat{\beta} = \frac{Cov(u, y)}{Var(u)} = \frac{Cov(u, y)}{\sigma_u^2}$$

where Cov(u,y) is the covariance between the control input u and the performance variable y, and Var(u) is the variance of the control input u (i.e., $\sigma_u^2$). The correlation coefficient ρ can be calculated from the slope $\hat{\beta}$ using the following equation:

$$\rho = \hat{\beta} \frac{\sigma_u}{\sigma_y}$$

From the previous equation, it can be seen that the correlation coefficient ρ and the estimated slope $\hat{\beta}$ are equal when the standard deviations $\sigma_u$ and $\sigma_y$ are equal (i.e., when $\sigma_u = \sigma_y$).

In some embodiments, the estimated slope $\hat{\beta}$ can be calculated using a set of values for the control input u and the performance variable y. For example, with the assumption of finite variance in u and y, the slope $\hat{\beta}$ can be estimated using the following least squares estimation:

$$\hat{\beta} = \left( \sum_{i=t-N}^{t} u_i u_i^T \right)^{-1} \left( \sum_{i=t-N}^{t} u_i y_i \right)$$

For a small range of the control input u, the estimated slope $\hat{\beta}$ can be used as a proxy for the performance gradient, as shown in the following equation:

$$\hat{\beta} = \frac{dy}{du} = Kf'(u)$$

As shown in the previous equation, the estimated slope $\hat{\beta}$ contains the constant gain K, which may be unknown. However, normalization provided by the standard deviations $\sigma_u$ and $\sigma_y$ cancels the effect of the constant gain K. For example, the standard deviation $\sigma_y$ of the performance variable y is related to the standard deviation $\sigma_u$ of the control input u as shown in the following equations:

$$\sigma_y = K\sigma_u$$

$$\frac{\sigma_u}{\sigma_y} = \frac{1}{K}$$

Multiplying the estimated slope $\hat{\beta}$ by the ratio $$\frac{\sigma_u}{\sigma_y}$$

to calculate the correlation coefficient ρ is equivalent to dividing by the constant gain K. Both the correlation coefficient ρ and the estimated slope $\hat{\beta}$ indicate the strength of the relationship between the control input u and the performance variable y. However, the correlation coefficient ρ has the advantage of being normalized which makes tuning the feedback control loop much simpler.

Still referring to FIG. 9, flow diagram 900 is shown to include driving the estimated correlation coefficient ρ toward zero by modulating an output of a feedback controller (block 908). In some embodiments, the feedback controller is feedback controller 508 shown in FIG. 5. The feedback controller can receive the estimated correlation coefficient ρ as an input and can modulate its output (e.g., DC output w) to drive the estimated correlation coefficient ρ toward zero. The feedback controller can increase or decrease the value of the DC output w until an optimum value for the DC output w is reached. The optimum value of the DC output w can be defined as the value which results in an optimum value (e.g., a maximum or minimum value) of the performance variable y. The optimum value of the performance variable y occurs when the gradient is zero. Accordingly, the feedback controller can achieve the optimum value of the performance variable y by modulating its output w to drive the estimated correlation coefficient ρ to zero.

Flow diagram 900 is shown to include generating an excitation signal (block 910) and generating a new control input u by perturbing the output w of the feedback controller with the excitation signal (block 912). In various embodiments, the excitation signal can be a periodic dither signal v as described with reference to FIGS. 3-4 or a stochastic excitation signal q as described with reference to FIG. 5. The excitation signal can be added to the DC value w generated by the feedback controller to form the new control input u (e.g., u=w+q or u=w+v). After the new control input u is generated, the new control input u can be provided to the plant (block 902) and the ESC control technique can be repeated.

The excitation signal can provide variation in the control input u sufficient to estimate the correlation coefficient ρ in block 906. In some instances, the addition of the excitation signal causes the control input u to drift away from its optimum value. However, the feedback controller can compensate for such drift by adjusting the DC value w such that the control input u is continuously pulled back toward its optimum value. The magnitude of the excitation signal can be selected (e.g., manually by a user or automatically by the controller) to overcome any additive noise found in the performance variable y (e.g., process noise, measurement noise, etc.).

Example Implementations

Referring now to FIGS. 10A-16C several example implementations of the extremum seeking control systems and methods of the present disclosure are shown. The implementations shown in FIGS. 10A-16C illustrate various embodiments of plant 504 which can be controlled by extremum seeking controller 502, the control input(s) u which can be provided to plant 504 by extremum seeking controller 502, and the performance variable(s) y which can be received as feedback from plant 504 by extremum seeking controller 502.

Chilled Water Plant 1000

Figure 10A:
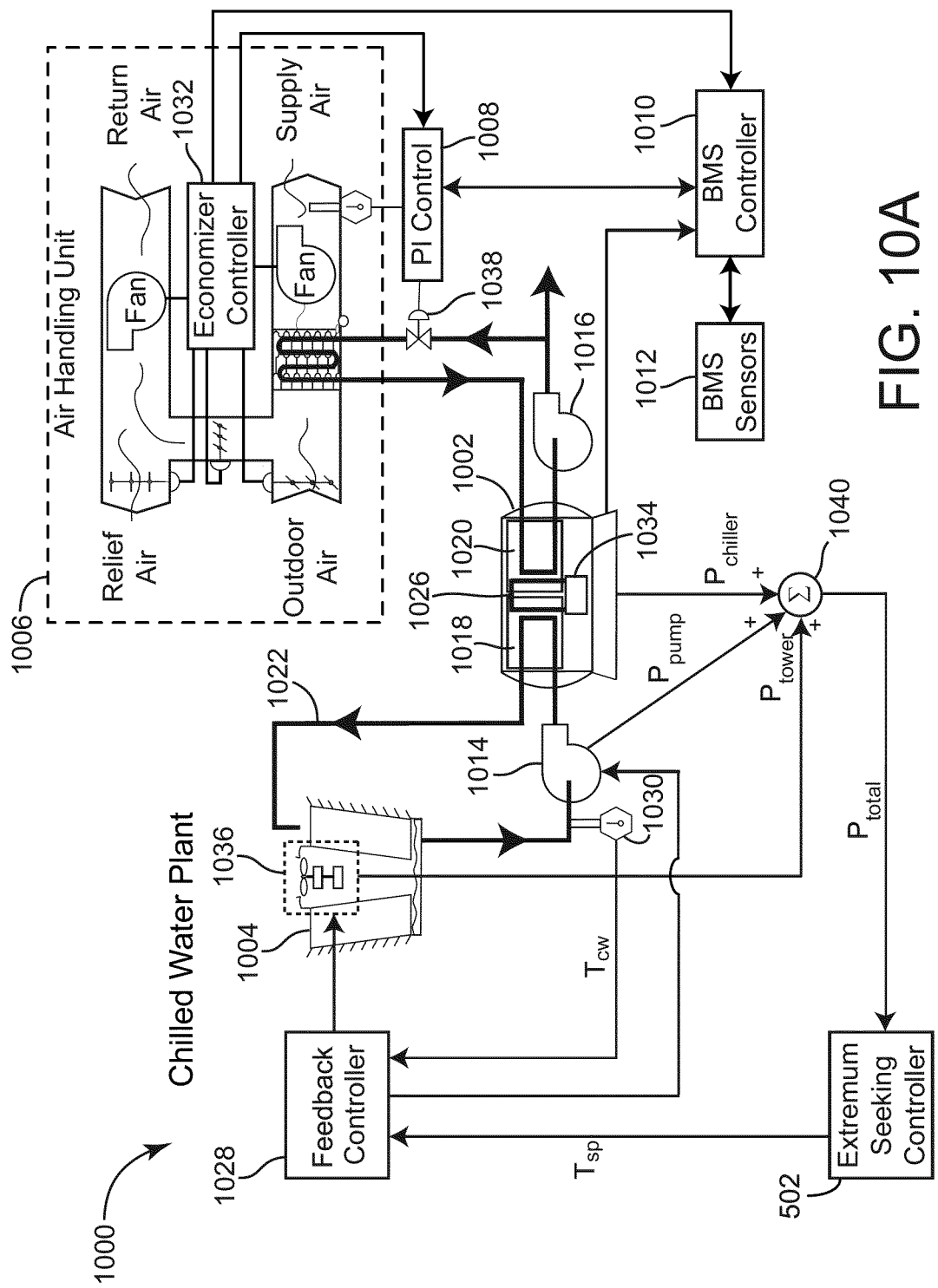
FIG. 10A is a block diagram of a chilled water plant in which the systems and methods of the present disclosure can be implemented, according to some embodiments.

Referring particularly to FIG. 10A, a chilled water plant 1000 is shown, according to some embodiments. Chilled water plant 1000 is shown to include a chiller 1002, a cooling tower 1004, and an air handling unit (AHU) 1006. Chiller 1002 includes a condenser 1018, an evaporator 1020, and a compressor 1034. Compressor 1034 is configured to circulate a refrigerant between condenser 1018 and evaporator 1020 via a refrigerant loop 1026. Chiller 1002 also includes at least one expansion valve on refrigerant loop 1026 between condenser 1018 and evaporator 1020. Chiller 1002 operates using a vapor compression refrigeration cycle in which the refrigerant in refrigerant loop 1026 absorbs heat in evaporator 1020 and rejects heat in condenser 1018. Chiller 1002 can include any number of sensors, control valves, and/or other components that assist the refrigeration cycle operation of chiller 1002.

Chiller 1002 is connected with cooling tower 1004 by a condenser water loop 1022. A water pump 1014 located along condenser water loop 1022 circulates condenser water between cooling tower 1004 and chiller 1002 via condenser water loop 1022. Pump 1014 can be a fixed speed pump or a variable speed pump. Condenser water loop 1022 circulates the condenser water through condenser 1018 where the condenser water absorbs heat from the refrigerant in refrigeration loop 1026. The heated condenser water is then delivered to cooling tower 1004 where the condenser water rejects heat to the ambient environment. A cooling tower fan system 1036 provides airflow through cooling tower 1004 to facilitate cooling the condenser water within cooling tower 1004. The cooled condenser water is then pumped back to chiller 1002 by pump 1014.

Chiller 1002 is connected with AHU 1006 via a chilled fluid loop 1024. A chilled fluid pump 1016 located along chilled fluid loop 1024 circulates a chilled fluid between chiller 1002 and AHU 1006. Pump 1016 can be a fixed speed pump or a variable speed pump. Chilled fluid loop 1024 circulates the chilled fluid through evaporator 1020 where the chilled fluid rejects heat to the refrigerant in refrigeration loop 1026. The chilled fluid is then delivered to AHU 1006 where the chilled fluid absorbs heat from the supply air passing through AHU 1006, thereby providing cooling for the supply air. The heated fluid is then pumped back to chiller 1002 by pump 1016.

In the embodiment shown in FIG. 10A, AHU 1006 is shown as an economizer type air handling unit. Economizer type AHUs vary the amount of outdoor air and return air used by the AHU for cooling. AHU 1006 is shown to include economizer controller 1032 that utilizes one or more algorithms (e.g., state based algorithms, extremum seeking control algorithms, etc.) to affect the actuators and dampers or fans of AHU 1006. The flow of chilled fluid supplied to AHU 1006 can also be variably controlled. For example, PI control 1008 is shown controlling a valve 1038 that regulates the flow of the chilled fluid to AHU 1006. PI control 1008 can control the chilled fluid flow to AHU 1006 to achieve a setpoint supply air temperature. Economizer controller 1032, a controller for chiller 1002, and PI control 1008 can be supervised by one or more building management system (BMS) controllers 1010.

A BMS controller is, in general, a computer-based system configured to control, monitor, and manage equipment in or around a building or building area. A BMS controller can include a METASYS® brand building controller or other devices sold by Johnson Controls, Inc. BMS controller 1010 can provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices. For example, BMS controller 1010 can provide a web-based graphical user interface that allows a user to set a desired setpoint temperature for a building space. BMS controller 1010 can use BMS sensors 1012 (connected to BMS controller 1010 via a wired or wireless BMS or IT network) to determine if the setpoint temperatures for the building space are being achieved. BMS controller 1010 can use such determinations to provide commands to PI control 1008, chiller 1002, economizer controller 1032, or other components of the building's HVAC system.

In some embodiments, extremum seeking controller 502 does not receive control commands from BMS controller 1010 or does not base its output calculations on an input from BMS controller 1010. In other embodiments, extremum seeking controller 502 receives information (e.g., commands, setpoints, operating boundaries, etc.) from BMS controller 1010. For example, BMS controller 1010 can provide extremum seeking controller 502 with a high fan speed limit and a low fan speed limit. A low limit may avoid frequent component and power taxing fan start-ups while a high limit can avoid operation near the mechanical or thermal limits of the fan system.

Extremum seeking controller 502 is shown receiving a power input $P_{total}$ representing the total power consumed by cooling tower fan system 1036 $P_{tower}$, condenser water pump 1014 $P_{pump}$, and the compressor 1034 of chiller 1002 $P_{chiller}$ (i.e. $P_{total}=P_{tower}+P_{pump}+P_{chiller}$) As illustrated in FIG. 10A, the power inputs $P_{tower}$, $P_{pump}$, and $P_{chiller}$ can be summed outside of extremum seeking controller 502 at summing block 1040 to provide a combined signal representative of the total power $P_{total}$. In other embodiments, extremum seeking controller 502 receives the individual power inputs $P_{tower}$, $P_{pump}$, and $P_{chiller}$ and conducts the summation of summing block 1040. In either case, extremum seeking controller 502 can be said to receive the power inputs $P_{tower}$, $P_{pump}$, and $P_{chiller}$ even if the power inputs are provided as a single summed or combined signal $P_{total}$ representing the total system power.

In some embodiments, the total system power $P_{total}$ is the performance variable which extremum seeking controller 502 seeks to optimize (e.g., minimize). The total system power $P_{total}$ can include the power consumption of one or more components of chilled water plant 1000. In the embodiment shown in FIG. 10A, the total system power $P_{total}$ includes $P_{tower}$, $P_{pump}$, and $P_{chiller}$. However, in various other embodiments, the total system power $P_{total}$ can include any combination of power inputs. For example, the total system power $P_{total}$ can include the power consumption of the fans within AHU 1006, the power consumption of chilled fluid pump 1016, and/or any other power consumption that occurs within chilled water plant 1000.

Extremum seeking controller 502 is shown providing a temperature setpoint $T_{sp}$ to a feedback controller 1028. In some embodiments, the temperature setpoint $T_{sp}$ is the manipulated variable which extremum seeking controller 502 adjusts to affect the total system power $P_{total}$. The temperature setpoint $T_{sp}$ is a setpoint for the temperature of the condenser water $T_{cw}$ provided to chiller 1002 from cooling tower 1004. The condenser water temperature $T_{cw}$ can be measured by a temperature sensor 1030 located along condenser water loop 1022 between cooling tower 1004 and chiller 1002 (e.g., upstream or downstream of pump 1014). Feedback controller 1028 is shown receiving the condenser water temperature $T_{cw}$ as a feedback signal.

Feedback controller 1028 can operate cooling tower fan system 1036 and/or condenser water pump 1014 to achieve the temperature setpoint $T_{sp}$ provided by extremum seeking controller 502. For example, feedback controller 1028 can increase the speed of condenser water pump 1014 to increase the amount of heat removed from the refrigerant in condenser 1018 or decrease the speed of condenser water pump 1014 to decrease the amount of heat removed from the refrigerant in condenser 1018. Similarly, feedback controller 1028 can increase the speed of cooling tower fan system 1036 to increase the amount of heat removed from the condenser water by cooling tower 1004 or decrease the speed of cooling tower fan system 1036 to decrease the amount of heat removed from the condenser water by cooling tower 1004.

Extremum seeking controller 502 implements an extremum seeking control strategy that dynamically searches for an unknown input (e.g., optimal condenser water temperature setpoint $T_{sp}$) to obtain system performance (e.g., total power consumption $P_{total}$) that trends near optimal. Although feedback controller 1028 and extremum seeking controller 502 are shown as separate devices, it is contemplated that feedback controller 1028 and extremum seeking controller 502 can be combined into a single device in some embodiments (e.g., a single controller that performs the functions of both extremum seeking controller 502 and feedback controller 1028). For example, extremum seeking controller 502 can be configured to control cooling tower fan system 1036 and condenser water pump 1014 directly without requiring an intermediate feedback controller 1028.

Referring now to FIGS. 10B and 10C, a pair of flow diagrams 1050 and 1070 illustrating the operation of extremum controller 502 in chilled water plant 1000 are shown, according to some embodiments. In both flow diagrams 1050 and 1070, extremum seeking controller 502 provides a temperature setpoint $T_{sp}$ to a feedback controller 1028 that operates to control condenser water temperature $T_{cw}$ in a chilled water plant 1000 (blocks 1052 and 1072). Extremum seeking controller 502 can receive a total power consumption $P_{total}$ of the chilled water plant 1000 as a feedback signal (blocks 1054 and 1074).

In flow diagram 1050, extremum seeking controller 502 estimates a gradient of the total power consumption $P_{total}$ with respect to the condenser water temperature setpoint $T_{sp}$ (block 1056). Extremum seeking controller 502 can provide control over the chilled water plant 1000 by driving the obtained gradient toward zero by modulating the temperature setpoint $T_{sp}$ (block 1058). In some embodiments, extremum seeking controller 502 generates a stochastic excitation signal (block 1060) and uses the stochastic excitation signal to generate a new condenser water temperature setpoint $T_{sp}$. For example, extremum seeking controller 502 can generate the new temperature setpoint $T_{sp}$ by perturbing the condenser water temperature setpoint $T_{sp}$ with the stochastic excitation signal (block 1062).

In flow diagram 1070, extremum seeking controller 502 estimates a normalized correlation coefficient relating the total power consumption $P_{total}$ to the condenser water temperature setpoint $T_{sp}$ (block 1076). Extremum seeking controller 502 can provide control over the chilled water plant 1000 by driving the estimated correlation coefficient toward zero by modulating the temperature setpoint $T_{sp}$ (block 1078). In some embodiments, extremum seeking controller 502 generates an excitation signal (block 1080) and uses the excitation signal to generate a new condenser water temperature setpoint $T_{sp}$. For example, extremum seeking controller 502 can generate the new temperature setpoint $T_{sp}$ by perturbing the condenser water temperature setpoint $T_{sp}$ with the excitation signal (block 1082).

Chilled Water Plant 1100

Figure 11A:
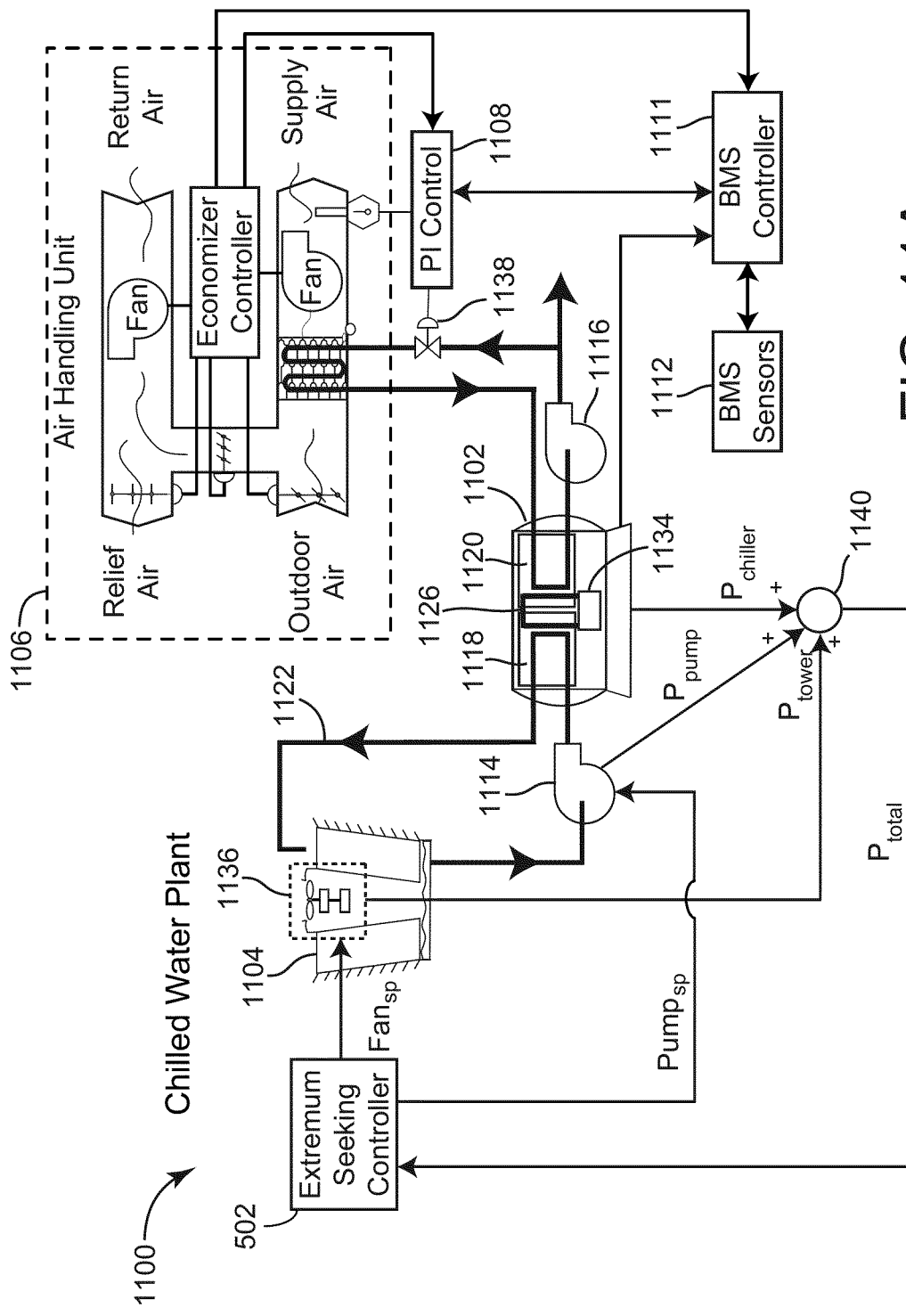
FIG. 11A is a block diagram of another chilled water plant in which the systems and methods of the present disclosure can be implemented, according to some embodiments.

Referring now to FIG. 11A, another chilled water plant 1100 is shown, according to some embodiments. Chilled water plant 1100 can include some or all of the components of chilled water plant 1000, as described with reference to FIG. 10A. For example, chilled water plant 1100 is shown to include a chiller 1102, a cooling tower 1104, and an air handling unit (AHU) 1106. Chiller 1102 is connected with cooling tower 1104 by a condenser water loop 1122. A water pump 1114 located along condenser water loop 1122 circulates condenser water between cooling tower 1104 and chiller 1102. A cooling tower fan system 1136 provides airflow through cooling tower 1104 to facilitate cooling the condenser water within cooling tower 1104. Chiller 1002 is also connected with AHU 1106 via a chilled fluid loop 1124. A chilled fluid pump 1116 located along chilled fluid loop 1124 circulates a chilled fluid between chiller 1102 and AHU 1106.

Extremum seeking controller 502 is shown receiving a power input $P_{total}$ representing the total power consumed by cooling tower fan system 1136 $P_{tower}$, condenser water pump 1114 $P_{pump}$, and the compressor 1134 of chiller 1102 $P_{chiller}$ (i.e. $P_{total}=P_{tower}+P_{pump}+P_{chiller}$). In some embodiments, the total system power $P_{total}$ is the performance variable which extremum seeking controller 502 seeks to optimize (e.g., minimize). In the embodiment shown in FIG. 11A, the total system power $P_{total}$ includes $P_{tower}$, $P_{pump}$, and $P_{chiller}$. However, in various other embodiments, the total system power $P_{total}$ can include any combination of power inputs. For example, the total system power $P_{total}$ can include the power consumption of the fans within AHU 1106, the power consumption of chilled fluid pump 1116, and/or any other power consumption that occurs within chilled water plant 1100.

Extremum seeking controller 502 is shown providing a first control signal regulating the fan speed $Fan_{sp}$ of cooling tower fan system 1136 and a second control signal regulating the pump speed $Pump_{sp}$ of condenser water pump 1114. In some embodiments, the fan speed $Fan_{sp}$ and the pump speed $Pump_{sp}$ are the manipulated variables which extremum seeking controller 502 adjusts to affect the total system power $P_{total}$. For example, extremum seeking controller 502 can increase the pump speed $Pump_{sp}$ to increase the amount of heat removed from the refrigerant in condenser 1118 or decrease the pump speed $Pump_{sp}$ to decrease the amount of heat removed from the refrigerant in condenser 1118. Similarly, extremum seeking controller 502 can increase the fan speed $Fan_{sp}$ to increase the amount of heat removed from the condenser water by cooling tower 1104 or decrease the fan speed $Fan_{sp}$ to decrease the amount of heat removed from the condenser water by cooling tower 1104.

Figure 11C:
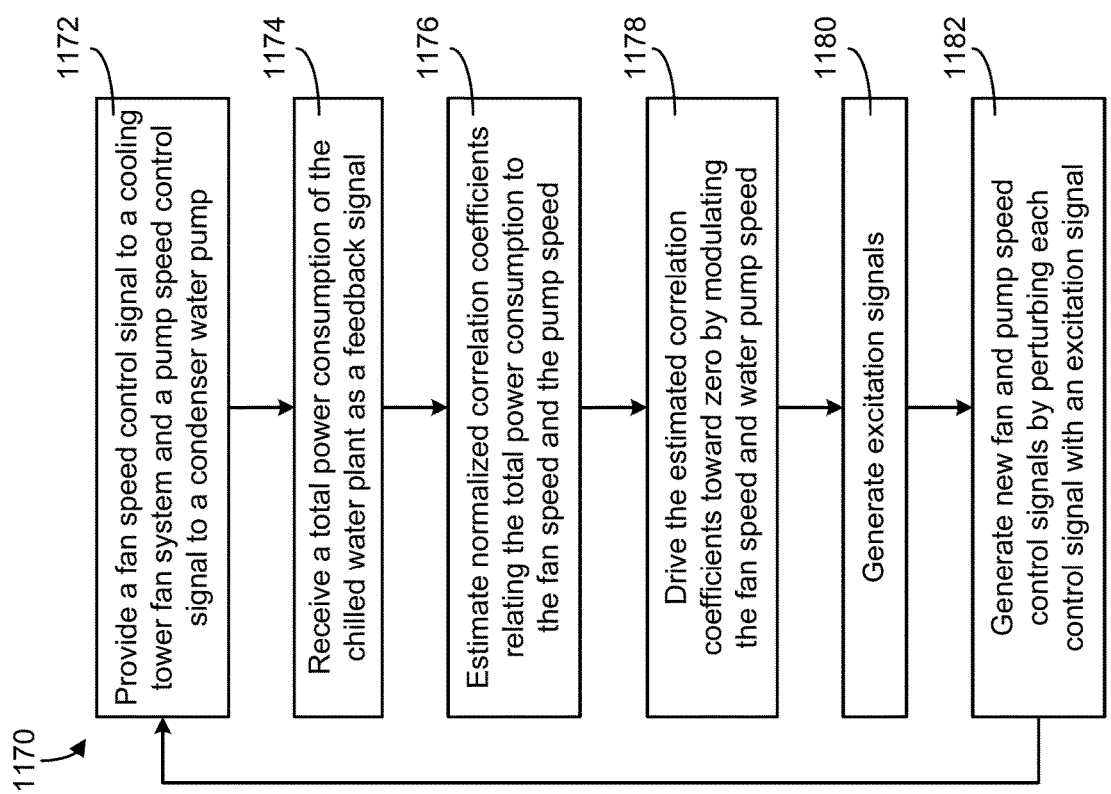
FIG. 11C is a flow diagram illustrating an extremum-seeking control technique in which normalized correlation coefficients are used to relate the total system power consumption to the condenser water pump speed and the cooling tower fan speed in the chilled water plant of FIG. 11A, according to some embodiments.
Figure 11B:
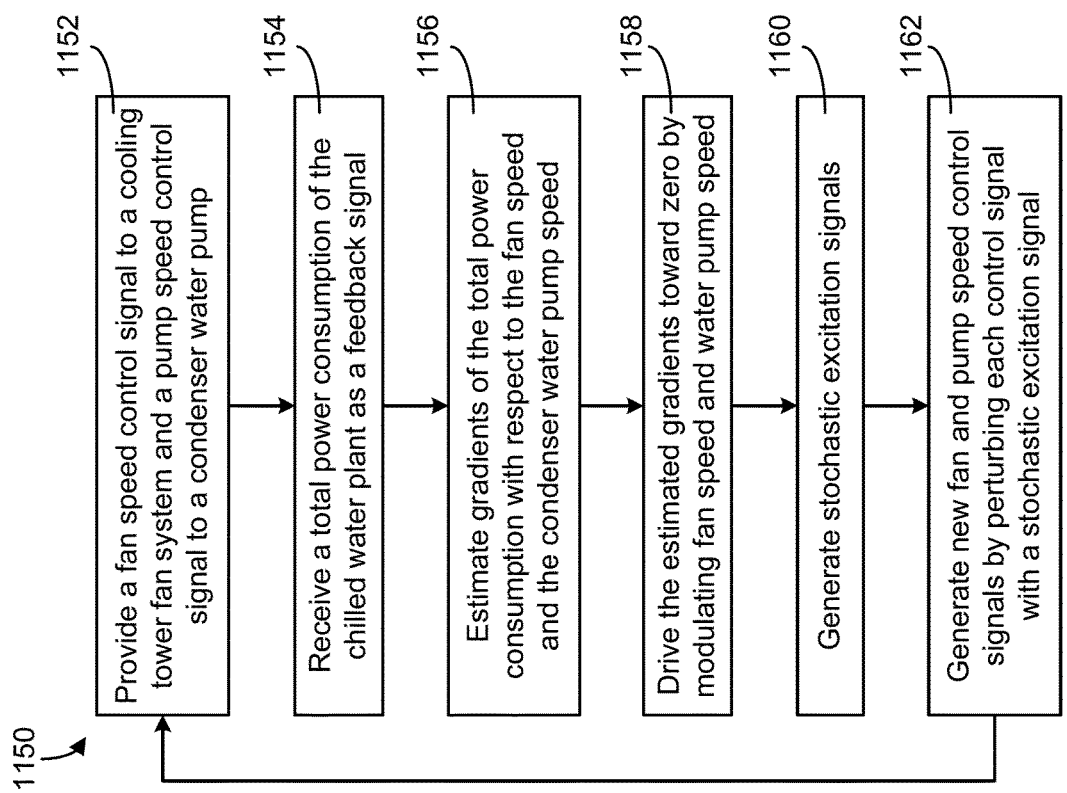
FIG. 11B is a flow diagram illustrating an extremum-seeking control technique in which stochastic excitation signals are used to perturb condenser water pump speed and a cooling tower fan speed in the chilled water plant of FIG. 11A, according to some embodiments.

Referring now to FIGS. 11B and 11C, a pair of flow diagrams 1150 and 1170 illustrating the operation of extremum controller 502 in chilled water plant 1100 are shown, according to some embodiments. In both flow diagrams 1150 and 1170, extremum seeking controller 502 provides a fan speed control signal $Fan_{sp}$ to a cooling tower fan system and a pump speed control signal $Pump_{sp}$ to a condenser water pump (blocks 1152 and 1172). Extremum seeking controller 502 can receive a total power consumption $P_{total}$ of the chilled water plant 1100 as a feedback signal (blocks 1154 and 1174).

In flow diagram 1150, extremum seeking controller 502 estimates a first gradient of the total power consumption $P_{total}$ with respect to the fan speed $Fan_{sp}$ and a second gradient of the total power consumption $P_{total}$ with respect to the condenser water pump speed $Pump_{sp}$ (block 1156). Extremum seeking controller 502 can provide control over the chilled water plant 1100 by driving the obtained gradients toward zero by modulating the fan speed $Fan_{sp}$ and the condenser water pump speed $Pump_{sp}$ (block 1158). In some embodiments, extremum seeking controller 502 generates a stochastic excitation signal for each of the speed control signals (block 1160) and uses the stochastic excitation signals to generate a new speed control signals (block 1162). For example, extremum seeking controller 502 can generate a new fan speed control signal $Fan_{sp}$ by perturbing the fan speed control signal $Fan_{sp}$ with a first stochastic excitation signal. Extremum seeking controller 502 can generate a new pump speed control signal $Pump_{sp}$ by perturbing the pump speed control signal $Pump_{sp}$ with a second stochastic excitation signal.

In flow diagram 1070, extremum seeking controller 502 estimates a first normalized correlation coefficient relating the total power consumption $P_{total}$ to the fan speed $Fan_{sp}$ and a second normalized correlation coefficient relating the total power consumption $P_{total}$ to the condenser water pump speed $Pump_{sp}$ (block 1176). Extremum seeking controller 502 can provide control over the chilled water plant 1100 by driving the estimated correlation coefficients toward zero by modulating the fan speed $Fan_{sp}$ and the pump speed $Pump_{sp}$ (block 1178). In some embodiments, extremum seeking controller 502 generates an excitation signal for each of the speed control signals (block 1080) and uses the excitation signals to generate new fan and pump speeds (block 1182). For example, extremum seeking controller 502 can generate a new fan speed control signal $Fan_{sp}$ by perturbing the fan speed control signal $Fan_{sp}$ with a first excitation signal. Extremum seeking controller 502 can generate a new pump speed control signal $Pump_{sp}$ by perturbing the pump speed control signal $Pump_{sp}$ with a second excitation signal.

Variable Refrigerant Flow System 1200

Figure 12A:
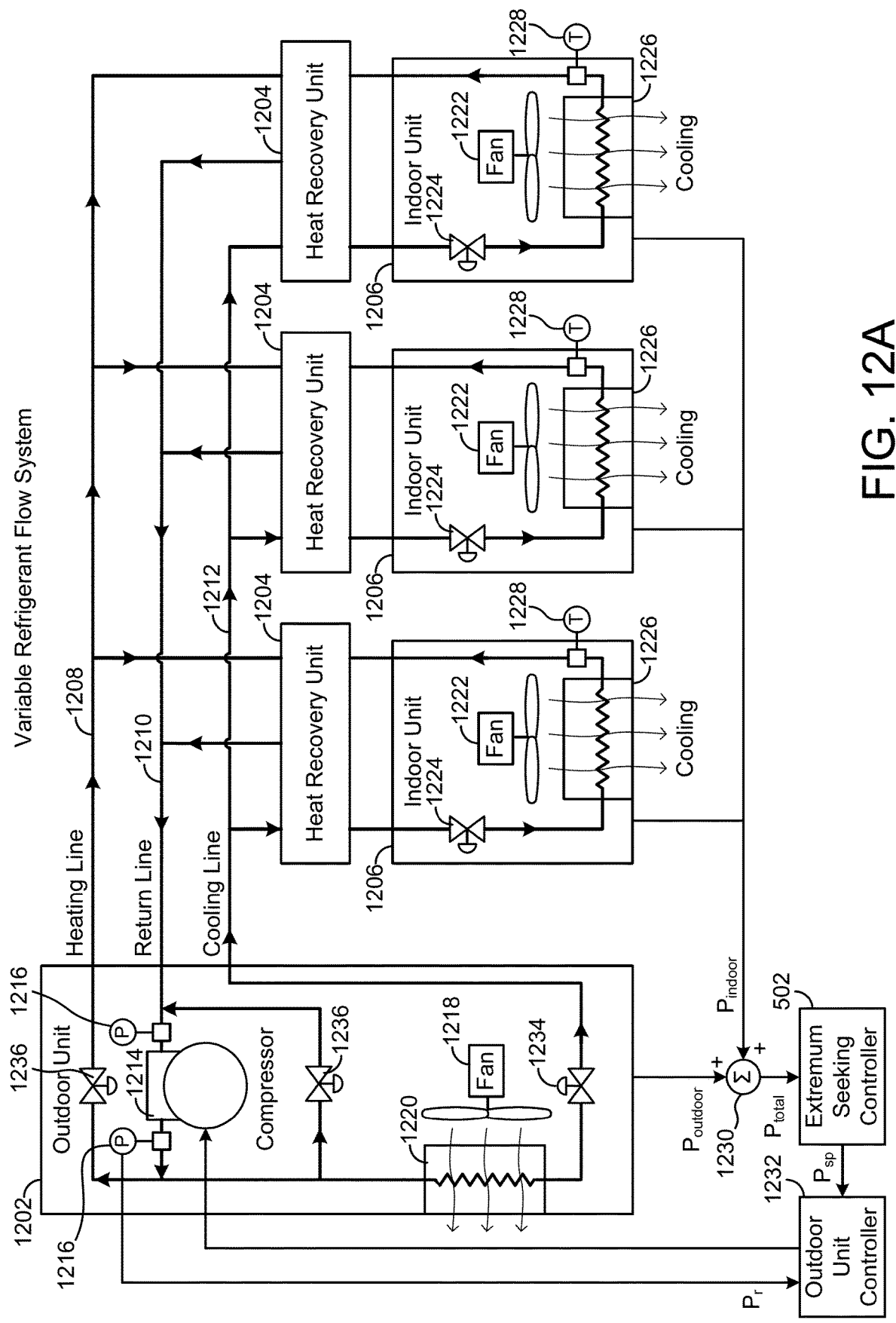
FIG. 12A is a block diagram of a variable refrigerant flow system in which the systems and methods of the present disclosure can be implemented, according to some embodiments.

Referring now to FIG. 12A, a variable refrigerant flow (VRF) system 1200 is shown, according to some embodiments. VRF system 1200 is shown to include an outdoor unit 1202, several heat recovery units 1204, and several indoor units 1206. In some embodiments, outdoor unit 1202 is located outside a building (e.g., on a rooftop) whereas indoor units 1206 are distributed throughout the building (e.g., in various rooms or zones of the building). In some embodiments, VRF system 1200 includes several heat recovery units 1204. Heat recovery units 1204 can control the flow of a refrigerant between outdoor unit 1204 and indoor units 1206 (e.g., by opening or closing valves) and can minimize the heating or cooling load to be served by outdoor unit 1202.

Outdoor unit 1202 is shown to include a compressor 1214 and a heat exchanger 1220. Compressor 1214 circulates a refrigerant between heat exchanger 1220 and indoor units 1206. Heat exchanger 1220 can function as a condenser (allowing the refrigerant to reject heat to the outside air) when VRF system 1200 operates in a cooling mode or as an evaporator (allowing the refrigerant to absorb heat from the outside air) when VRF system 1200 operates in a heating mode. A fan 1218 provides airflow through heat exchanger

1220. The speed of fan 1218 can be adjusted to modulate the rate of heat transfer into or out of the refrigerant in heat exchanger 1220.

Each indoor unit 1206 is shown to include a heat exchanger 1226 and an expansion valve 1224. Each of heat exchangers 1226 can function as a condenser (allowing the refrigerant to reject heat to the air within the room or zone) when the indoor unit 1206 operates in a heating mode or as an evaporator (allowing the refrigerant to absorb heat from the air within the room or zone) when the indoor unit 1206 operates in a cooling mode. Fans 1222 provide airflow through heat exchangers 1226. The speeds of fans 1222 can be adjusted to modulate the rate of heat transfer into or out of the refrigerant in heat exchangers 1226. Temperature sensors 1228 can be used to measure the temperature of the refrigerant within indoor units 1206.

In FIG. 12A, indoor units 1206 are shown operating in the cooling mode. In the cooling mode, the refrigerant is provided to indoor units 1206 via cooling line 1212. The refrigerant is expanded by expansion valves 1224 to a cold, low pressure state and flows through heat exchangers 1226 (functioning as evaporators) to absorb heat from the room or zone within the building. The heated refrigerant then flows back to outdoor unit 1202 via return line 1210 and is compressed by compressor 1214 to a hot, high pressure state. The compressed refrigerant flows through heat exchanger 1220 (functioning as a condenser) and rejects heat to the outside air. The cooled refrigerant can then be provided back to indoor units 1206 via cooling line 1212. In the cooling mode, flow control valves 1236 can be closed and expansion valve 1234 can be completely open.

In the heating mode, the refrigerant is provided to indoor units 1206 in a hot state via heating line 1208. The hot refrigerant flows through heat exchangers 1226 (functioning as condensers) and rejects heat to the air within the room or zone of the building. The refrigerant then flows back to outdoor unit via cooling line 1212 (opposite the flow direction shown in FIG. 12A). The refrigerant can be expanded by expansion valve 1234 to a colder, lower pressure state. The expanded refrigerant flows through heat exchanger 1220 (functioning as an evaporator) and absorbs heat from the outside air. The heated refrigerant can be compressed by compressor 1214 and provided back to indoor units 1206 via heating line 1208 in a hot, compressed state. In the heating mode, flow control valves 1236 can be completely open to allow the refrigerant from compressor 1214 to flow into heating line 1208.

Extremum seeking controller 502 is shown receiving a power input $P_{total}$ representing the total power consumed by outdoor unit 1202 $P_{outdoor}$ and the total power consumed by each of indoor units 1206 $P_{indoor}$ (i.e., $P_{total}=P_{outdoor}+P_{indoor}$). The outdoor unit power outdoor can include the power consumption of compressor 1214 and/or fan 1218. The indoor unit power $P_{indoor}$ can include the power consumption of fans 1222 and/or any other power-consuming devices within indoor units 1206 or heat recovery units 1204 (e.g., electronic valves, pumps, fans, etc.). As illustrated in FIG. 12A, the power inputs $P_{outdoor}$ and $P_{indoor}$ can be summed outside of extremum seeking controller 502 at summing block 1230 to provide a combined signal representative of the total power $P_{total}$. In other embodiments, extremum seeking controller 502 receives the individual power inputs $P_{outdoor}$ and $P_{indoor}$ and conducts the summation of summing block 1230. In either case, extremum seeking controller 502 can be said to receive the power inputs $P_{outdoor}$ and $P_{indoor}$ even if the power inputs are provided as a single summed or combined signal $P_{total}$ representing the total system power.

In some embodiments, the total system power $P_{total}$ is the performance variable which extremum seeking controller 502 seeks to optimize (e.g., minimize). The total system power $P_{total}$ can include the power consumption of one or more components of VRF system 1200. In the embodiment shown in FIG. 12A, the total system power $P_{total}$ includes $P_{outdoor}$ and $P_{indoor}$. However, in various other embodiments, the total system power $P_{total}$ can include any combination of power inputs. For example, the total system power $P_{total}$ can include the power consumption of heat recovery units 1204, indoor units 1206, outdoor unit 1202, pumps, and/or any other power consumption that occurs within VRF system 1200.

Extremum seeking controller 502 is shown providing a pressure setpoint $P_{sp}$ to an outdoor unit controller 1232. In some embodiments, the pressure setpoint $P_{sp}$ is the manipulated variable which extremum seeking controller 502 adjusts to affect the total system power $P_{total}$. The pressure setpoint $P_{sp}$ is a setpoint for the pressure of the refrigerant $P_r$ at the suction or the discharge of compressor 1214. The refrigerant pressure $P_r$ can be measured by a pressure sensor 1216 located at the suction of compressor 1214 (e.g., upstream of compressor 1214) or at the discharge of compressor 1214 (e.g., downstream of compressor 1214). Outdoor unit controller 1232 is shown receiving the refrigerant pressure $P_r$ as a feedback signal.

Outdoor unit controller 1232 can operate outdoor unit 1202 to achieve the pressure setpoint $P_{sp}$ provided by extremum seeking controller 502. Operating outdoor unit 1202 can include adjusting the speed of compressor 1214 and/or the speed of fan 1218. For example, outdoor unit controller 1232 can increase the speed of compressor 1214 to increase compressor discharge pressure or decrease the compressor suction pressure. Outdoor unit controller 1232 can increase the speed of fan 1218 to increase the heat transfer within heat exchanger 1220 or decrease the speed of fan 1218 to decrease the heat transfer within heat exchanger 1220.

Extremum seeking controller 502 implements an extremum seeking control strategy that dynamically searches for an unknown input (e.g., pressure setpoint $P_{sp}$) to obtain system performance (e.g., total power consumption $P_{total}$) that trends near optimal. Although outdoor unit controller 1232 and extremum seeking controller 502 are shown as separate devices, it is contemplated that outdoor unit controller 1232 and extremum seeking controller 502 can be combined into a single device in some embodiments (e.g., a single controller that performs the functions of both extremum seeking controller 502 and outdoor unit controller 1232). For example, extremum seeking controller 502 can be configured to operate compressor 1214 and/or fan 1218 directly without requiring an intermediate outdoor unit controller 1232.

Figures 12B, 12C:
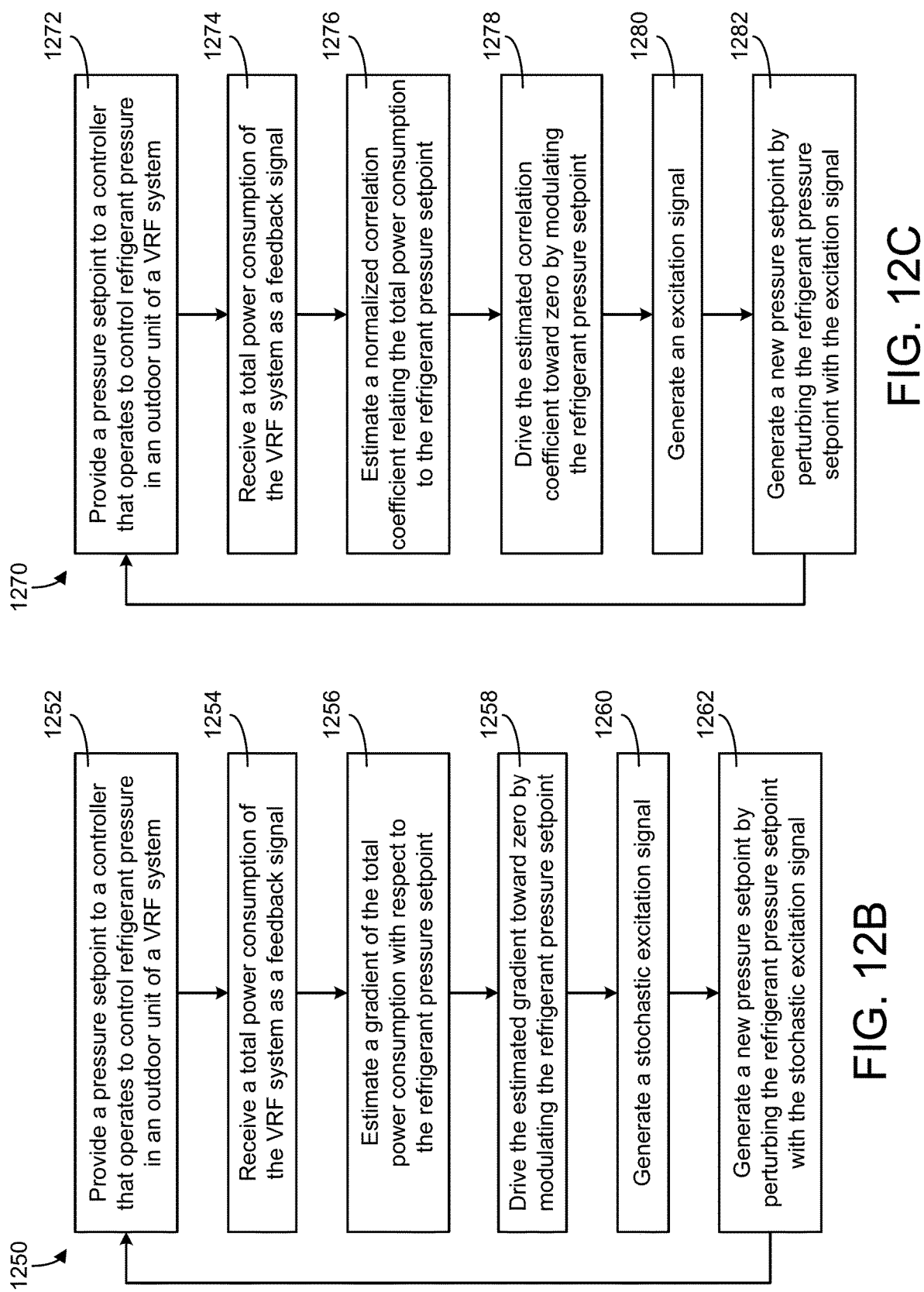
FIG. 12B is a flow diagram illustrating an extremum-seeking control technique in which a stochastic excitation signal is used to perturb a refrigerant pressure setpoint in the variable refrigerant flow system of FIG. 12A, according to some embodiments.
FIG. 12C is a flow diagram illustrating an extremum-seeking control technique in which a normalized correlation coefficient is used to relate the total system power consumption to the refrigerant pressure setpoint in the variable refrigerant flow system of FIG. 12A, according to some embodiments.

Referring now to FIGS. 12B and 12C, a pair of flow diagrams 1250 and 1270 illustrating the operation of extremum controller 502 in VRF system 1200 are shown, according to some embodiments. In both flow diagrams 1250 and 1270, extremum seeking controller 502 provides a pressure setpoint $P_{sp}$ to a controller (e.g., outdoor unit controller 1232) that operates to control refrigerant pressure in an outdoor unit 1202 of a VRF system 1200 (blocks 1252 and 1272). The refrigerant pressure can be a compressor suction pressure or a compressor discharge pressure. Extremum seeking controller 502 can receive a total power consumption $P_{total}$ of the VRF system 1200 as a feedback signal (blocks 1254 and 1274).

In flow diagram 1250, extremum seeking controller 502 estimates a gradient of the total power consumption $P_{total}$ with respect to the refrigerant pressure setpoint $P_{sp}$ (block 1256). Extremum seeking controller 502 can provide control over the VRF system 1200 by driving the obtained gradient toward zero by modulating the pressure setpoint $P_{sp}$ (block 1258). In some embodiments, extremum seeking controller 502 generates a stochastic excitation signal (block 1260) and uses the stochastic excitation signal to generate a new refrigerant pressure setpoint $P_{sp}$. For example, extremum seeking controller 502 can generate the new pressure setpoint $P_{sp}$ by perturbing the refrigerant pressure setpoint $P_{sp}$ with the stochastic excitation signal (block 1262).

In flow diagram 1270, extremum seeking controller 502 estimates a normalized correlation coefficient relating the total power consumption $P_{total}$ to the refrigerant pressure setpoint $P_{sp}$ (block 1276). Extremum seeking controller 502 can provide control over the VRF system 1200 by driving the estimated correlation coefficient toward zero by modulating the refrigerant pressure setpoint $P_{sp}$ (block 1278). In some embodiments, extremum seeking controller 502 generates an excitation signal (block 1280) and uses the excitation signal to generate a new refrigerant pressure setpoint $P_{sp}$. For example, extremum seeking controller 502 can generate the new pressure setpoint $P_{sp}$ by perturbing the refrigerant pressure setpoint $P_{sp}$ with the excitation signal (block 1282).

Variable Refrigerant Flow System 1300

Figure 13A:
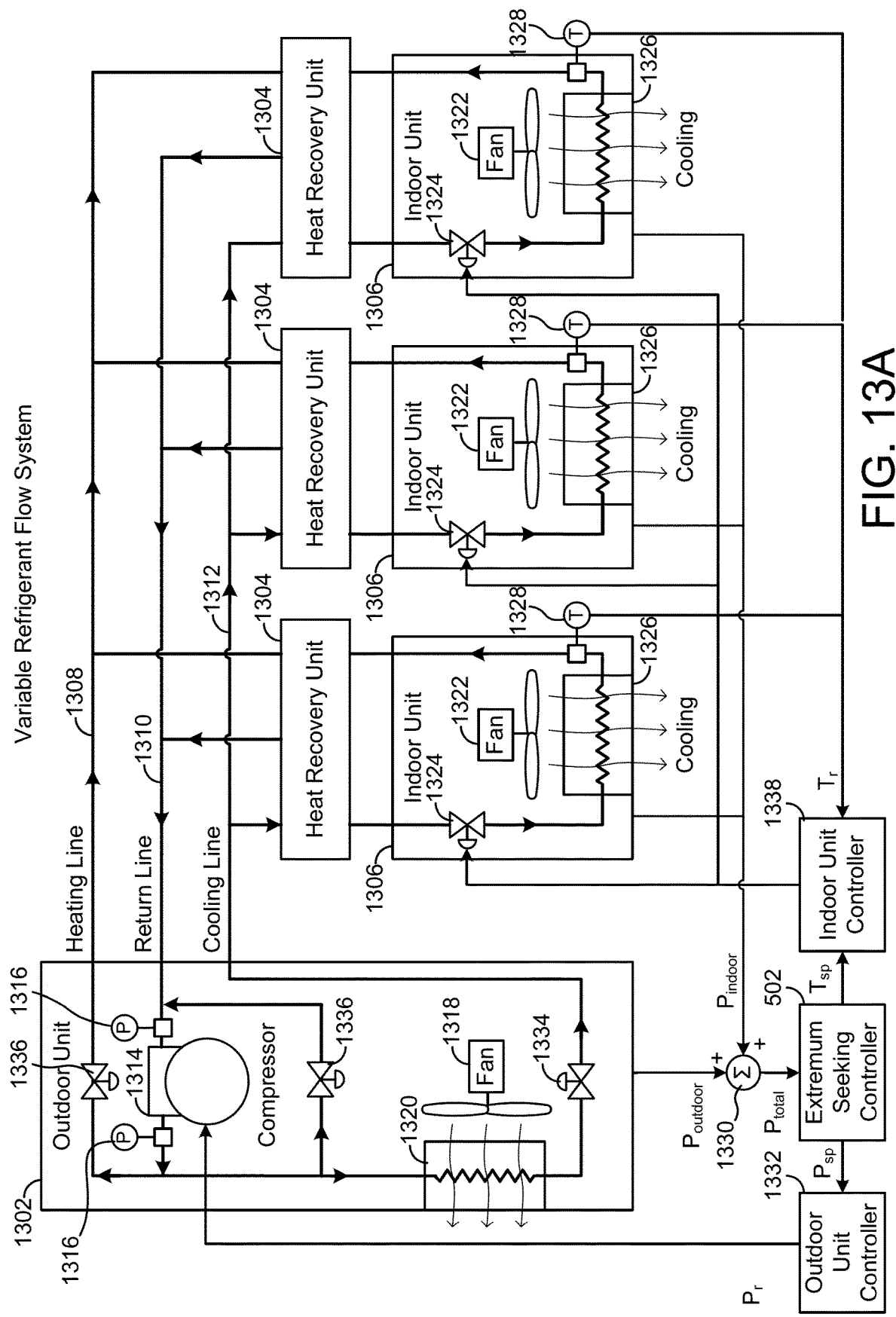
FIG. 13A is a block diagram of another variable refrigerant flow system in which the systems and methods of the present disclosure can be implemented, according to some embodiments.

Referring now to FIG. 13A, another variable refrigerant flow (VRF) system 1300 is shown, according to some embodiments. VRF system 1300 can include some or all of the components of VRF system 1200, as described with reference to FIG. 12A. For example, VRF system 1300 is shown to include an outdoor unit 1302, several heat recovery units 1304, and several indoor units 1306.

Outdoor unit 1302 is shown to include a compressor 1314 and a heat exchanger 1320. Compressor 1314 circulates a refrigerant between heat exchanger 1320 and indoor units 1306. Heat exchanger 1320 can function as a condenser (allowing the refrigerant to reject heat to the outside air) when VRF system 1300 operates in a cooling mode or as an evaporator (allowing the refrigerant to absorb heat from the outside air) when VRF system 1300 operates in a heating mode. A fan 1318 provides airflow through heat exchanger 1220. The speed of fan 1318 can be adjusted to modulate the rate of heat transfer into or out of the refrigerant in heat exchanger 1320.

Each indoor unit 1306 is shown to include a heat exchanger 1326 and an expansion valve 1324. Each of heat exchangers 1326 can function as a condenser (allowing the refrigerant to reject heat to the air within the room or zone) when the indoor unit 1306 operates in a heating mode or as an evaporator (allowing the refrigerant to absorb heat from the air within the room or zone) when the indoor unit 1306 operates in a cooling mode. Fans 1322 provide airflow through heat exchangers 1326. The speeds of fans 1322 can be adjusted to modulate the rate of heat transfer into or out of the refrigerant in heat exchangers 1326. Temperature sensors 1328 can be used to measure the temperature of the refrigerant $T_r$ within indoor units 1306.

Extremum seeking controller 502 is shown receiving a power input $P_{total}$ representing the total power consumed by outdoor unit 1302 $P_{outdoor}$ and the total power consumed by each of indoor units 1306 $P_{indoor}$ (i.e., $P_{total} = P_{outdoor} + P_{indoor}$). The outdoor unit power $P_{outdoor}$ can include the power consumption of compressor 1314 and/or fan 1318. The indoor unit power $P_{indoor}$ can include the power consumption of fans 1322 and/or any other power-consuming devices within indoor units 1306 or heat recovery units 1304 (e.g., electronic valves, pumps, fans, etc.).

In some embodiments, the total system power $P_{total}$ is the performance variable which extremum seeking controller 502 seeks to optimize (e.g., minimize). The total system power $P_{total}$ can include the power consumption of one or more components of VRF system 1300. In the embodiment shown in FIG. 13A, the total system power $P_{total}$ includes $P_{outdoor}$ and $P_{indoor}$. However, in various other embodiments, the total system power $P_{total}$ can include any combination of power inputs. For example, the total system power $P_{total}$ can include the power consumption of heat recovery units 1304, indoor units 1306, outdoor unit 1302, pumps, and/or any other power consumption that occurs within VRF system 1300.

Extremum seeking controller 502 is shown providing a pressure setpoint $P_{sp}$ to an outdoor unit controller 1332 and a superheat temperature setpoint $T_{sp}$ to an indoor unit controller 1338. In some embodiments, the pressure setpoint $P_{sp}$ and the superheat temperature setpoint $T_{sp}$ are the manipulated variables which extremum seeking controller 502 adjusts to affect the total system power $P_{total}$. The pressure setpoint $P_{sp}$ is a setpoint for the pressure of the refrigerant $P_r$ at the suction or the discharge of compressor 1314. The superheat temperature setpoint $T_{sp}$ is a setpoint for the amount of superheat of the refrigerant (i.e., the temperature of the refrigerant $T_r$ minus the refrigerant saturation temperature) at the outlet of heat exchangers 1326.

The refrigerant pressure $P_r$ can be measured by a pressure sensor 1316 located at the suction of compressor 1314 (e.g., upstream of compressor 1314) or at the discharge of compressor 1314 (e.g., downstream of compressor 1314). Outdoor unit controller 1332 is shown receiving the refrigerant pressure $P_r$ as a feedback signal. Outdoor unit controller 1232 can operate outdoor unit 1202 to achieve the pressure setpoint $P_{sp}$ provided by extremum seeking controller 502. Operating outdoor unit 1202 can include adjusting the speed of compressor 1214 and/or the speed of fan 1218. For example, outdoor unit controller 1232 can increase the speed of compressor 1214 to increase compressor discharge pressure or decrease the compressor suction pressure. Outdoor unit controller 1232 can increase the speed of fan 1218 to increase the heat transfer within heat exchanger 1220 or decrease the speed of fan 1218 to decrease the heat transfer within heat exchanger 1220.

The superheat of the refrigerant $T_{super}$ can be calculated (by indoor unit controller 1338) by subtracting the refrigerant saturation temperature $T_{sat}$ from the temperature of the refrigerant $T_r$ (i.e., $T_{super} = T_r - T_{sat}$). The refrigerant temperature $T_r$ can be measured by temperature sensors 1328 located at the outlet of heat exchangers 1326. Indoor unit controller 1338 is shown receiving the refrigerant pressure $T_r$ as a feedback signal. Indoor unit controller 1338 can operate indoor units 1306 to achieve the superheat temperature setpoint $T_{sp}$ provided by extremum seeking controller 502. Operating indoor units 1306 can include adjusting the speed of fans 1322 and/or adjusting the position of expansion valves 1324. For example, indoor unit controller 1338 can increase the speed of fans 1322 to increase the heat transfer within heat exchangers 1226 or decrease the speed of fans 1322 to decrease the heat transfer within heat exchangers 1226. Similarly, indoor unit controller 1338 can move valves 1324 toward an open position to increase the refrigerant flow through indoor units 1306 or move valves 1324 toward a closed position to decrease the refrigerant flow through indoor units 1306.

Extremum seeking controller 502 implements an extremum seeking control strategy that dynamically searches for an unknown input (e.g., pressure setpoint $P_{sp}$ and/or superheat temperature setpoint $T_{sp}$) to obtain system performance (e.g., total power consumption $P_{total}$) that trends near optimal. Although outdoor unit controller 1332, indoor unit controller 1338, and extremum seeking controller 502 are shown as separate devices, it is contemplated that outdoor unit controller 1332, indoor unit controller 1338, and extremum seeking controller 502 can be combined into a single device in some embodiments (e.g., a single controller that performs the functions of extremum seeking controller 502, outdoor unit controller 1332, and indoor unit controller 1338). For example, extremum seeking controller 502 can be configured to operate compressor 1314, fan 1318, fans 1322, and/or valves 1224 directly without requiring an intermediate outdoor unit controller 1332 or indoor unit controller 1338.

Referring now to FIGS. 13B and 13C, a pair of flow diagrams 1350 and 1370 illustrating the operation of extremum controller 502 in VRF system 1300 are shown, according to some embodiments. In both flow diagrams 1350 and 1370, extremum seeking controller 502 provides a pressure setpoint $P_{sp}$ to a controller (e.g., outdoor unit controller 1332) that operates to control refrigerant pressure in an outdoor unit 1302 of a VRF system 1300 (blocks 1352 and 1372). The refrigerant pressure can be a compressor suction pressure or a compressor discharge pressure. Extremum seeking controller 502 also provides a superheat temperature setpoint to a controller (e.g., indoor unit controller 1338) that operates to control refrigerant temperature in an indoor unit of the VRF system 1300 (blocks 1353 and 1373). Extremum seeking controller 502 can receive a total power consumption $P_{total}$ of the VRF system 1300 as a feedback signal (blocks 1354 and 1374).

In flow diagram 1350, extremum seeking controller 502 estimates a first gradient of the total power consumption $P_{total}$ with respect to the refrigerant pressure setpoint $P_{sp}$ and a second gradient of the total power consumption $P_{total}$ with respect to the refrigerant superheat temperature setpoint $T_{sp}$ (block 1356). Extremum seeking controller 502 can provide control over the VRF system 1300 by driving the obtained gradients toward zero by modulating the pressure setpoint $P_{sp}$ and the superheat temperature setpoint $T_{sp}$ (block 1358). In some embodiments, extremum seeking controller 502 generates stochastic excitation signals (block 1360) and uses the stochastic excitation signals to generate a new refrigerant pressure setpoint $P_{sp}$ and a new refrigerant superheat setpoint $T_{sp}$. For example, extremum seeking controller 502 can generate the new pressure setpoint $P_{sp}$ by perturbing the refrigerant pressure setpoint $P_{sp}$ with a first stochastic excitation signal and can generate the new superheat temperature setpoint $T_{sp}$ by perturbing the temperature setpoint $T_{sp}$ with a second stochastic excitation signal (block 1362).

In flow diagram 1370, extremum seeking controller 502 estimates a first normalized correlation coefficient relating the total power consumption $P_{total}$ to the refrigerant pressure setpoint $P_{sp}$ and a second normalized correlation coefficient relating the total power consumption $P_{total}$ to the refrigerant superheat temperature setpoint $T_{sp}$ (block 1376). Extremum seeking controller 502 can provide control over the VRF system 1300 by driving the estimated correlation coefficients toward zero by modulating the refrigerant pressure setpoint $P_{sp}$ and the refrigerant superheat temperature setpoint $T_{sp}$ (block 1378). In some embodiments, extremum seeking controller 502 generates excitation signals (block 1380) and uses the excitation signals to generate a new refrigerant pressure setpoint $P_{sp}$ and a new refrigerant superheat setpoint $T_{sp}$. For example, extremum seeking controller 502 can generate the new pressure setpoint $P_{sp}$ by perturbing the refrigerant pressure setpoint $P_{sp}$ with a first excitation signal and can generate the new superheat temperature setpoint $T_{sp}$ by perturbing the temperature setpoint $T_{sp}$ with a second excitation signal (block 1382).

Vapor Compression System 1400

Figure 14A:
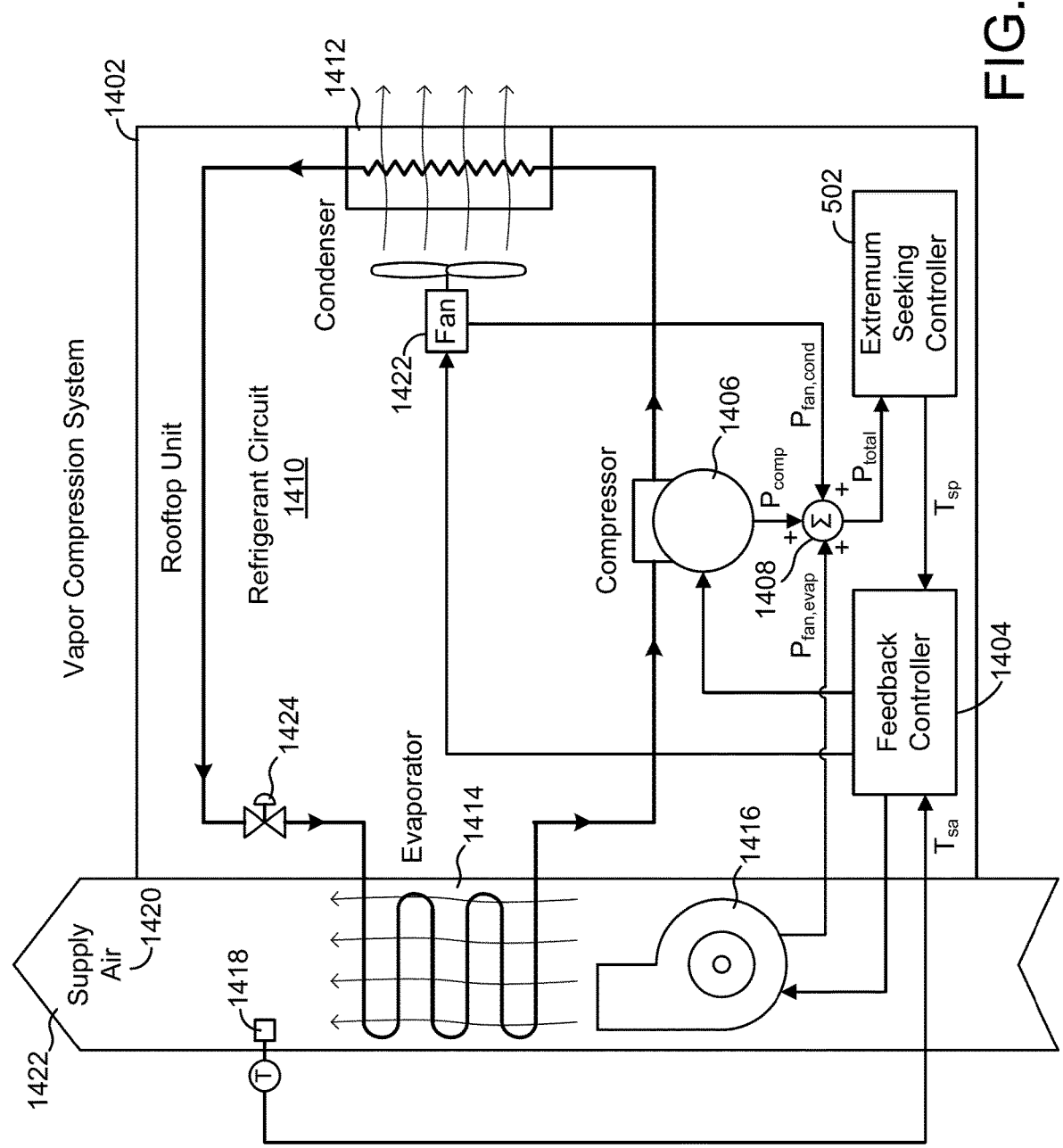
FIG. 14A is a block diagram of a vapor compression system in which the systems and methods of the present disclosure can be implemented, according to some embodiments.

Referring now to FIG. 14A, a vapor compression air conditioning system 1400 is shown, according to some embodiments. System 1400 is shown to include a refrigerant circuit 1410. Refrigerant circuit 1410 includes a condenser 1412, an evaporator 1414, an expansion valve 1424, and a compressor 1406. Compressor 1406 is configured to circulate a refrigerant between evaporator 1414 and condenser 1412. Refrigerant circuit 1410 operates using a vapor compression cycle. For example, compressor 1406 compresses the refrigerant to a hot, high pressure state. The compressed refrigerant flows through condenser 1412 where the refrigerant rejects heat. A condenser fan 1422 can be used to modulate the rate of heat transfer within condenser 1412. The cooled refrigerant is expanded by expansion valve 1424 to a low pressure, low temperature state. The expanded refrigerant flows through evaporator 1414 where the refrigerant absorbs heat. An evaporator fan 1416 can be used to modulate the rate of heat transfer within evaporator 1414.

In some embodiments, refrigerant circuit 1410 is located within a rooftop unit 1402 (e.g., a rooftop air handling unit) as shown in FIG. 14A. Rooftop unit 1402 can be configured to provide cooling for supply air 1420 flowing through an air duct 1422. For example, evaporator 1414 can be located within air duct 1422 such that supply air 1420 flows through evaporator 1414 and is cooled by transferring heat to the expanded refrigerant within evaporator 1414. The cooled airflow can then be routed to a building to provide cooling for a room or zone of the building. The temperature of supply air 1420 can be measured by a temperature sensor 1418 located downstream of evaporator 1414 (e.g., within duct 1422). In other embodiments, refrigerant circuit 1410 can be used in any of a variety of other systems or devices that transfer heat using a vapor compression cycle (e.g., chillers, heat pumps, heat recovery chillers, refrigeration devices, etc.).

Extremum seeking controller 502 is shown receiving a power input $P_{total}$ representing the total power consumed by compressor 1406 $P_{comp}$, evaporator fan 1416 $P_{fan,evap}$, and condenser fan 1422 $P_{fan,cond}$ (i.e., $P_{total}=P_{comp}+P_{fan,evap}+P_{fan,cond}$). As illustrated in FIG. 14A, the power inputs $P_{comp}$, $P_{fan,evap}$, and $P_{fan,cond}$ can be summed outside of extremum seeking controller 502 at summing block 1408 to provide a combined signal representative of the total power $P_{total}$. In other embodiments, extremum seeking controller 502 receives the individual power inputs $P_{comp}$, $P_{fan,evap}$, and $P_{fan,cond}$ and conducts the summation of summing block 1408. In either case, extremum seeking controller 502 can be said to receive the power inputs $P_{comp}$, $P_{fan,evap}$, and $P_{fan,cond}$ even if the power inputs are provided as a single summed or combined signal $P_{total}$ representing the total system power.

In some embodiments, the total system power $P_{total}$ is the performance variable which extremum seeking controller 502 seeks to optimize (e.g., minimize). The total system power $P_{total}$ can include the power consumption of one or more components of vapor compression system 1400. In the embodiment shown in FIG. 14A, the total system power $P_{total}$ includes $P_{comp}$, $P_{fan,evap}$, and $P_{fan,cond}$. However, in various other embodiments, the total system power $P_{total}$ can include any combination of power inputs. For example, the total system power $P_{total}$ can include the power consumption of various other fans within rooftop unit 1402, the power consumption of a fluid pump, and/or any other power consumption that occurs within vapor compression system 1400.

Extremum seeking controller 502 is shown providing a temperature setpoint $T_{sp}$ to a feedback controller 1404. In some embodiments, the temperature setpoint $T_{sp}$ is the manipulated variable which extremum seeking controller 502 adjusts to affect the total system power $P_{total}$. The temperature setpoint $T_{sp}$ is a setpoint for the temperature of the supply air 1420 leaving evaporator 1414. The supply air temperature $T_{sa}$ can be measured by temperature sensor 1418 located downstream of evaporator 1414. Feedback controller 1404 is shown receiving the supply air temperature $T_{sa}$ as a feedback signal.

Feedback controller 1404 can operate evaporator fan 1416, condenser fan 1422, and/or compressor 1406 to achieve the temperature setpoint $T_{sp}$ provided by extremum seeking controller 502. For example, feedback controller 1404 can increase the speed of evaporator fan 1416 to increase the amount of heat removed from the supply air 1420 in evaporator 1414 or decrease the speed of evaporator fan 1416 to decrease the amount of heat removed from the supply air 1420 in evaporator 1414. Similarly, feedback controller 1404 can increase the speed of condenser fan 1422 to increase the amount of heat removed from the refrigerant in condenser 1412 or decrease the speed of condenser fan 1422 to decrease the amount of heat removed from the refrigerant in condenser 1412.

Extremum seeking controller 502 implements an extremum seeking control strategy that dynamically searches for an unknown input (e.g., optimal supply air temperature setpoint $T_{sp}$) to obtain system performance (e.g., total power consumption $P_{total}$) that trends near optimal. Although feedback controller 1404 and extremum seeking controller 502 are shown as separate devices, it is contemplated that feedback controller 1404 and extremum seeking controller 502 can be combined into a single device in some embodiments (e.g., a single controller that performs the functions of both extremum seeking controller 502 and feedback controller 1404). For example, extremum seeking controller 502 can be configured to control evaporator fan 1416, condenser fan 1422, and/or compressor 1406 directly without requiring an intermediate feedback controller 1404.

Figures 14B, 14C:
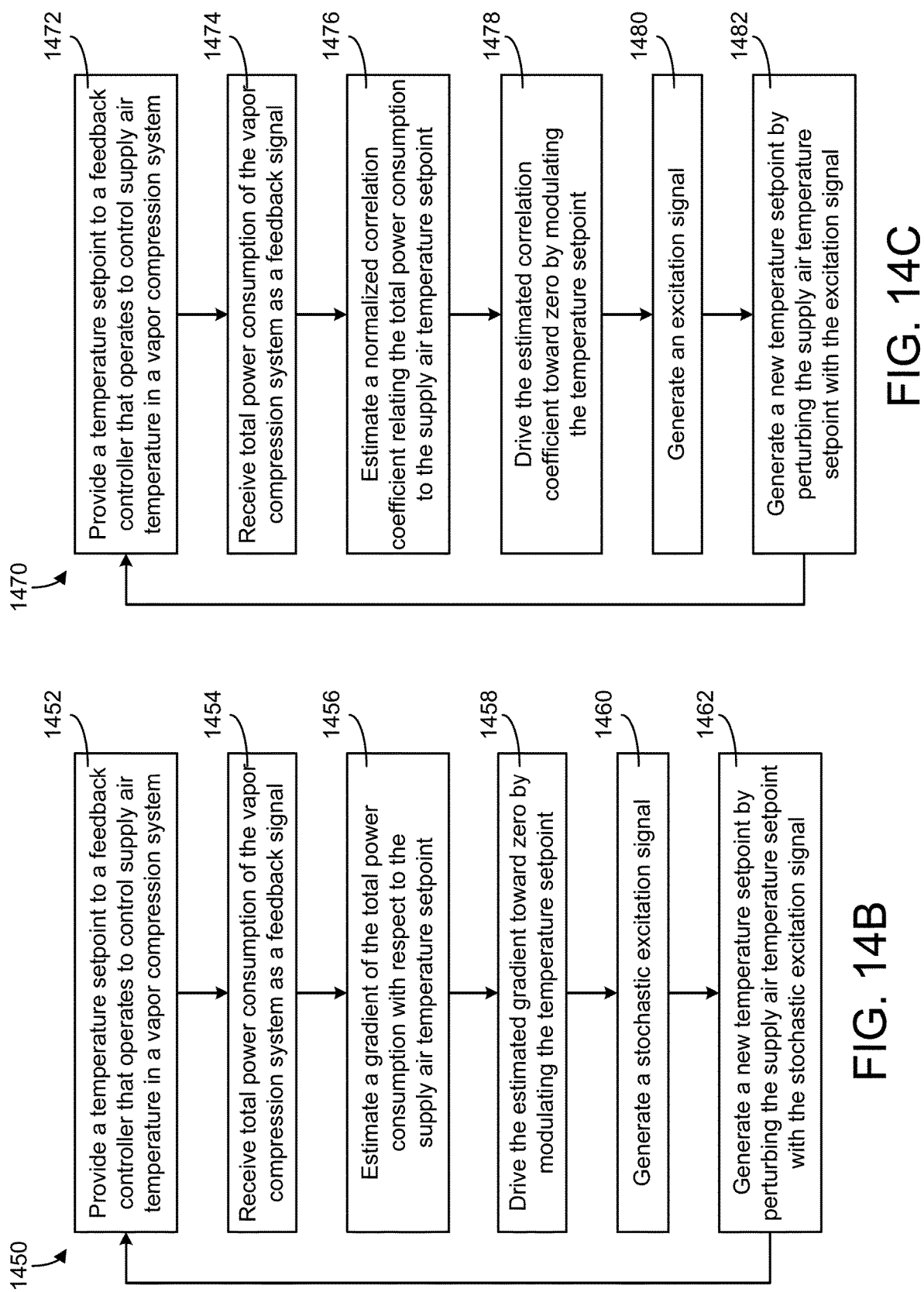
FIG. 14B is a flow diagram illustrating an extremum-seeking control technique in which a stochastic excitation signal is used to perturb a supply air temperature setpoint in the vapor compression system of FIG. 14A, according to some embodiments.
FIG. 14C is a flow diagram illustrating an extremum-seeking control technique in which a normalized correlation coefficient is used to relate the total system power consumption to the supply air temperature setpoint in the vapor compression system of FIG. 14A, according to some embodiments.

Referring now to FIGS. 14B and 14C, a pair of flow diagrams 1450 and 1470 illustrating the operation of extremum controller 502 in vapor compression system 1400 are shown, according to some embodiments. In both flow diagrams 1450 and 1470, extremum seeking controller 502 provides a temperature setpoint $T_{sp}$ to a feedback controller 1404 that operates to control supply air temperature $T_{sa}$ in a vapor compression system 1400 (blocks 1452 and 1472). Extremum seeking controller 502 can receive a total power consumption $P_{total}$ of the vapor compression system 1400 as a feedback signal (blocks 1454 and 1474).

In flow diagram 1450, extremum seeking controller 502 estimates a gradient of the total power consumption $P_{total}$ with respect to the supply air temperature setpoint $T_{sp}$ (block 1456). Extremum seeking controller 502 can provide control over the vapor compression system 1400 by driving the obtained gradient toward zero by modulating the temperature setpoint $T_{sp}$ (block 1458). In some embodiments, extremum seeking controller 502 generates a stochastic excitation signal (block 1460) and uses the stochastic excitation signal to generate a new supply air temperature setpoint $T_{sp}$. For example, extremum seeking controller 502 can generate the new temperature setpoint $T_{sp}$ by perturbing the supply air temperature setpoint $T_{sp}$ with the stochastic excitation signal (block 1462).

In flow diagram 1470, extremum seeking controller 502 estimates a normalized correlation coefficient relating the total power consumption $P_{total}$ to the supply air temperature setpoint $T_{sp}$ (block 1476). Extremum seeking controller 502 can provide control over the vapor compression system 1400 by driving the estimated correlation coefficient toward zero by modulating the temperature setpoint $T_{sp}$ (block 1478). In some embodiments, extremum seeking controller 502 generates an excitation signal (block 1480) and uses the excitation signal to generate a new supply air temperature setpoint $T_{sp}$. For example, extremum seeking controller 502 can generate the new temperature setpoint $T_{sp}$ by perturbing the supply air temperature setpoint $T_{sp}$ with the excitation signal (block 1482).

Vapor Compression System 1500

Figure 15A:
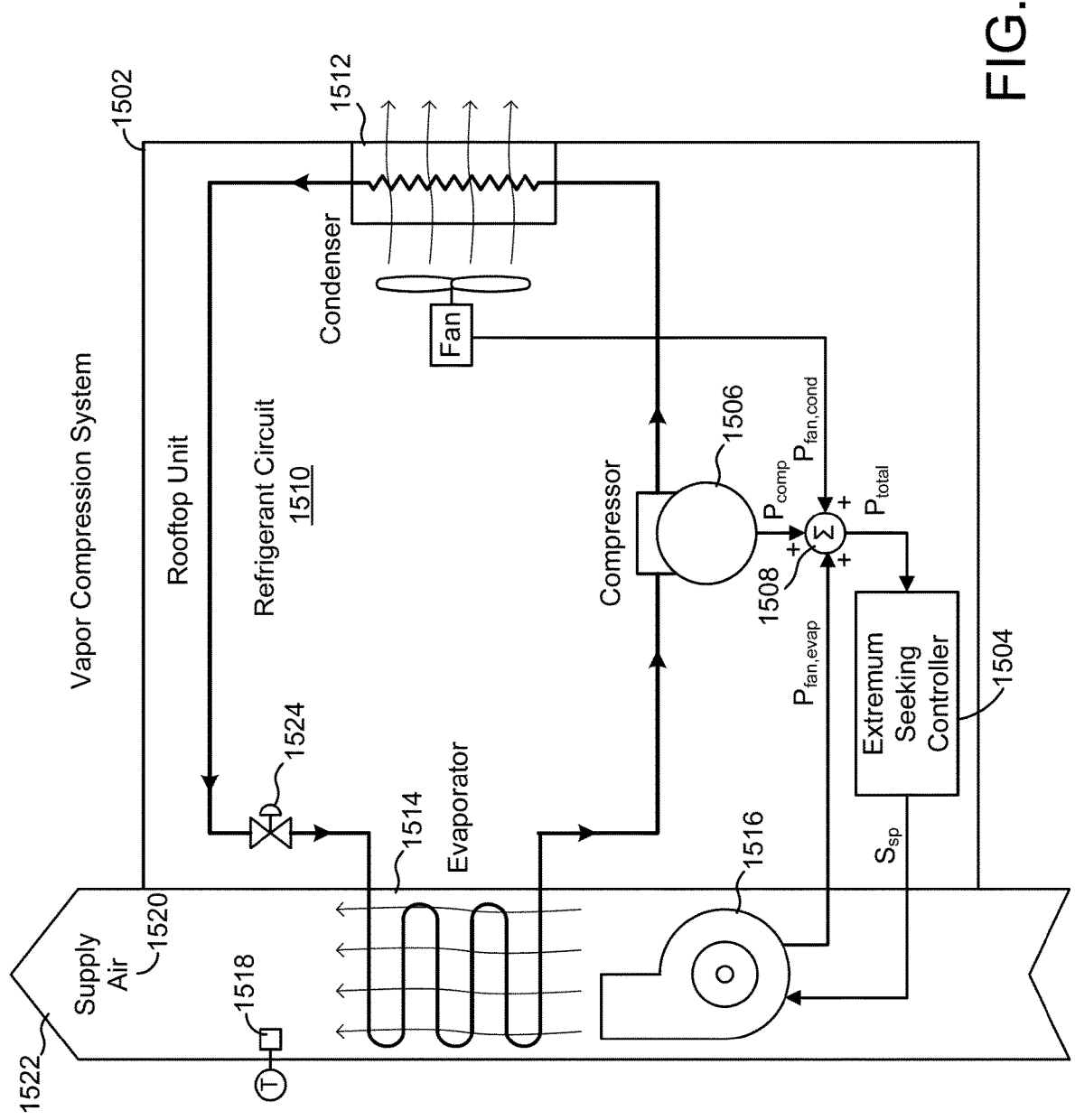
FIG. 15A is a block diagram of another vapor compression system in which the systems and methods of the present disclosure can be implemented, according to some embodiments.

Referring now to FIG. 15A, another vapor compression air conditioning system 1500 is shown, according to some embodiments. System 1500 can include some or all of the components of vapor compression system 1400, as described with reference to FIG. 14A. For example, system 1500 is shown to include a refrigerant circuit 1510. Refrigerant circuit 1510 includes a condenser 1512, an evaporator 1514, an expansion valve 1524, and a compressor 1506. Compressor 1506 is configured to circulate a refrigerant between evaporator 1514 and condenser 1512. Refrigerant circuit 1510 operates using a vapor compression cycle. For example, compressor 1506 compresses the refrigerant to a hot, high pressure state. The compressed refrigerant flows through condenser 1512 where the refrigerant rejects heat. A condenser fan 1522 can be used to modulate the rate of heat transfer within condenser 1512. The cooled refrigerant is expanded by expansion valve 1524 to a low pressure, low temperature state. The expanded refrigerant flows through evaporator 1514 where the refrigerant absorbs heat. An evaporator fan 1516 can be used to modulate the rate of heat transfer within evaporator 1514.

In some embodiments, refrigerant circuit 1510 is located within a rooftop unit 1502 (e.g., a rooftop air handling unit) as shown in FIG. 15A. Rooftop unit 1502 can be configured to provide cooling for supply air 1520 flowing through an air duct 1522. For example, evaporator 1514 can be located within air duct 1522 such that supply air 1520 flows through evaporator 1514 and is cooled by transferring heat to the expanded refrigerant within evaporator 1514. The cooled airflow can then be routed to a building to provide cooling for a room or zone of the building. The temperature of supply air 1520 can be measured by a temperature sensor 1518 located downstream of evaporator 1514 (e.g., within duct 1522). In other embodiments, refrigerant circuit 1510 can be used in any of a variety of other systems or devices that transfer heat using a vapor compression cycle (e.g., chillers, heat pumps, heat recovery chillers, refrigeration devices, etc.).

Extremum seeking controller 502 is shown receiving a power input $P_{total}$ representing the total power consumed by compressor 1506 $P_{comp}$, evaporator fan 1516 $P_{fan,evap}$, and condenser fan 1522 $P_{fan,cond}$ (i.e., $P_{total}=P_{comp}+P_{fan,evap}+P_{fan,cond}$). As illustrated in FIG. 15A, the power inputs $P_{comp}$, $P_{fan,evap}$, and $P_{fan,cond}$ can be summed outside of extremum seeking controller 502 at summing block 1508 to provide a combined signal representative of the total power $P_{total}$. In other embodiments, extremum seeking controller 502 receives the individual power inputs $P_{comp}$, $P_{fan,evap}$, and $P_{fan,cond}$ and conducts the summation of summing block

1508. In either case, extremum seeking controller 502 can be said to receive the power inputs $P_{comp}$, $P_{fan,evap}$, and $P_{fan,cond}$ even if the power inputs are provided as a single summed or combined signal $P_{total}$ representing the total system power.

In some embodiments, the total system power $P_{total}$ is the performance variable which extremum seeking controller 502 seeks to optimize (e.g., minimize). The total system power $P_{total}$ can include the power consumption of one or more components of vapor compression system 1500. In the embodiment shown in FIG. 15A, the total system power $P_{total}$ includes $P_{comp}$, $P_{fan,evap}$, and $P_{fan,cond}$. However, in various other embodiments, the total system power $P_{total}$ can include any combination of power inputs. For example, the total system power $P_{total}$ can include the power consumption of various other fans within rooftop unit 1502, the power consumption of a fluid pump, and/or any other power consumption that occurs within vapor compression system 1500.

Extremum seeking controller 502 is shown providing a control signal regulating the fan speed $S_{sp}$ to evaporator fan 1516. In some embodiments, the fan speed $S_{sp}$ is the manipulated variable which extremum seeking controller 502 adjusts to affect the total system power $P_{total}$. Increasing the fan speed $S_{sp}$ can increase the amount of heat removed from the supply air 1520 in evaporator 1514 and increase the total system power consumption $P_{total}$. Similarly, decreasing the fan speed $S_{sp}$ can decrease the amount of heat removed from the supply air 1520 in evaporator 1514 and decrease the total system power consumption $P_{total}$. Extremum seeking controller 502 implements an extremum seeking control strategy that dynamically searches for an unknown input (e.g., optimal evaporator fan speed $S_{sp}$) to obtain system performance (e.g., total power consumption $P_{total}$) that trends near optimal.

Figure 15C:
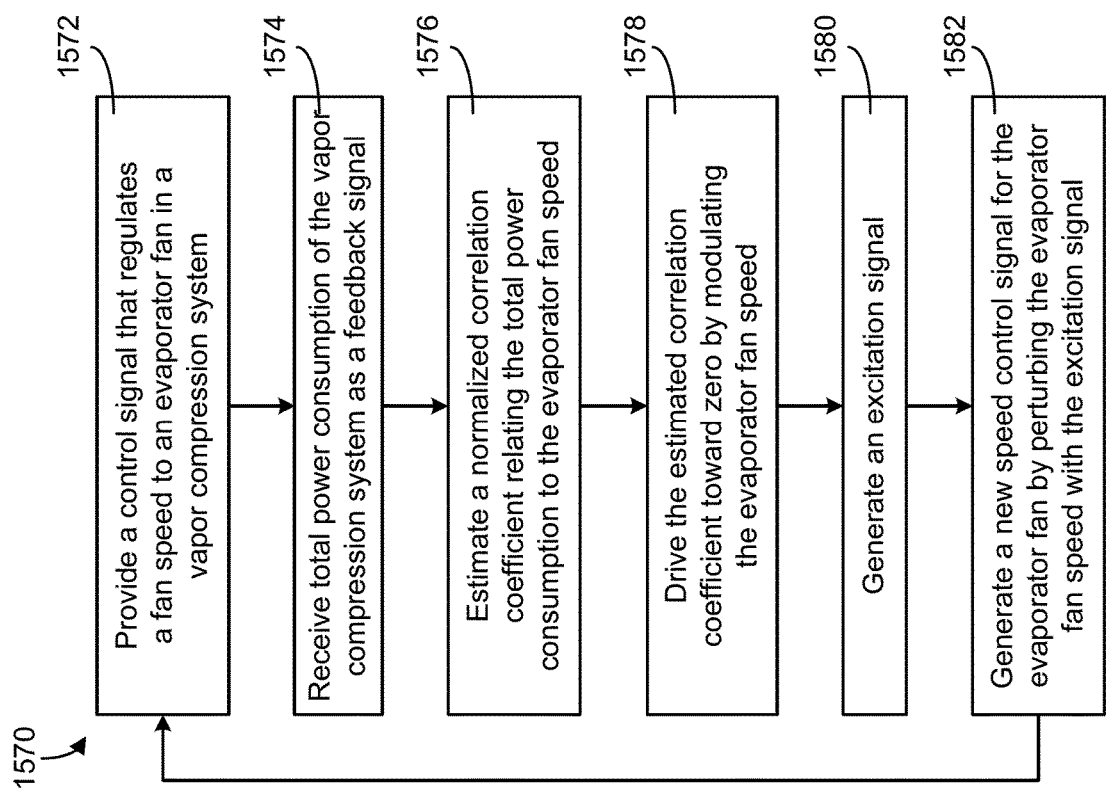
FIG. 15C is a flow diagram illustrating an extremum-seeking control technique in which a normalized correlation coefficient is used to relate the total system power consumption to the evaporator fan speed in the vapor compression system of FIG. 15A, according to some embodiments.
Figure 15B:
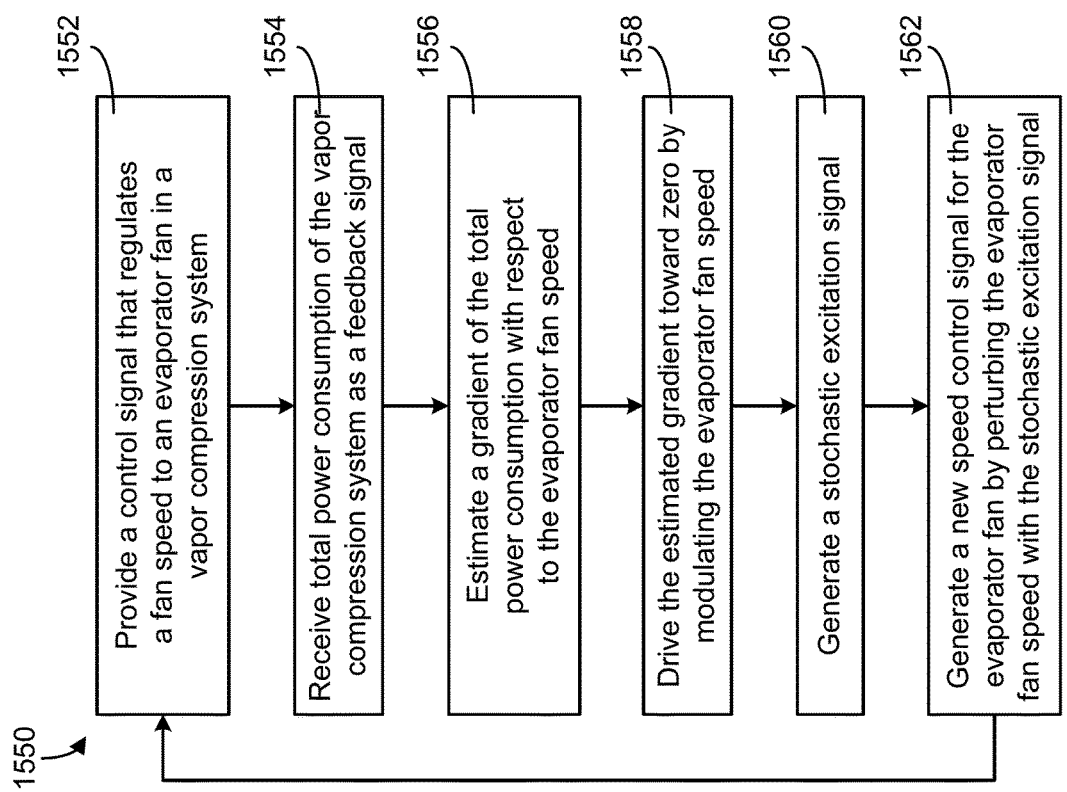
FIG. 15B is a flow diagram illustrating an extremum-seeking control technique in which a stochastic excitation signal is used to perturb an evaporator fan speed in the vapor compression system of FIG. 15A, according to some embodiments.

Referring now to FIGS. 15B and 15C, a pair of flow diagrams 1550 and 1570 illustrating the operation of extremum controller 502 in vapor compression system 1500 are shown, according to some embodiments. In both flow diagrams 1550 and 1570, extremum seeking controller 502 provides a control signal regulating a fan speed $S_{sp}$ to an evaporator fan 1516 in a vapor compression system 1500 (blocks 1552 and 1572). Extremum seeking controller 502 can receive a total power consumption $P_{total}$ of the vapor compression system 1500 as a feedback signal (blocks 1554 and 1574).

In flow diagram 1550, extremum seeking controller 502 estimates a gradient of the total power consumption $P_{total}$ with respect to the evaporator fan speed $S_{sp}$ (block 1556). Extremum seeking controller 502 can provide control over the vapor compression system 1500 by driving the obtained gradient toward zero by modulating the evaporator fan speed $S_{sp}$ (block 1558). In some embodiments, extremum seeking controller 502 generates a stochastic excitation signal (block 1560) and uses the stochastic excitation signal to generate a new evaporator fan speed $S_{sp}$. For example, extremum seeking controller 502 can generate the new evaporator fan speed $S_{sp}$ by perturbing the evaporator fan speed $S_{sp}$ with the stochastic excitation signal (block 1562).

In flow diagram 1570, extremum seeking controller 502 estimates a normalized correlation coefficient relating the total power consumption $P_{total}$ to the evaporator fan speed $S_{sp}$ (block 1576). Extremum seeking controller 502 can provide control over the vapor compression system 1500 by driving the estimated correlation coefficient toward zero by modulating the evaporator fan speed $S_{sp}$ (block 1578). In some embodiments, extremum seeking controller 502 generates an excitation signal (block 1580) and uses the excitation signal to generate a new control signal for the evaporator fan. For example, extremum seeking controller 502 can generate the new speed control signal by perturbing the evaporator fan speed $S_{sp}$ with the excitation signal (block 1582).

Vapor Compression System 1600

Figure 16A:
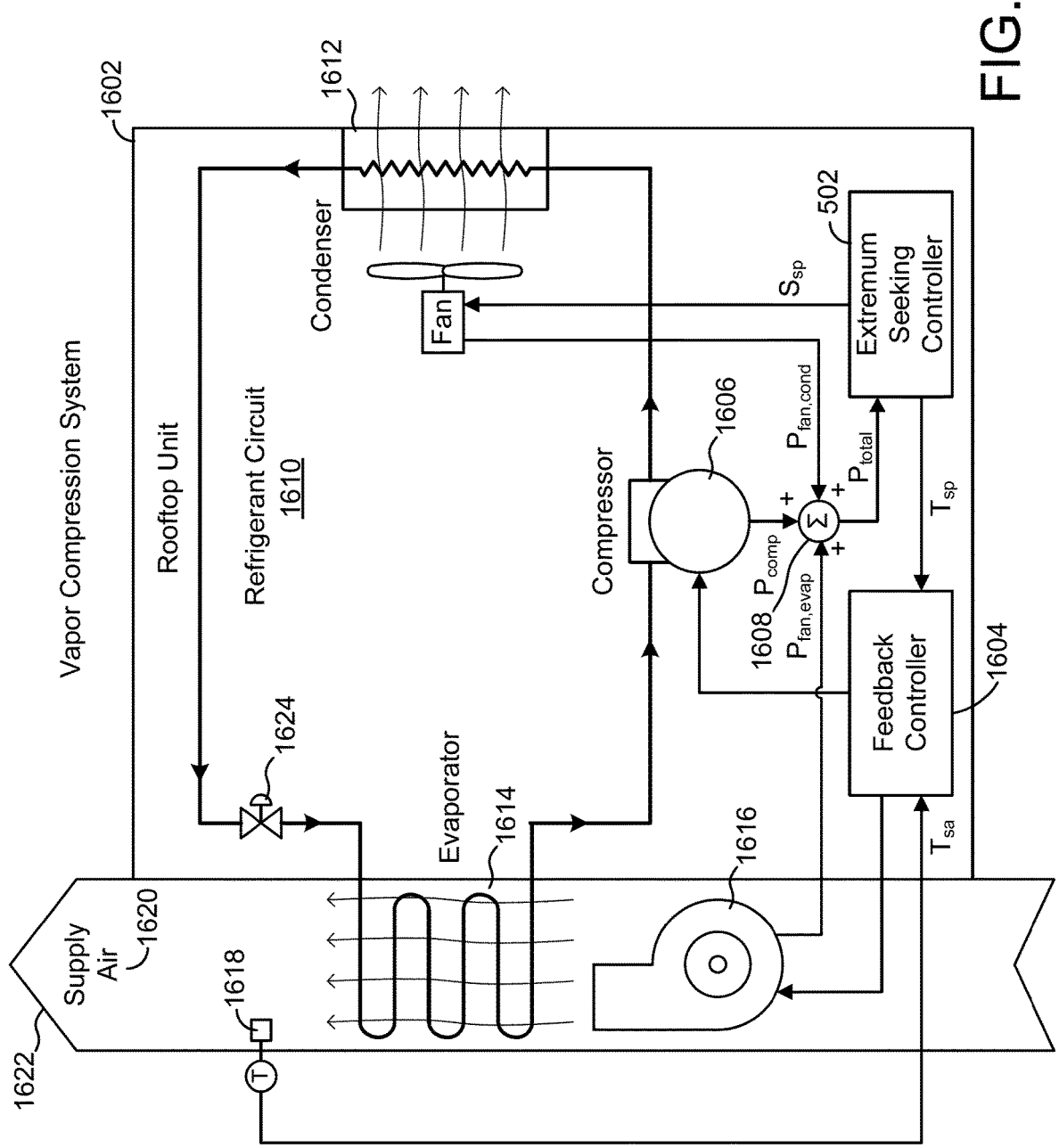
FIG. 16A is a block diagram of another vapor compression system in which the systems and methods of the present disclosure can be implemented, according to some embodiments.

Referring now to FIG. 16A, a vapor compression air conditioning system 1600 is shown, according to some embodiments. System 1600 is shown to include a refrigerant circuit 1610. Refrigerant circuit 1610 includes a condenser 1612, an evaporator 1614, an expansion valve 1624, and a compressor 1606. Compressor 1606 is configured to circulate a refrigerant between evaporator 1614 and condenser 1612. Refrigerant circuit 1610 operates using a vapor compression cycle. For example, compressor 1606 compresses the refrigerant to a hot, high pressure state. The compressed refrigerant flows through condenser 1612 where the refrigerant rejects heat. A condenser fan 1622 can be used to modulate the rate of heat transfer within condenser 1612. The cooled refrigerant is expanded by expansion valve 1624 to a low pressure, low temperature state. The expanded refrigerant flows through evaporator 1614 where the refrigerant absorbs heat. An evaporator fan 1616 can be used to modulate the rate of heat transfer within evaporator 1614.

In some embodiments, refrigerant circuit 1610 is located within a rooftop unit 1602 (e.g., a rooftop air handling unit) as shown in FIG. 16A. Rooftop unit 1602 can be configured to provide cooling for supply air 1620 flowing through an air duct 1622. For example, evaporator 1614 can be located within air duct 1622 such that supply air 1620 flows through evaporator 1614 and is cooled by transferring heat to the expanded refrigerant within evaporator 1614. The cooled airflow can then be routed to a building to provide cooling for a room or zone of the building. The temperature of supply air 1620 can be measured by a temperature sensor 1618 located downstream of evaporator 1614 (e.g., within duct 1622). In other embodiments, refrigerant circuit 1610 can be used in any of a variety of other systems or devices that transfer heat using a vapor compression cycle (e.g., chillers, heat pumps, heat recovery chillers, refrigeration devices, etc.).

Extremum seeking controller 502 is shown receiving a power input $P_{total}$ representing the total power consumed by compressor 1606 $P_{comp}$, evaporator fan 1616 $P_{fan,evap}$, and condenser fan 1622 $P_{fan,cond}$ (i.e., $P_{total}=P_{comp}+P_{fan,evap}+P_{fan,cond}$). As illustrated in FIG. 16A, the power inputs $P_{comp}$, $P_{fan,evap}$, and $P_{fan,cond}$ can be summed outside of extremum seeking controller 502 at summing block 1608 to provide a combined signal representative of the total power $P_{total}$. In other embodiments, extremum seeking controller 502 receives the individual power inputs $P_{comp}$, $P_{fan,evap}$, and $P_{fan,cond}$ and conducts the summation of summing block 1608. In either case, extremum seeking controller 502 can be said to receive the power inputs $P_{camp}$, $P_{fan,evap}$, and $P_{fan,cond}$ even if the power inputs are provided as a single summed or combined signal $P_{total}$ representing the total system power.

In some embodiments, the total system power $P_{total}$ is the performance variable which extremum seeking controller 502 seeks to optimize (e.g., minimize). The total system power $P_{total}$ can include the power consumption of one or more components of vapor compression system 1600. In the embodiment shown in FIG. 16A, the total system power $P_{total}$ includes $P_{comp}$, $P_{fan,evap}$, and $P_{fan,cond}$. However, in various other embodiments, the total system power $P_{total}$ can include any combination of power inputs. For example, the total system power $P_{total}$ can include the power consumption of various other fans within rooftop unit 1602, the power consumption of a fluid pump, and/or any other power consumption that occurs within vapor compression system 1600.

Extremum seeking controller 502 is shown providing a temperature setpoint $T_{sp}$ to a feedback controller 1604 and a control signal regulating a fan speed $S_{sp}$ to condenser fan 1622. In some embodiments, the temperature setpoint $T_{sp}$ and the condenser fan speed $S_{sp}$ are the manipulated variables which extremum seeking controller 502 adjusts to affect the total system power $P_{total}$. The temperature setpoint $T_{sp}$ is a setpoint for the temperature of the supply air 1620 leaving evaporator 1614. The supply air temperature $T_{sa}$ can be measured by temperature sensor 1618 located downstream of evaporator 1614. Feedback controller 1604 is shown receiving the supply air temperature $T_{sa}$ as a feedback signal. The fan speed $S_{sp}$ is the speed of condenser fan 1622.

Feedback controller 1604 can operate evaporator fan 1616 and/or compressor 1606 to achieve the temperature setpoint $T_{sp}$ provided by extremum seeking controller 502. For example, feedback controller 1604 can increase the speed of evaporator fan 1616 to increase the amount of heat removed from the supply air 1620 in evaporator 1614 or decrease the speed of evaporator fan 1616 to decrease the amount of heat removed from the supply air 1620 in evaporator 1614. Similarly, extremum seeking controller 502 can modulate the condenser fan speed $S_{sa}$ to increase the amount of heat removed from the refrigerant in condenser 1612 (e.g., by increasing the condenser fan speed $S_{sa}$) or decrease the amount of heat removed from the refrigerant in condenser 1612 (e.g., by decreasing the condenser fan speed $S_{sa}$).

Extremum seeking controller 502 implements an extremum seeking control strategy that dynamically searches for unknown inputs (e.g., optimal supply air temperature setpoint $T_{sp}$ and/or optimal condenser fan speed $S_{sa}$) to obtain system performance (e.g., total power consumption $P_{total}$) that trends near optimal. Although feedback controller 1604 and extremum seeking controller 502 are shown as separate devices, it is contemplated that feedback controller 1604 and extremum seeking controller 502 can be combined into a single device in some embodiments (e.g., a single controller that performs the functions of both extremum seeking controller 502 and feedback controller 1604). For example, extremum seeking controller 502 can be configured to control evaporator fan 1616, condenser fan 1622, and/or compressor 1606 directly without requiring an intermediate feedback controller 1604.

Figure 16C:
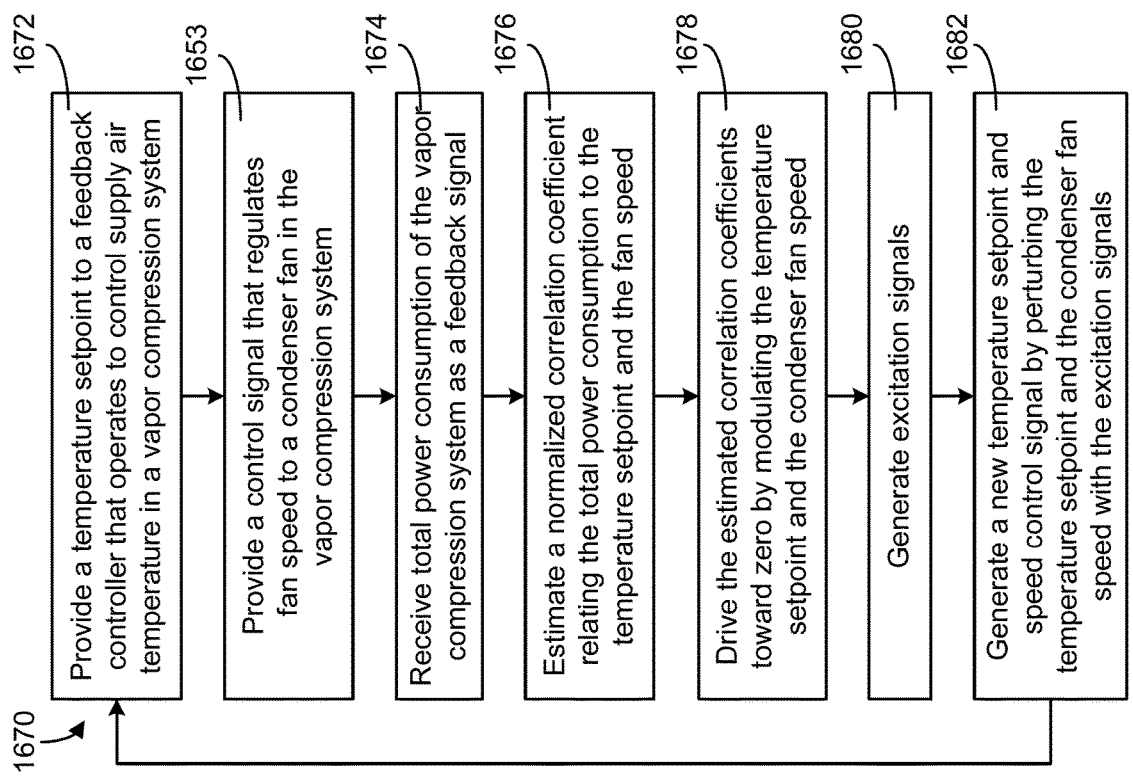
FIG. 16C is a flow diagram illustrating an extremum-seeking control technique in which normalized correlation coefficients are used to relate the total system power consumption to the supply air temperature setpoint and the condenser fan speed in the vapor compression system of FIG. 16A, according to some embodiments.
Figure 16B:
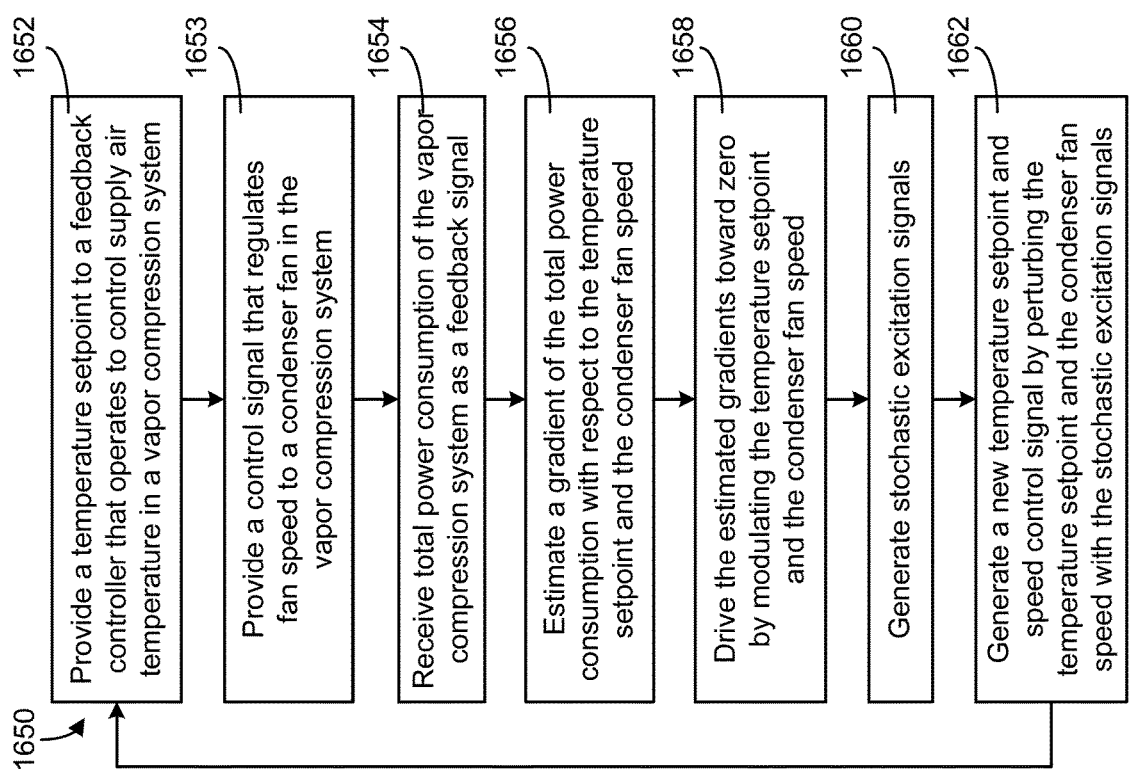
FIG. 16B is a flow diagram illustrating an extremum-seeking control technique in which stochastic excitation signals are used to perturb a supply air temperature setpoint and a condenser fan speed in the vapor compression system of FIG. 16A, according to some embodiments.

Referring now to FIGS. 16B and 16C, a pair of flow diagrams 1650 and 1670 illustrating the operation of extremum controller 502 in vapor compression system 1600 are shown, according to some embodiments. In both flow diagrams 1650 and 1670, extremum seeking controller 502 provides a temperature setpoint $T_{sp}$ to a feedback controller 1604 that operates to control supply air temperature $T_{sa}$ in a vapor compression system 1600 (blocks 1652 and 1672). Extremum seeking controller 502 also provides a control signal that regulates a fan speed to a condenser fan 1622 in the vapor compression system 1600 (blocks 1653 and 1674). Extremum seeking controller 502 can receive a total power consumption $P_{total}$ of the vapor compression system 1600 as a feedback signal (blocks 1654 and 1674).

In flow diagram 1650, extremum seeking controller 502 estimates a first gradient of the total power consumption $P_{total}$ with respect to the supply air temperature setpoint $T_{sp}$ and a second gradient of the total power consumption $P_{total}$ with respect to the condenser fan speed $S_{sp}$ (block 1656). Extremum seeking controller 502 can provide control over the vapor compression system 1600 by driving the obtained gradients toward zero by modulating the temperature setpoint $T_{sp}$ and/or the condenser fan speed $S_{sp}$ (block 1658). In some embodiments, extremum seeking controller 502 generates stochastic excitation signals (block 1660) and uses the stochastic excitation signals to generate a new supply air temperature setpoint $T_{sp}$ and a new control signal regulating the condenser fan speed $S_{sp}$. For example, extremum seeking controller 502 can generate the new temperature setpoint $T_{sp}$ by perturbing the supply air temperature setpoint $T_{sp}$ with a first stochastic excitation signal and can generate the new control signal for the condenser fan 1622 by perturbing the condenser fan speed $S_{sp}$ with a second stochastic excitation signal (block 1662).

In flow diagram 1670, extremum seeking controller 502 estimates a first normalized correlation coefficient relating the total power consumption $P_{total}$ to the supply air temperature setpoint $T_{sp}$ and a second normalized correlation coefficient relating the total power consumption $P_{total}$ to the condenser fan speed $S_{sp}$ (block 1676). Extremum seeking controller 502 can provide control over the vapor compression system 1600 by driving the estimated correlation coefficients toward zero by modulating the temperature setpoint $T_{sp}$ and/or the condenser fan speed $S_{sp}$ (block 1678). In some embodiments, extremum seeking controller 502 generates excitation signals (block 1680) and uses the excitation signal to generate a new supply air temperature setpoint $T_{sp}$ and a new control signal regulating the condenser fan speed $S_{sp}$. For example, extremum seeking controller 502 can generate the new temperature setpoint $T_{sp}$ by perturbing the supply air temperature setpoint $T_{sp}$ with a first excitation signal and can generate the new control signal for the condenser fan 1622 by perturbing the condenser fan speed $S_{sp}$ with a second excitation signal (block 1682).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for a plant, the control system comprising:
   a feedback controller for operating the plant to achieve a value of a manipulated variable; and
   an extremum-seeking controller configured to provide the value of the manipulated variable to the feedback controller and to determine a value for the manipulated variable by:
      perturbing the manipulated variable with an excitation signal;
      monitoring a performance variable of the plant resulting from the perturbed manipulated variable;
      estimating a normalized correlation coefficient relating the performance variable to the manipulated variable; and
      modulating the manipulated variable to drive the normalized correlation coefficient toward zero using a general set of tuning parameters, wherein the general set of tuning parameters are adapted for use with the normalized correlation coefficient, independent of a scale of the performance variable.

2. The control system of claim 1, wherein the excitation signal is a non periodic signal comprising at least one of a random walk signal, a non deterministic signal, and a non-repeating signal.

3. The control system of claim 1, wherein the value of the manipulated variable comprises:
   a stochastic portion defined by a stochastic excitation signal; and
   a non-stochastic portion determined by driving the normalized correlation coefficient to zero.

4. The control system of claim 1, wherein the extremum-seeking controller comprises an integrator configured to generate the excitation signal by integrating a random noise signal.

5. The control system of claim 1, wherein the extremum-seeking controller is configured to estimate the normalized correlation coefficient relating the performance variable to the manipulated variable by performing a recursive least squares estimation process with exponential forgetting.

6. The control system of claim 1, wherein the extremum-seeking controller is configured to estimate a gradient of the performance variable with respect to the manipulated variable by performing a regression process.

7. The control system of claim 6, wherein the regression process comprises:
   obtaining a linear model for the performance variable, the linear model defining the performance variable as a linear function of the manipulated variable, an offset parameter, and a gradient parameter;
   estimating a value for the gradient parameter based on an observed value for the performance variable and an observed value for the manipulated variable; and
   using the estimated value for the gradient parameter as the gradient of the performance variable with respect to the manipulated variable.

8. The control system of claim 1, wherein the feedback controller is configured to achieve the manipulated variable by adjusting operation of equipment of the plant.

9. An extremum-seeking controller for a plant comprising:
   one or more processors; and
   one or more non-transitory computer-readable media storing instructions that, when executed by the one or more processors, cause the one or more processors to perform operations comprising:
      perturbing a manipulated variable with an excitation signal and providing the perturbed manipulated variable as an input to a plant;
      monitoring a performance variable of the plant resulting from the perturbed manipulated variable;
      estimating a normalized correlation coefficient relating the performance variable to the manipulated variable; and
      modulating the manipulated variable to drive the normalized correlation coefficient toward zero using a general set of tuning parameters, wherein the general set of tuning parameters are adapted for use with the normalized correlation coefficient, independent of a scale of the performance variable.

10. The extremum-seeking controller of claim 9, wherein the normalized correlation coefficient is estimated with a recursive estimation process, wherein the recursive estimation process is a recursive least squares estimation process with exponential forgetting.

11. The extremum-seeking controller of claim 9, wherein the one or more processors are configured to perform the recursive estimation process for the manipulated variable by:
   calculating a covariance between the performance variable and the manipulated variable;
   calculating a variance of the manipulated variable; and
   using the calculated covariance and the calculated variance to estimate the normalized correlation coefficient relating the performance variable to the manipulated variable.

12. The extremum-seeking controller of claim 9, wherein the one or more processors are configured to perform the recursive estimation process for the manipulated variable by:
   calculating an exponentially-weighted moving average (EWMA) of a plurality of samples of the manipulated variable;
   calculating an EWMA of a plurality of samples of the performance variable; and using the EWMAs to estimate the normalized correlation coefficient relating the performance variable to the manipulated variable.

13. The extremum-seeking controller of claim 9, wherein the recursive estimation process is a regression process.

14. The extremum-seeking controller of claim 13, wherein the one or more processors are configured to perform the regression process by:
obtaining a linear model for the performance variable, the linear model defining the performance variable as a linear function of the manipulated variable and a gradient parameter for the manipulated variable;
estimating a value for the gradient parameter based on observed value for the manipulated variable and an observed value for the performance variable; and
using the estimated values for the gradient parameter as the normalized correlation coefficients relating the performance variable to the manipulated variable.

15. The extremum-seeking controller of claim 9, wherein the excitation signal is a non periodic signal comprising at least one of a random walk signal, a non deterministic signal, and a non-repeating signal.

16. An extremum-seeking controller for a plant, the extremum-seeking controller comprising:
one or more processors; and
one or more non-transitory computer-readable media storing instructions that, when executed by the one or more processors, cause the one or more processors to perform operations comprising:
perturbing each of a plurality of manipulated variables with a different excitation signal;
monitoring a performance variable of the plant resulting from each of the perturbed manipulated variables;
estimating normalized correlation coefficients relating the performance variable to each of the perturbed manipulated variables; and
modulating the manipulated variables to drive the estimated normalized correlation coefficients toward zero using a general set of tuning parameters, wherein the general set of tuning parameters are adapted for use with the normalized correlation coefficient, independent of a scale of the performance variable.

17. The extremum-seeking controller of claim 16, wherein the one or more processors are configured to estimate the normalized correlation coefficient for each manipulated variable by:
calculating a covariance between each of the manipulated variables and the performance variable;
calculating a variance of each of the manipulated variables;
calculating a variance of the performance variable; and
using the calculated covariance and the calculated variances to estimate the normalized correlation coefficient.

18. The extremum-seeking controller of claim 16, wherein the one or more processors are configured to estimate the normalized correlation coefficient for each of the manipulated variables by:
estimating a gradient of the performance variable with respect to each of the manipulated variables;
calculating a standard deviation of each of the manipulated variables;
calculating a standard deviation of the performance variable; and
using the estimated gradient and the calculated standard deviations to estimate the normalized correlation coefficient.

19. The extremum-seeking controller of claim 16, wherein the one or more processors are configured to estimate the normalized correlation coefficient for each of the manipulated variables by:
calculating an exponentially-weighted moving average (EWMA) of a plurality of samples of each of the manipulated variables;
calculating an EWMA of a plurality of samples of the performance variable; and
using the EWMAs to estimate the normalized correlation coefficient.

20. The extremum-seeking controller of claim 16, wherein the excitation signal is a non periodic signal comprising at least one of a random walk signal, a non deterministic signal, and a non-repeating signal.

* * * * *